US008600835B1

(12) United States Patent
Lueck

(10) Patent No.: US 8,600,835 B1
(45) Date of Patent: Dec. 3, 2013

(54) METHODS SYSTEMS AND COMPUTER PROGRAM PRODUCTS FOR GENERATING ELECTRONIC SHOPPING LISTS WITH ITEM AND PRICE DATA

(75) Inventor: Gary D. Lueck, Fullerton, CA (US)

(73) Assignee: Intuit Inc., Mountain View, CA (US)

( * ) Notice: Subject to any disclaimer, the term of this patent is extended or adjusted under 35 U.S.C. 154(b) by 106 days.

(21) Appl. No.: 13/008,808

(22) Filed: Jan. 18, 2011

(51) Int. Cl.
    G06Q 30/00 (2012.01)
    G06F 17/30 (2006.01)
(52) U.S. Cl.
    USPC .......... 705/26.8; 705/26.1; 705/27.1
(58) Field of Classification Search
    USPC ................................. 705/26.1–27.2
    See application file for complete search history.

(56) References Cited

U.S. PATENT DOCUMENTS

| | | | |
|---|---|---|---|
| 6,026,376 A * | 2/2000 | Kenney | 705/26.61 |
| 6,487,540 B1 | 11/2002 | Smith et al. | |
| 6,738,749 B1 | 5/2004 | Chasko | |
| 7,130,814 B1 | 10/2006 | Szabo | |
| 7,353,194 B1 * | 4/2008 | Kerker et al. | 705/29 |
| 7,455,226 B1 | 11/2008 | Hammond et al. | |
| 7,552,087 B2 | 6/2009 | Schultz et al. | |
| 7,555,476 B2 | 6/2009 | Holbrook | |
| 7,742,989 B2 | 6/2010 | Schultz | |
| 7,792,709 B1 | 9/2010 | Trandal et al. | |
| 7,987,120 B2 | 7/2011 | Shiftan et al. | |
| 8,095,439 B1 | 1/2012 | Harman et al. | |
| 2001/0029483 A1 | 10/2001 | Schultz et al. | |
| 2001/0037207 A1 | 11/2001 | Dejaeger | |
| 2002/0069115 A1 * | 6/2002 | Fitzpatrick | 705/26 |
| 2003/0020762 A1 | 1/2003 | Budrys et al. | |
| 2003/0126020 A1 | 7/2003 | Smith et al. | |
| 2004/0220964 A1 | 11/2004 | Shiftan et al. | |
| 2004/0225567 A1 | 11/2004 | Mitchell et al. | |
| 2005/0049928 A1 | 3/2005 | Naick et al. | |
| 2005/0080683 A1 | 4/2005 | Jordan | |
| 2006/0038003 A1 | 2/2006 | Wakasa et al. | |
| 2006/0273163 A1 | 12/2006 | Gusler et al. | |
| 2007/0069013 A1 | 3/2007 | Seifert et al. | |
| 2007/0094087 A1 | 4/2007 | Mitchell et al. | |
| 2007/0164106 A1 | 7/2007 | McDevitt et al. | |
| 2007/0288322 A1 | 12/2007 | Watanabe | |
| 2008/0235749 A1 | 9/2008 | Arthur et al. | |
| 2009/0096590 A1 | 4/2009 | Grundelman | |
| 2009/0271265 A1 | 10/2009 | Lay et al. | |
| 2010/0257066 A1 | 10/2010 | Jones et al. | |
| 2010/0306080 A1 * | 12/2010 | Trandal et al. | 705/26.8 |
| 2011/0125598 A1 | 5/2011 | Shin et al. | |

OTHER PUBLICATIONS

"Skip the supermarket by purchasing groceries online." Inside the Internet. Nov. 2004. (recovered from ProQuest on Apr. 26, 2013].*

(Continued)

*Primary Examiner* — Peter Choi
*Assistant Examiner* — Kathleen G Palavecino
(74) *Attorney, Agent, or Firm* — Vista IP Law Group LLP

(57) ABSTRACT

Systems, computer-implemented methods and computer program products for generating electronic shopping lists for recurring item purchase that identify items and their respective prices. Item-level electronic transaction data is analyzed to determine purchase intervals of items and estimate when the consumer will purchase the items again. A source of price data is accessed to determine prices of respective items, and an electronic shopping list is generated based on prior consumer purchase and lists items that when it is determined that consumer will need to purchase those items again and their respective prices.

38 Claims, 55 Drawing Sheets

(56) References Cited

OTHER PUBLICATIONS

Notice of Allowance dated Oct. 11, 2011 in U.S. Appl. No. 12/609,922, filed Oct. 30, 2009.
Interview Summary dated Mar. 14, 2012, Office Action dated May 22, 2012, Amendment dated Aug. 21, 2012 and Final Office Action dated Sep. 26, 2012 in U.S. Appl. No. 13/286,101, filed Oct. 31, 2009, (53 pages).
Amendment dated Nov. 29, 2011, Final Office Action dated Apr. 16, 2012 and Amendment dated Jul. 16, 2012 in U.S. Appl. No. 12/650,343, filed Dec. 30, 2009, (58 pages).
Office Action dated Aug. 27, 2012 in U.S. Appl. No. 12/846,701, filed Jul. 29, 2010, (12 pages).
Amendment dated Feb. 3, 2012 and Final Office Action dated Apr. 5, 2012 in U.S. Appl. No. 12/625,540, filed Nov. 24, 2009, (34 pages).
File History of U.S. Appl. No. 12/609,922, filed Oct. 30, 2009.
Office Action dated Dec. 30, 2010 in U.S. Appl. No. 12/609,922, filed Oct. 30, 2009 (22 pages).
Interview Summary dated Mar. 8, 2011 in U.S. Appl. No. 12/609,922, filed Oct. 30, 2009 (3 pages).
Amendment dated Mar. 30, 2011 in U.S. Appl. No. 12/609,922, filed Oct. 30, 2009 (9 pages).
Interview Summary dated May 23, 2011 in U.S. Appl. No. 12/609,922, filed Oct. 30, 2009 (3 pages).
Amendment dated Jun. 13, 2011 in U.S. Appl. No. 12/609,922, filed Oct. 30, 2009 (13 pages).
File History of U.S. Appl. No. 12/650,343, filed Dec. 30, 2009.
Office Action dated Aug. 29, 2011 in U.S. Appl. No. 12/650,343, filed Oct. 30, 2009 (25 pages).
Interview Summary dated Nov. 21, 2011 in U.S. Appl. No. 12/650,343, filed Oct. 30, 2009 (3 pages).
http://www.bnet.com/blog/mobile-internet/the-future-of-online-coupons-scarily-personalized-offers-based-on-your-history/692 (7 pages).
"Bippy", Jul. 29, 2010, http://bippy.com.internet (5 pages).
"The Neat Company", Jul. 29, 2010, http://www,neatco.com.internet (7 pages).
"The Neat Company User Guide", Jul. 29, 2010, http://www.neatco.com/media/12224/neatworks4_guide2.pdf.internet (147 pages).
"Quick Receipts", Jul. 29, 2010, http://myquickreceipts.intuit.com/.internet (12 pages).
"The Smart Refrigerator", Jul. 29, 2010, http://cs.nyu.edu/~jml1414/ui/assign3/smart_refrig.html.internet (3 pages).
File History of U.S. Appl. No. 12/625,540, filed Nov. 24, 2009.
Office Action dated Oct. 3, 2011 in U.S. Appl. No. 12/625,540, filed Nov. 24, 2009 (15 pages).
Amendment After Final dated Nov. 26, 2012 in U.S. Appl. No. 13/286,101, filed Oct. 31, 2011 (7 pages).
Notice of Allowance dated Dec. 26, 2012 in U.S. Appl. No. 13/286,101, filed Oct. 31, 2011 (7 pages).
Amendment After Final dated Apr. 26, 2013 in U.S. Appl. No. 12/846,701, filed Jul. 29, 2010 (14 pages).
Amendment dated Nov. 26, 2012 in U.S. Appl. No. 12/846,701, filed Jul. 29, 2010, (18 pages).
Final Office Action dated Feb. 26, 2013 in U.S. Appl. No. 12/846,701, filed Jul. 29, 2010, (7 pages).
Office Action dated Nov. 8, 2012 in U.S. Appl. No. 12/982,793, filed Dec. 30, 2010, (16 pages.).
Amendment dated Mar. 11, 2013 in U.S. Appl. No. 12/982,793, filed Dec. 30, 2010, (14 pages).

* cited by examiner

400

ITEM-LEVEL ELECTRONIC TRANSACTION DATA

| Consumer ID (402) | Purchase Date (404) | Item ID (406) | Quantity (408) |
|---|---|---|---|
| Consumer ID 1 | Purchase Date 1 | Item ID 1 | 1 |
| Consumer ID 1 | Purchase Date 1 | Item ID 2 | 1 |
| Consumer ID 1 | Purchase Date 1 | Item ID 3 | 1 |
| Consumer ID 1 | Purchase Date 2 | Item ID 1 | 1 |
| Consumer ID 1 | Purchase Date 3 | Item ID 1 | 1 |
| Consumer ID 1 | Purchase Date 4 | Item ID 1 | 1 |
| Consumer ID 1 | Purchase Date 5 | Item ID 1 | 1 |

FIG. 4

Estimated Purchase Date: June 12

| Merchant ID (550) | Merchant Location (552) | Consumer Location 1 (554a) | Distance From Consumer (556) | Pre-Determined Distance (558) | Merchant Within Pre-Determined Distance? (560) | Shopping List for Merchant per Intervals? (562) | Shopping List to Consumer? (564) |
|---|---|---|---|---|---|---|---|
| Merchant 1 ID | MLoc1 | CLoc1 | 0.8 Mile | 1 Mile | Y | Y List 1 | Y |
| Merchant 2 ID | MLoc2 | CLoc2 | 0.5 Mile | 1 Mile | Y | Y List 2 | Y |
| Merchant 3 ID | MLoc3 | CLoc3 | 1.1 Mile | 1 Mile | N | Y List 3 | N |
| Merchant 4 ID | MLoc4 | CLoc4 | 1.5 Miles | 1 Mile | N | Y List 4 | N |
| Merchant 5 ID | MLoc5 | CLoc5 | 2 Miles | 1 Mile | N | N | N |

FIG. 5B

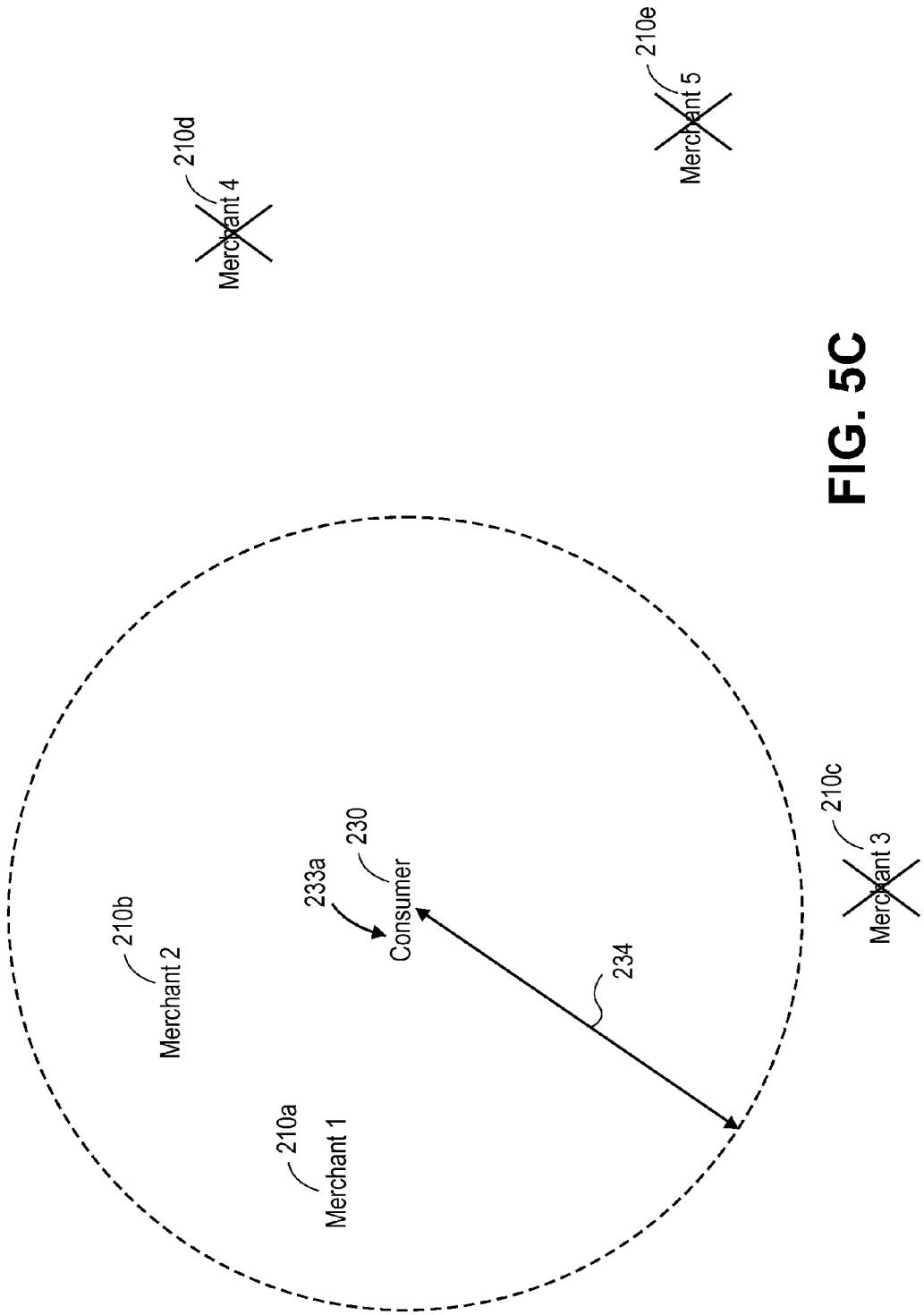

Estimated Purchase Date: June 12

| Merchant ID (550) | Merchant Location (552) | Consumer Location 1 (554a) | Distance From Consumer (556) | Pre-Determined Distance (558) | Merchant Within Pre-Determined Distance? (560) | Shopping List for Merchant per Intervals? (562) | Shopping List to Consumer? (564) |
|---|---|---|---|---|---|---|---|
| Merchant 1 ID | Merchant 1 Location | Consumer Location 2 | 2.0 Miles | 1 Mile | N | Y List 1 | N |
| Merchant 2 ID | Merchant 2 Location | Consumer Location 2 | 1.8 Miles | 1 Mile | N | Y List 2 | N |
| Merchant 3 ID | Merchant 3 Location | Consumer Location 2 | 1.7 Miles | 1 Mile | N | Y List 3 | N |
| Merchant 4 ID | Merchant 4 Location | Consumer Location 2 | 0.1 Miles | 1 Mile | Y | Y List 4 | Y |
| Merchant 5 ID | Merchant 5 Location | Consumer Location 2 | 1.1 Miles | 1 Mile | N | N | N |

DATES SPECIFIC ITEMS PURCHASED

| Cereal 1 (C1) (CHEERIOS) | Cereal 2 (C2) (RAISIN BRAN) | Diapers (D) (PAMPERS) | Paper Towels (PT) (BRAWNY) |
|---|---|---|---|
| May 1 | May 1 | May 1 | May 1 |
| May 8 | | May 8 | |
| May 15 | May 15 | | |
| May 22 | | May 22 | |
| May 29 | May 29 | | |
| June 5 | | | June 5 |

```
|
|
| May 1     May 8     May 15    May 22    May 29    June 5
|---------------------------------------------------------------
| C1        C1        C1        C1        C1        C1
| C2                  C2                  C2
| D         D                   D
| PT                                                PT
```

PURCHASE INTERVALS

| Cereal 1 (CHEERIOS) | Cereal 2 (RAISIN BRAN) | Diapers (PAMPERS) | Paper Towels (BRAWNY) |
|---|---|---|---|
| 7 days | 14 days | 14 days | 30 days |

| Location 1 Cereal Shopping List - June 12 |
|---|
| RAISIN BRAN |
| TOTAL |
| CHEERIOS |

| Location 1 Cleaning Supplies Shopping List - June 12 |
|---|
| FANTASTIK |
| CLOROX bleach |
| AJAX |

| Location 1 Fruit/Vegetable Shopping List - June 12 |
|---|
| BROCOLLI |
| SPINACH |
| APPLES |
| ORANGES |

FIG. 11C

Estimated Date: June 12

| Merchant ID (550) | Minimum Shopping Time (1450) | Available Time / Time Slot (1452) | Able to Shop? (1454) | Shopping List for Merchant per Intervals? (562) | Shopping List to Consumer? (564) |
|---|---|---|---|---|---|
| Merchant 1 ID | 30 minutes | 30 minutes 12:00-12:30 | Y | Y List 1 | Y |
| Merchant 2 ID | 15 minutes | 30 minutes 12:00-12:30 | Y | Y List 2 | Y |
| Merchant 3 ID | 45 minutes | 30 minutes 12:00-12:30 | N | Y List 3 | N |
| Merchant 4 ID | 60 minutes | 30 minutes 12:00-12:30 | N | Y List 4 | N |
| Merchant 5 ID | 75 minutes | 30 minutes 12:00-12:30 | N | N | N |

FIG. 14E

Estimated Date: June 19

| Merchant ID (550) | Minimum Shopping Time (1450) | Available Time / Time Slot (1452) | Able to Shop? (1454) | Shopping List for Merchant per Intervals? (562) | Shopping List to Consumer? (564) |
|---|---|---|---|---|---|
| Merchant 1 ID | 30 minutes | 60 minutes / 12:00-1:00 | Y | N | N |
| Merchant 2 ID | 15 minutes | 60 minutes / 12:00-1:00 | Y | N | N |
| Merchant 3 ID | 45 minutes | 60 minutes / 12:00-1:00 | Y | Y List 3 | Y |
| Merchant 4 ID | 60 minutes | 60 minutes / 12:00-1:00 | Y | Y List 4 | Y |
| Merchant 5 ID | 75 minutes | 60 minutes / 12:00-1:00 | N | N | N |

FIG. 14F

Estimated Date: June 12

| Merchant ID (550) | Merchant Location (MLoc) (552) | Consumer Location (CLoc) (554) | Distance From Consumer (556) | Pre-Determined Distance (558) | Merchant Within Pre-Determined Distance? (560) | Minimum Shopping Time (1450) | Available Time (1452) | Able to Shop? (1454) | Shopping List for Merchant per Intervals? (562) | Shopping List to Consumer? (564) |
|---|---|---|---|---|---|---|---|---|---|---|
| Merchant 1 ID | MLoc 1 | CLoc 1 | 0.8 Mile | 1 Mile | Y | 30 minutes | 60 minutes / 12:00-1:00 | Y | Y List 1 | Y |
| Merchant 2 ID | MLoc 2 | CLoc 2 | 0.5 Mile | 1 Mile | Y | 15 minutes | 60 minutes / 12:00-1:00 | Y | Y List 2 | Y |
| Merchant 3 ID | MLoc 3 | CLoc 3 | 1.1 Mile | 1 Mile | N | 45 minutes | 60 minutes / 12:00-1:00 | Y | Y List 3 | N |
| Merchant 4 ID | MLoc 4 | CLoc 4 | 1.5 Miles | 1 Mile | N | 60 minutes | 60 minutes / 12:00-1:00 | Y | Y List 4 | N |
| Merchant 5 ID | MLoc 5 | CLoc 5 | 2 Miles | 1 Mile | N | 75 minutes | 60 minutes / 12:00-1:00 | N | Y | N |

| ITEM (2021) | PRICE (2022) |
|---|---|
| ITEM 1 | PRICE 1 |
| ITEM 2 | PRICE 2 |
| ITEM 3 | PRICE 3 |

| ITEM (2021) | PRICE (2022) | MERCHANT (2023) |
|---|---|---|
| ITEM 1 | PRICE 1 | MERCHANT A |
| ITEM 2 | PRICE 2 | MERCHANT A |
| ITEM 3 | PRICE 3 | MERCHANT A |

| ITEM (2021) | PRICE (2022) | MERCHANT (2023) |
|---|---|---|
| ITEM 1 | PRICE 1-A | MERCHANT A |
|  | PRICE 1-B | MERCHANT B |
|  | PRICE 1-C | MERCHANT C |
|  |  |  |
| ITEM 2 | PRICE 2-A | MERCHANT A |
|  | PRICE 2-B | MERCHANT B |
|  | PRICE 2-C | MERCHANT C |
|  |  |  |
| ITEM 3 | PRICE 3-A | MERCHANT A |
|  | PRICE 3-B | MERCHANT B |
|  | PRICE 3-C | MERCHANT C |

| ITEM (2021) | PRICE (2022) | MERCHANT (2023) |
|---|---|---|
| ITEM 1 | PRICE 1-A | MERCHANT A |
|  |  |  |
|  |  |  |
|  |  |  |
| ITEM 2 |  |  |
|  |  |  |
|  | PRICE 2-C | MERCHANT C |
|  |  |  |
| ITEM 3 |  |  |
|  | PRICE 3-B | MERCHANT B |
|  |  |  |

FIG. 20E

METHODS SYSTEMS AND COMPUTER PROGRAM PRODUCTS FOR GENERATING ELECTRONIC SHOPPING LISTS WITH ITEM AND PRICE DATA

CROSS REFERENCE TO RELATED APPLICATIONS

This application is related to U.S. application Ser. No. 12/846,701, filed on Jul. 29, 2010, entitled "METHODS, SYSTEMS AND COMPUTER PROGRAM PRODUCTS FOR NOTIFYING CONSUMERS OF RECURRING PURCHASES," U.S. application Ser. No. 12/982,793, filed on Dec. 30, 2010, entitled "SEGREGATED ELECTRONIC SHOPPING ELECTRONIC SHOPPING LISTS FOR RECURRING ITEM PURCHASES," and U.S. application Ser. No. 12/982,774, filed Dec. 30, 2010, entitled "GENERATION OF ELECTRONIC SHOPPING LISTS FOR RECURRING ITEM PURCHASES BASED ON CONSUMER LOCATION AND SCHEDULE," the contents of which are incorporated herein by reference as though set forth in full.

BACKGROUND

Consumers purchase various items, goods and services such as groceries and other consumables such as cereal, meat, milk and baby formula, toiletries, personal hygiene supplies such as toothpaste, floss, mouthwash, etc. These items may be consumed and purchased weekly, every other week, once a month, and at other times depending on the quantity of items purchased each time and how quickly they are consumed. The rate at which items are consumed and how often they must be purchased again may be affected by various factors such as the number of people in a consumer's family, consumer preferences and circumstances. These factors may change over time as people join a family, preferences and consumption change, and new products become available.

Given the nature of consumable items, they are used or needed at different rates and at different times. Consumers may or may not know how much of a particular item remains and whether it is necessary to purchase the item again. Further, consumers often purchase different items from different stores for various reasons including item availability and selection, merchant loyalty, location and convenience, and prices charged by different merchants. For example, a consumer may purchase certain food items from a traditional grocery store such as SAFEWAY, certain food items from a specialty, bulk or farmers-market style grocery store such as WHOLE FOODS, certain items, such as bulk consumables, from a warehouse club store such as COSTCO, and other items from big box or superstore such as TARGET. Further, consumers may purchase certain items on-line from AMAZON or a merchant website.

In order to assess their needs, consumers may survey their needs by looking in their pantry, refrigerator, bathrooms, etc. to determine which items need to be purchased or replaced, and then make a shopping list in the form of a written note on a piece of paper or on a POST-IT note, which the consumer takes when shopping to remind the consumer which items to purchase. These types of shopping lists may not be updated with other items that are identified by the consumer at a later time.

Thus, consumers may forget their shopping lists or utilize an incomplete shopping list such that they do not know or forget which items are necessary, thereby resulting in the consumer forgoing such items until the next shopping trip, requiring the consumer to go out again to one or more stores to purchase forgotten items, purchase items from another merchant with less desirable item selection, fail to take advantage of opportunities to make purchases towards a rewards or points program offered by a particular merchant, and/or pay or travel more as a result of purchasing an item from a different merchant rather than from the merchant at which the consumer normally shops. These inconveniences and financial and time losses are due, in part, to consumers relying on their memories and ad-hoc shopping lists.

Further, even if consumers create an ad-hoc or written shopping list, consumers often do not know how much these items will cost and are not aware whether there are coupons or other offers that may reduce the cost. Thus, consumers may not know whether their budget allows for purchase of all of the items and whether they should consider not purchasing or substituting a listed item for another item. These uncertainties also present consumers with budgeting challenges.

SUMMARY

According to one embodiment, a computer-implemented method for generating electronic shopping lists for a consumer involve generating an electronic shopping list that identifies items purchased by the consumer in the past and prices of those items. One embodiment comprises determining respective purchase intervals of a plurality of respective items purchased by the consumer from respective merchants with a purchase interval program executing on or accessed by a first computing device, respective purchase intervals being based at least in part upon respective item-level electronic transaction data representing prior purchases of respective items by the consumer. The method further comprises determining respective estimated dates when the consumer will purchase respective items again based at least in part upon respective purchase intervals with the purchase interval program, and generating an electronic shopping list for an estimated date with a shopping list program in communication with the purchase interval program. According to embodiments, the electronic shopping list includes the item identified by the purchase interval program for the estimated date and also includes a price of the identified item charged by a merchant.

Another embodiment is directed to a system for generating electronic shopping lists for a consumer and comprises an intermediate computer operably coupled to or in communication with a source of item-level transaction data through a first network and operably coupled to a computing device of a consumer through a second network, a purchase interval program and a shopping list program, which may be part of a single program or separate programs and execute on the same intermediate computer or on different computers. The purchase interval program is operable, programmed or configured to determine respective purchase intervals of a plurality of respective items purchased by the consumer from respective merchants. The purchase intervals are based at least in part upon respective item-level electronic transaction data representing prior purchases of respective items by the consumer. The purchase interval program is further configured to determine when the consumer will purchase respective items again based at least in part upon respective purchase intervals. The shopping list program is operable, programmed or configured to generate an electronic shopping list for an estimated date that includes one or more items identified by the purchase interval program for the estimated date and respective prices of the identified items that are charged by a merchant.

A further embodiment is directed to a computer program product comprising a non-transitory computer readable storage medium embodying one or more instructions executable by a computer to perform a process for generating an electronic shopping list that is based on item-level electronic transaction data of prior purchases by the consumer and that identifies items and their prices.

In a single or multiple embodiments, the electronic shopping list including item and price data is transmitted to a computing device of a consumer. The computing device may be a computer or a mobile communication device such as a cellular telephone or Smartphone, and may be transmitted as, for example, an electronic mail message or SMS message.

In a single or multiple embodiments, prices of items identified by the purchase interval program are retrieved from a price source, which may be a computer or electronic payment device of a merchant or a computer of a host that collects price data from various merchants. The received price data can be stored in a data store or database of or accessible by the intermediate computer and can be updated periodically or as needed. Thus, when the shopping list program generates an electronic shopping list including items identified by the purchase interval program, the shopping list program accesses the stored price data, searches for the identified item, and includes the item price in the electronic shopping list.

In a single or multiple embodiments, the purchase interval identifies an item that was previously purchased by the consumer and that is to be included in an electronic shopping list. One or more prices of the item are also included in the electronic shopping list and may be a price of the item offered by a merchant from whom the consumer previously purchased the identified item as determined from the item-level electronic transaction data or from a merchant not identified by the item-level electronic transaction data. The electronic shopping list may also identify the merchant such that the shopping list includes the item, price, and merchant offering the item at that price.

In a single or multiple embodiments, the electronic shopping list includes one item and one price. The shopping list may also identify the merchant offering the item at that price. In other embodiments, the electronic shopping list includes one item and multiple prices of respective merchants. The shopping list may also identify the merchants offering the item at respective prices. In yet other embodiments, the electronic shopping list includes multiple items, and one price per item. Merchants may also be identified, e.g., merchants from whom the consumer previously purchased the item. Thus, a shopping list may identify the same merchant or different merchants depending on which items are listed. In yet other embodiments, the electronic shopping list includes multiple items, and one or multiple prices for each item. The shopping list may also identify merchants offering the items at respective prices. For these purposes, price data of identified items may be received at the first or intermediate computer from various sources of price data, which may be stored and updated to reflect current prices.

Further, the shopping list program can access a source of electronic coupons or merchant discounts such that when an item to be included in a shopping list is identified, the shopping list program can access electronic coupon or merchant discount data, determine if there are any coupons or discounts applicable to the identified items and/or identified merchants, and notify the consumer of the coupons or discounts or determine a price that is discounted assuming redemption of a coupon or application of a merchant discount.

For example, the purchase interval program may identify a particular cereal that costs $3.00 at a particular merchant, determine that there is a coupon for $1.00 off, and notify the consumer of the coupon or show the price as the discounted price of $2.00 for the cereal. The electronic coupon may be displayed on the computing device such as a mobile communication device so that the coupon can be scanned by the merchant, or the shopping list program may transmit the electronic coupon or link thereto in an electronic mail, SMS or other electronic message.

As another example, the shopping list program may determine that an identified merchant has an offer that provides a $5.00 credit if a consumer spends a pre-determined or minimum amount, e.g., $75.00. If the cost of the items within the electronic shopping list for a particular merchant exceeds $75.00, the shopping list program may notify the consumer that the consumer qualifies for the $5.00 discount or apply the discount while notifying the consumer that the discount was applied. The consumer can be notified by displaying the offer or other message on a screen of the computing device or sending the offer or message as an electronic mail or SMS message.

In a single or multiple embodiments in which the shopping list program identifies multiple prices for an item, the lowest price may be selected and displayed within the electronic shopping list, and the consumer can be notified which merchant offers the item at the lowest price.

Thus, with embodiments, the same or a single person or party can implement, utilize or perform computer-implemented methods, systems and computer program products to analyze consumer item-level transaction data generated by consumer spending and generate segregated electronic shopping lists based at least in part upon analyzed data.

Further, in a single or multiple embodiments, item-level electronic transaction data, such as Level III data, is received at the intermediate computer from one or more of a computer of a financial institution at which the consumer has an account and an electronic payment device of a merchant and processed or analyzed by the purchase interval program to identify repeat item purchases, purchase intervals thereof, and estimated dates when the consumer will need to purchase the item again. One or more outputs generated by the purchase interval program are utilized by a shopping list program, which generates a plurality of shopping lists with respective items and prices thereof. The shopping lists with items and respective prices may also be segregated, separated or divided based on pre-determined criteria such as by merchant, by groups of merchants or merchant type, or by groups of items or item category. Further, a location and/or schedule of the consumer can be received or determined such that electronic shopping lists including items and respective prices can be generated based at least in part upon a location of a consumer, a schedule or calendar of the consumer or both the location and schedule or calendar of the consumer.

BRIEF DESCRIPTION OF THE DRAWINGS

The foregoing and additional aspects of embodiments are described in further detail with reference to the accompanying drawings, wherein:

The foregoing and additional aspects of embodiments are described in further detail with reference to the accompanying drawings, wherein:

FIGS. 2A-C are diagrams of embodiments of systems for generating location-based shopping lists, wherein FIG. 2A illustrates a system in which an intermediate computer is in communication with a merchant computing device to receive item-level electronic transaction data from the merchant and to receive location data from a consumer computing device, FIG. 2B illustrates a system in which an intermediate computer receives or retrieves item-level transaction data using an intermediate source or financial management system (FMS) that accesses user accounts and location data from a consumer computing device, and FIG. 2C illustrates a system in which an intermediate computer receives or retrieves item-level electronic transaction data from a merchant and accounts at financial institutions and location data from a consumer computing device;

FIG. 4 illustrates an example of a table that may be generated by a purchase interval program to store item-level electronic transaction data for specific items previously purchased by a consumer;

FIGS. 6A-C illustrate examples of how a purchase interval program may be utilized to process electronic item-level transaction data for use in generating consumer location-based shopping lists, wherein FIG. 6A is a table of item-level electronic transaction data showing prior purchase dates of various specific items, FIG. 6B, is a timeline of item purchases shown in FIG. 6A, and FIG. 6C is a table of purchase intervals for different items based upon data of FIGS. 6A-B;

FIGS. 7A-D illustrate how a shopping list program may generate different types of location-based shopping lists, wherein FIG. 7A illustrates a shopping list of items for purchase from merchants within a pre-determined distance of consumer, and FIGS. 7B-D illustrate shopping lists segregated by merchants located within a pre-determined distance of consumer;

FIGS. 10A-B illustrate one embodiment in which a shopping list program generates multiple location-based segregated shopping lists for different groups of merchants, wherein FIG. 10A illustrates a shopping list for items to be purchased from a one or more merchants of a group of grocery store merchants, and FIG. 10B illustrates a shopping list comprising items to be purchased from one or more merchants of a group of warehouse club stores;

FIGS. 11A-C illustrate embodiments in which location-based shopping lists are segregated by groups of items of the same type or category;

FIG. 14E illustrates an example of a table constructed according to one embodiment that may be utilized to generate schedule or calendar-based shopping lists, and FIG. 14F illustrates an example of a table that may be utilized to generate schedule or calendar-based shopping lists for a different day or schedule compared to FIG. 14E;

FIG. 17C illustrates one example of a table that may be utilized to generate or select shopping lists based at least in part upon a location and a calendar or schedule of the consumer;

FIGS. 20A-E are diagrams of embodiments of systems and associated databases for generating electronic shopping lists that identify items and item prices, wherein FIG. 20A illustrates a system in which an intermediate computer is in communication with a merchant computing device to receive item and price data from the merchant, and FIGS. 2B-E illustrate how item and price data may be stored and structured;

FIGS. 21A-D illustrate one embodiment in which an electronic shopping list program generates different types of electronic shopping lists that identify items and respective prices, wherein FIG. 21A illustrates an electronic shopping list of items and respective available prices and that may involve various numbers and types of merchants, and FIGS. 21B-D illustrate merchant-specific electronic shopping lists identifying items and respective prices of items offered by respective specific merchants;

FIGS. 27A-D illustrate embodiments of electronic shopping lists including item, price and coupon information, wherein FIG. 27A illustrates an electronic shopping list of items and respective available prices and applicable coupons and that may involve various numbers and types of merchants, and FIGS. 21B-D illustrate merchant-specific electronic shopping lists identifying items, respective prices of items offered by respective specific merchants and applicable coupons;

DETAILED DESCRIPTION OF ILLUSTRATED EMBODIMENTS

Embodiments are directed to computer-implemented methods, systems and computer program products for generating electronic shopping lists including item, price and/or coupon data that affects a price of an item. With embodiments, items are selected or identified based at least in part upon those items having been previously purchased by consumers as determined by item-level electronic transaction data, and electronic shopping lists are generated and include not only items identified as needing to be purchased again by the consumer, but also price and/or coupon data of those items such that the consumer is presented with the cost of each item.

FIGS. 1-18 describe systems and methods related to analysis of item-level transaction data to identify which items have been purchased by a consumer in the past, determining when those item will be needed by the consumer again, and generating electronic shopping lists including these items that can be transmitted to a computing device such as a Smartphone or computer of the consumer, and how electronic shopping lists can be generated based at least in part upon consumer location and/or schedule and/or segregated or structured in certain manners. FIGS. 19-30 describe embodiments of systems and methods that utilize certain system components and aspects of methods described with reference to FIGS. 1-18 and how electronic shopping lists according to embodiments identify items and include price and/or coupon data of identified items. Embodiments related to electronic shopping lists including items identified as being recurring purchases and prices and/or coupons for such items can also be utilized with or structured according to other embodiments related to how items are identified or selected by a purchase interval program based at least in part upon item-level electronic transaction data of prior purchases of those items, electronic shopping lists can be segregated and generated based on a location and/or electronic schedule of the consumer.

Item Level Analysis/Location-Based Electronic Shopping Lists

Figure 1:
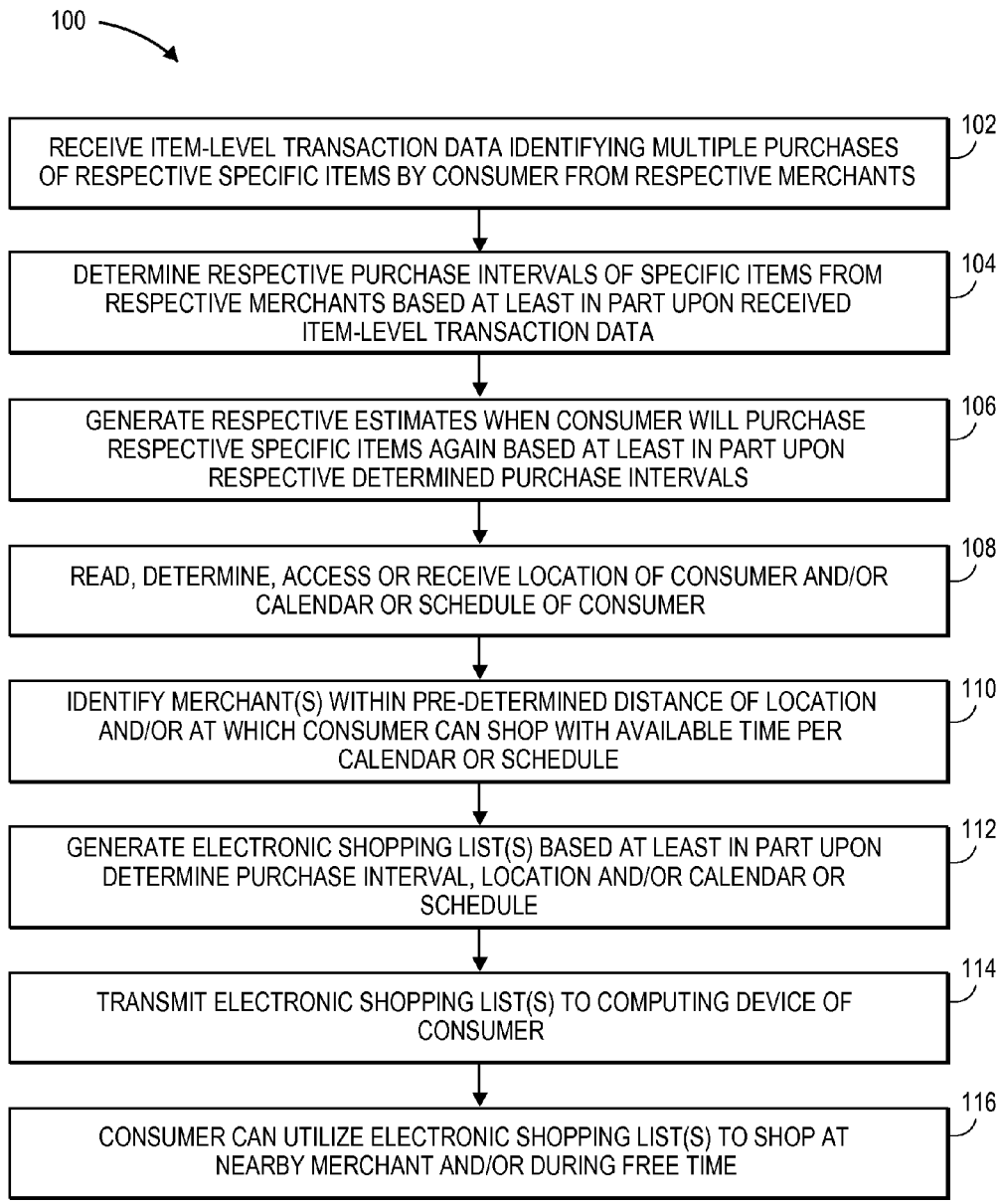
FIG. 1 is a flow chart of one embodiment of a method for generating a shopping list based at least in part upon one more of electronic item-level transaction data of prior purchases by a consumer, estimates when specific items will be needed again by the consumer, and a location and/or schedule of the consumer.

Referring to FIG. 1, a method 100 for generating electronic shopping lists based at least in part upon consumer location and/or a calendar or schedule of the consumer comprises, at 102, receiving item-level transaction data from one or more sources at a host or intermediate computer. Item-level electronic transaction data identifies multiple purchases of a specific, particular item by consumer. At 104, the time between purchases of the specific item, or the purchase interval, is determined based at least in part upon received item-level electronic transaction data. At 106, an estimate, e.g., an estimated date when consumer will purchase or need a specific item again or an estimated time or number of days from a current date, is determined based at least in part upon the last purchase date of the item and the determined purchase interval. At 108, in certain embodiments, a location and/or calendar, schedule or other manner of identifying consumer availability is read, determined, accessed or received, and at 110, merchants are identified based on being within a pre-determined distance of the consumer location or if the consumer has sufficient time to shop at the merchant. At 112, one or more electronic shopping lists are generated (or selected if already generated) based at least in part upon the location of the consumer and/or calendar or schedule of the consumer. At 114, the electronic shopping lists are transmitted to the consumer, e.g., to a computing device such as computer or mobile communication device such as a cellular telephone or Smartphone such that at 116, the consumer can then review the generated or selected shopping lists and utilize the lists to shop at merchants in the vicinity of the consumer or at a location that accommodates calendar or schedule constraints of the consumer.

Items included within electronic shopping lists are identified based at least in part upon respective item-level electronic transaction data and estimated dates and prior purchases by the consumer from the different merchants. Shopping lists are, according to certain embodiments, segregated based upon pre-determined criteria, which may be selected by the consumer, and can be sent to the consumer in the form of one or more electronic messages to a computing or communication device of consumer such that consumer has segregated or separate shopping lists that can be utilized by the consumer to purchase specific items again.

For example, a purchase interval program may determine that a consumer purchases a particular cereal weekly from a particular merchant, but purchases diapers and paper towels weekly from a different merchant. The shopping list program generates multiple shopping lists segregated according to pre-determined criteria, e.g., according to merchant name, on a weekly or other basis or for a pre-determined or selected shopping date. Multiple, segregated shopping lists generated according to embodiments include a first shopping list with the cereal for a first merchant, and at least one other shopping list with diapers and paper towels for another merchant. Certain shopping lists may be selected or generated depending on consumer location and/or calendar or schedule constraints, and the selected or generated segregated shopping lists may be sent to the consumer in the form of an electronic message, and each shopping list may include one or multiple items that may need to be purchased again. If the consumer does not need the identified item, the item in the shopping list can be ignored, and the purchase interval program can adjust for any changes in consumption behavior.

Figure 2A:
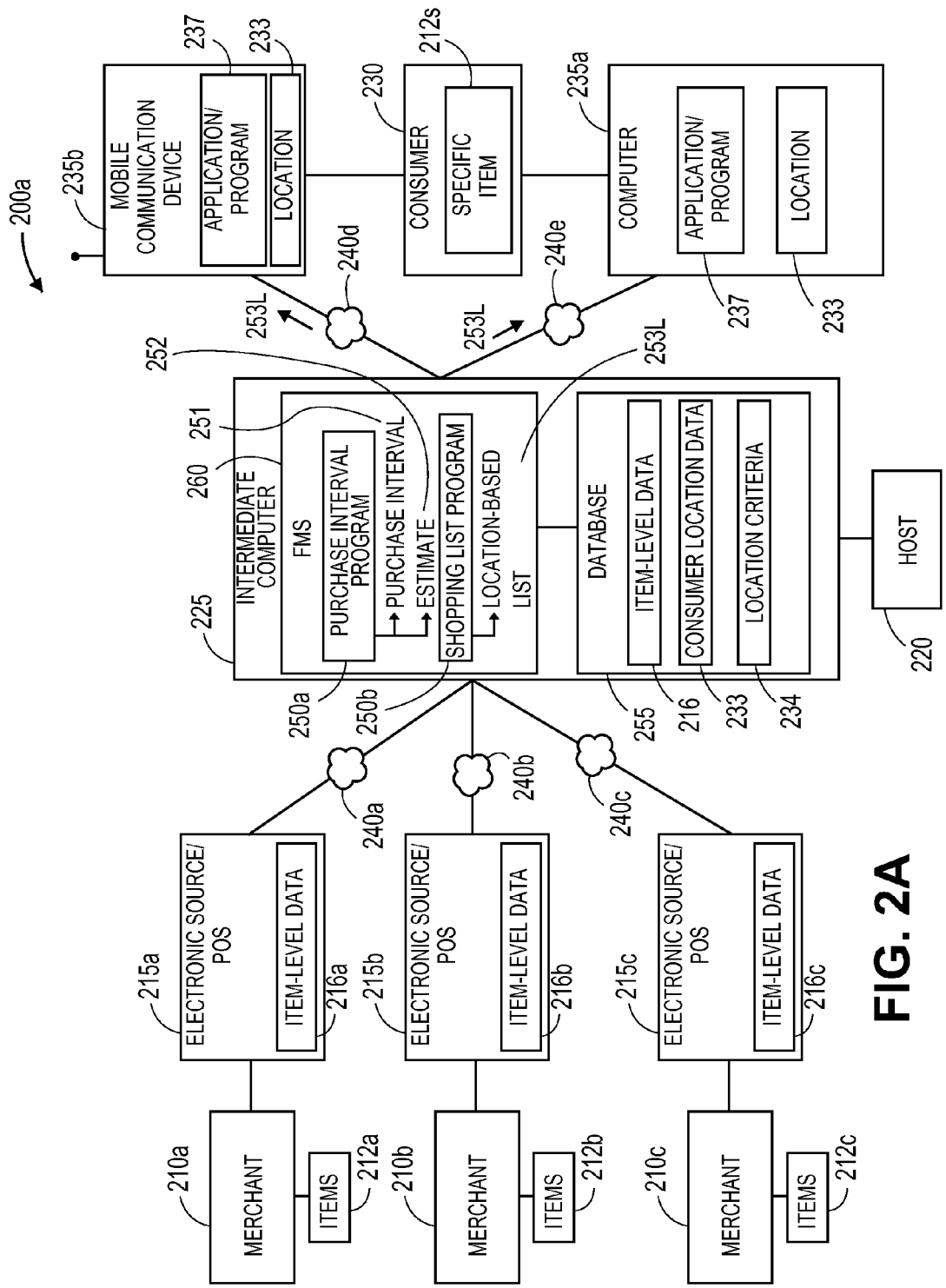

More particularly, referring to FIG. 2A, a system 200*a* (generally, system 200) constructed according to one embodiment for generating location-based shopping lists 253L according to embodiments ("L" identifying "Location-based" shopping lists) that identify recurring item purchases comprises or may involve merchants 210*a-c* (generally, merchants 210) who offer various items, goods or services 212*a-c* (generally, "items" 212) for sale, a host 220 who 3collects item-level electronic transaction data 216 from merchants 210 and other originators of such data 216, and a consumer 230 who purchases a particular or specific item 212*s* ("s" referring to "specific" item) multiple times from one or more merchants 210.

FIG. 2A illustrates multiple merchants 210 that utilize respective electronic or computing devices or sources 215*a-c* (generally, electronic source 215) of item-level electronic transaction data 216*a-c* (generally, item-level electronic transaction data 216). While FIG. 2A illustrates three merchants 210, embodiments may involve other numbers of merchants 210 and may involve different or the same merchants 210 (e.g., different merchant stores or the same merchant stores at different locations). Electronic source 215 may be an electronic payment device such as a Point of Sale (POS) payment terminal, a cash register, a computer and a scanner system utilized by merchant 210. Item-level electronic transaction data 216 is generated by electronic source 215 and represents purchases of specific item 212*s* by consumer 230.

As defined in this specification, item-level electronic transaction data 216 identifies a specific, particular item 212*s* purchased by consumer 230 (e.g., a particular type or brand of cereal such as CHEERIOS cereal or a particular type or brand of diapers such as PAMPERS diapers), and may also include other item details such as size, quantity count, etc. For example, item-level electronic transaction data 216 that specifically identifies item 212*s* may include name or brand, description, product number, product code, symbol and other identifications or item data. One example of item-level electronic transaction data 216 that may be used for this purpose is Level III data such as item quantity, item codes, descriptions and full line item details of items purchased by consumer 230.

Electronic sources 215 such as POS payment terminals are operably coupled to or in communication with intermediate computer 225 managed by host 220, an example of which is Intuit Inc. or another host 220 that collects electronic transaction or receipt data. Host or intermediate computer 225 is operably coupled to a consumer 230 device such as a mobile communication device 235*a* such as a cellular telephone, Smartphone or other mobile device capable of cellular or wireless communications, or a computer 235*b* such as a desktop or laptop home or office computer or tablet computing device capable of communicating with host computer 225 wirelessly or through a wire connection. For ease of explanation, reference is made generally to computing or communication device 235 of consumer 230.

Electronic sources 215*a-c* are operably coupled to or in communication with intermediate computer 225 through respective networks 240*a-c*, and intermediate computer 225 is operably coupled to or in communication with one or more of consumer computing devices 235*a,b* (two are illustrated as an example) through respective networks 240*d-e*. Examples of networks 240*a-e* (generally, 240) and other networks discussed herein that may be utilized for communications between system 200 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 240 generally, but various networks, combinations of networks and communication systems, methods and protocols may be utilized.

Intermediate or host computer 225 includes or accesses a purchase interval program 250*a* and a database 255 that are cooperatively operable to aggregate and store item-level electronic transaction data 216 received from electronic sources 215. In a single or multiple embodiments, purchase interval program 250*a* is a stand-alone program executing on or accessible by host computer 225. In other embodiments, the purchase interval program 250*a* is a component or module of a FMS 260, examples of which include QUICKRECEIPTS, QUICKEN, FINANCEWORKS, MINT, MICROSOFT Money, etc.), which is hosted or accessible by host computer 225. QUICKRECEIPTS, QUICKEN, FINANCEWORKS and MINT are registered trademarks of Intuit Inc.

A FMS 260 configured for use in embodiments are managed by hosts 220 with whom participating merchants 210 have agreed to provide item level-receipt data 216 associated with a particular consumer 230, e.g., using a membership card, club card as in QUICKRECEIPTS or other identifying information, or by the consumer 230 registering a credit card with the host 220 such that when item-level receipt data 216 is received at intermediate computer 225, FMS 260 can allocate the data to consumer 230. Further aspects examples of a FMS 260 that collects transaction or receipt data from merchants 210 is described in http://myquickreceipts.com; http://financeworks.com, and U.S. application Ser. No. 12/609,922, the contents of which are incorporated herein by reference as though set forth in full.

One embodiment of purchase interval program 250*a* that may be utilized in embodiments receives or accesses item-level electronic transaction data 216 from electronic sources 215 or collected and stored in database 255. Purchase interval program 250*a* comprises instructions which, when executed, analyze item-level electronic transaction data 216 to determine purchase interval 251 for specific item 212*s*, or the time between repeat purchases of a specific item 212*s*.

Host computer 225 may also include or access a shopping list program 250*b* operates with purchase interval program 250*a* and database 255 as necessary to generate or select location-based shopping lists 253L based at least in part upon a location of a consumer 230. Shopping list program 250*b* may be a stand-alone program executing on or accessible by host computer 225. In other embodiments, purchase interval program 250*b* is a component or module of FMS 260. Thus, references to purchase interval program 250*a* and shopping list program 250*b* are not intended to limit embodiments to separate programs since both programs may be integrated into a single program or part of a FMS 260.

One embodiment of a shopping list program 250b that may be utilized in embodiments receives or accesses data utilized by or output by purchase interval program 250a and/or item-level electronic transaction data 216 stored in database 255 and comprises instructions which, when executed, determine which items 212 were estimated by purchase interval program 250a to be needed or purchased again within a pre-determined time or by a certain date, generates one or multiple location-based shopping lists 253L based at least in part upon a location of consumer 230, and which may be segregated according to pre-determined criteria, and establishes a communication with consumer computing device 235 to transmit or display the location-based shopping lists 253L to consumer 230.

For purposes of determining which location-based shopping lists 253L are to be generated or selected according to a location of consumer 230, database 255 also stores, and shopping list program 250b accesses and utilizes, a consumer location 233 and pre-determined location criteria 234.

According to one embodiment, the location 233 of the consumer 230 is a current consumer 230 location, e.g., as determined by Global Positioning System (GPS) location or other location data of computing apparatus 235a of consumer 230, and the pre-determined location criteria 234 is a pre-determined or maximum distance from the current location 233 that consumer 230 is willing or able to travel.

For example, the computing apparatus 235 may be a cellular telephone or Smartphone, and location data 233 in the form of GPS data of the cellular telephone or Smartphone can be requested or retrieved by the shopping list program 250b, and consumer 230 may download an application or program 237 to the computing device 235 (e.g., from intermediate computer 250 or another source) that pushes location data 233 to intermediate computer 225 to be stored in database 255 or that transmits location data 233 in response to a request by shopping list program 250b.

In another embodiment, the computing device 235 is a component of an automobile or part of an automobile navigation system, and the current location data 233 of the GPS or navigation system of the automobile is utilized by the shopping list program 250a and stored to database 255.

Location data 233 may also be provided by consumer 230. For example, consumer 230 may launch the application or program 237 on a Smartphone to initiate receiving location-based shopping lists 253L according to embodiments, and if GPS or location data 233 is not available or if the Smartphone's GPS system is not enabled, consumer 230 may manually input location 233. Further, consumer 230 may enter data of a public transportation route (e.g. a certain train, subway or bus route) into a Smartphone using application or program 237, and then that location data 233, route and/or current location or stop, may be utilized by the purchase interval program 250a.

A current consumer 230 location may also be determined based on an IP address of the computing device 235. Further, a current consumer 230 location may be determined based on a location at which consumer 230 electronically checked in, e.g. using FOURSQAURE (foursquare.com) and GOWALLA (gowalla.com), or other location-based social networking sites that allow people to electronically "checking-in" at a venue or merchant using mobile communication device 235. Moreover, a current consumer 230 location may be specified by a location on an electronic map such as GOOGLE MAPS that is utilized or accessible by program or application 237.

Thus, embodiments may involve various types of location data 117a including GPS data (of a computing device, cellular telephone or automobile), IP address data, electronic check-in data, an electronic map and locations entered by consumer 230. Further, the location may have various degrees of specificity. A current consumer 230 location may be a particular address, an intersection, a neighborhood, zip code, city or state, as examples. Location data 117a may also have a directional component (e.g., traveling East on G Street). For ease of explanation, reference is made to a current location 117a of consumer 230 as determined by GPS data of the computing device 235 such as a mobile communication device, and pre-determined location criteria 117b being a pre-determined, selected or maximum distance from the consumer 230 location.

According to another embodiment, the location 233 of the consumer 230 is a future location or location other than a current location. For example, the consumer 230 may be planning to be in a certain area and wants to know which merchants 210 are within a certain distance of a specified location. In one embodiment, the consumer 230 executes the program or application 237 to manually enter a future location. In another embodiment in which the computing device 235 is a component of an automobile or navigation system, the future location may be a destination entered into the navigation system or a point of interest along a navigation route. The future location may also be a destination of an electronic or on-line map such as a GOOGLE map. The application or program 237 may also have access to public transportation routes, computers and timetables, and location data 233 of public transportation (e.g., a stop or route) utilized by consumer 230 may be accessed or retrieved by the application or program 237 and/or 250a as necessary. For example, a consumer 235 may enter location data 233 in the form of "Stop X on Subway Line Y" into a Smartphone, and that future location or destination data is read by the purchase interval program 250a.

Accordingly, it will be understood that embodiments may involve various types of current, future and other location data 127a including GPS data, IP address data, electronic check-in data, an electronic map and locations entered by a consumer 230. Further, the location may have various degrees of specificity. For example, a current consumer location may be a particular address, public transportation stop, an intersection, a neighborhood, zip code, city or state, as examples. Location may also have a directional component (e.g., traveling East on G Street, or South on Subway Line Y).

For ease of explanation, reference is made to a location of the consumer 230 (defined to include current and future locations determined or entered by consumer 230) based on GPS data of the computing device 235 such as a mobile communication device, and the pre-determined location criteria 127 being pre-determined, selected or maximum distance from the GPS location. The shopping list program 250b is configured to read, access, receive, request, or determine the location of the consumer 230, and also receives or accesses data utilized by or output by purchase interval program 250a and/or item-level electronic transaction data 216 stored in database 255. The shopping list program 250b comprises instructions which, when executed, determine which items 212 were estimated by purchase interval program 250a to be needed or purchased again within a pre-determined time or by a certain date, generates one or multiple location-based shopping lists 253L based at least in part upon a location of a consumer 230, and in certain embodiments, segregates the results according to pre-determined criteria such as by merchant 210, and establishes a communication with consumer computing device 235 to transmit or display the generated, segregated location-based shopping lists 253L to consumer 230.

Figure 2B:
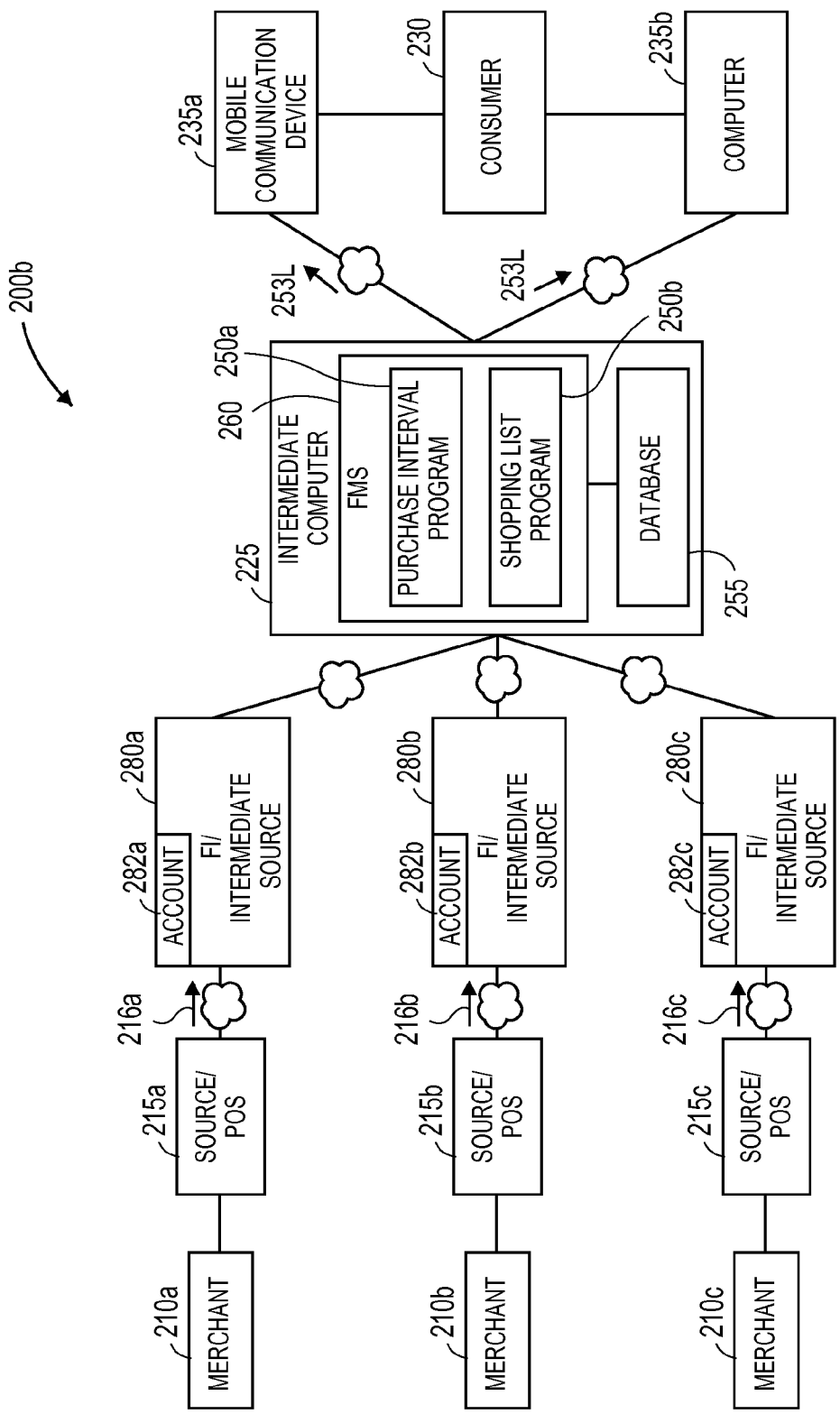

Referring to FIG. 2B, in a system 200b constructed according to another embodiment, purchase interval program 250a may be a stand-alone program or a program or module of a FMS 260 that is operably coupled to or in communication with computers of financial institutions 280a-c (generally, 280, and shown as "FI" in FIG. 2B). Consumer 230 has respective accounts 282a-c (generally, account 282) including respective item-level transaction data 216a-c at respective FIs 280a-c. Thus, rather than receiving item-level transaction data 216 from an electronic payment device 215 of a merchant 210, such data is received from an account 282 at a FI 280 such as a bank, credit card company or other FI 280 at which consumer 230 has an account 282 such as a checking, savings or credit card account including item-level electronic transaction data 216. A FMS 260 that may be utilized for this purpose include, for example, desktop or on-line FMS.

Figure 2C:
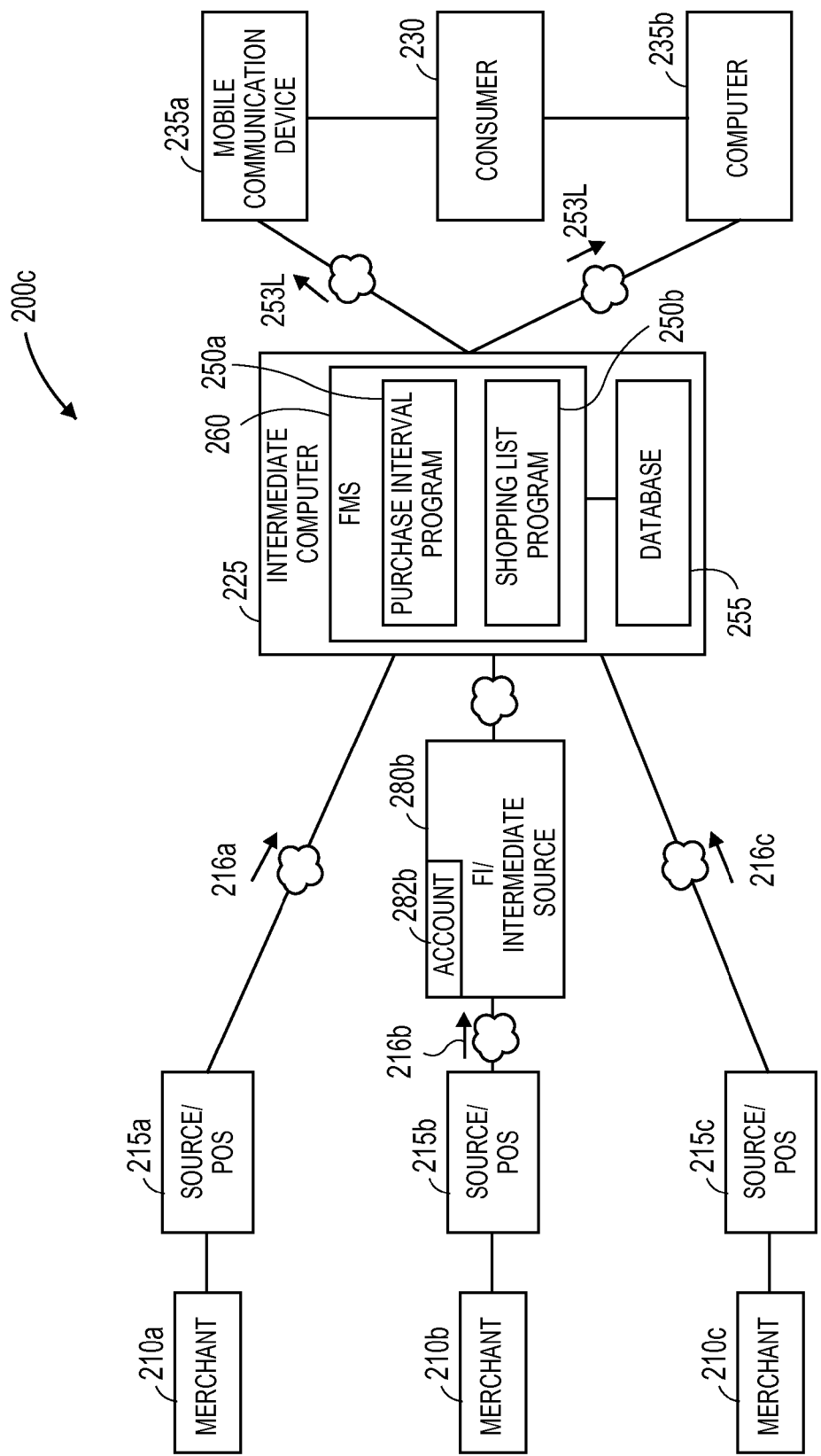

FIG. 2C further illustrates another system 200c configuration in which item-level electronic transaction data 216 is received both from an originator of the data (as shown in FIG. 2A) and through an intermediate computer or source, e.g., using a FMS 260 that is configured to receive item-level transaction data 216 from merchants 210 and from accounts 282 at FIs 280.

Thus, FMS 260 as described above with reference to FIGS. 2A-C is defined to include, any computing system implemented, on-line or web-based, system, package, program, module, or application that gathers financial data, has the capability to receive or retrieve financial data including item-level electronic transaction data 216, analyze and categorize at least part of the financial data into various reports or displays that are provided to consumer 230, and provides consumer 230 with the capability to conduct, and/or monitor, financial transactions. Further aspects of financial management systems 260 and capabilities thereof are described in U.S. application Ser. No. 12/846,701, previously incorporated by reference.

Figure 3:
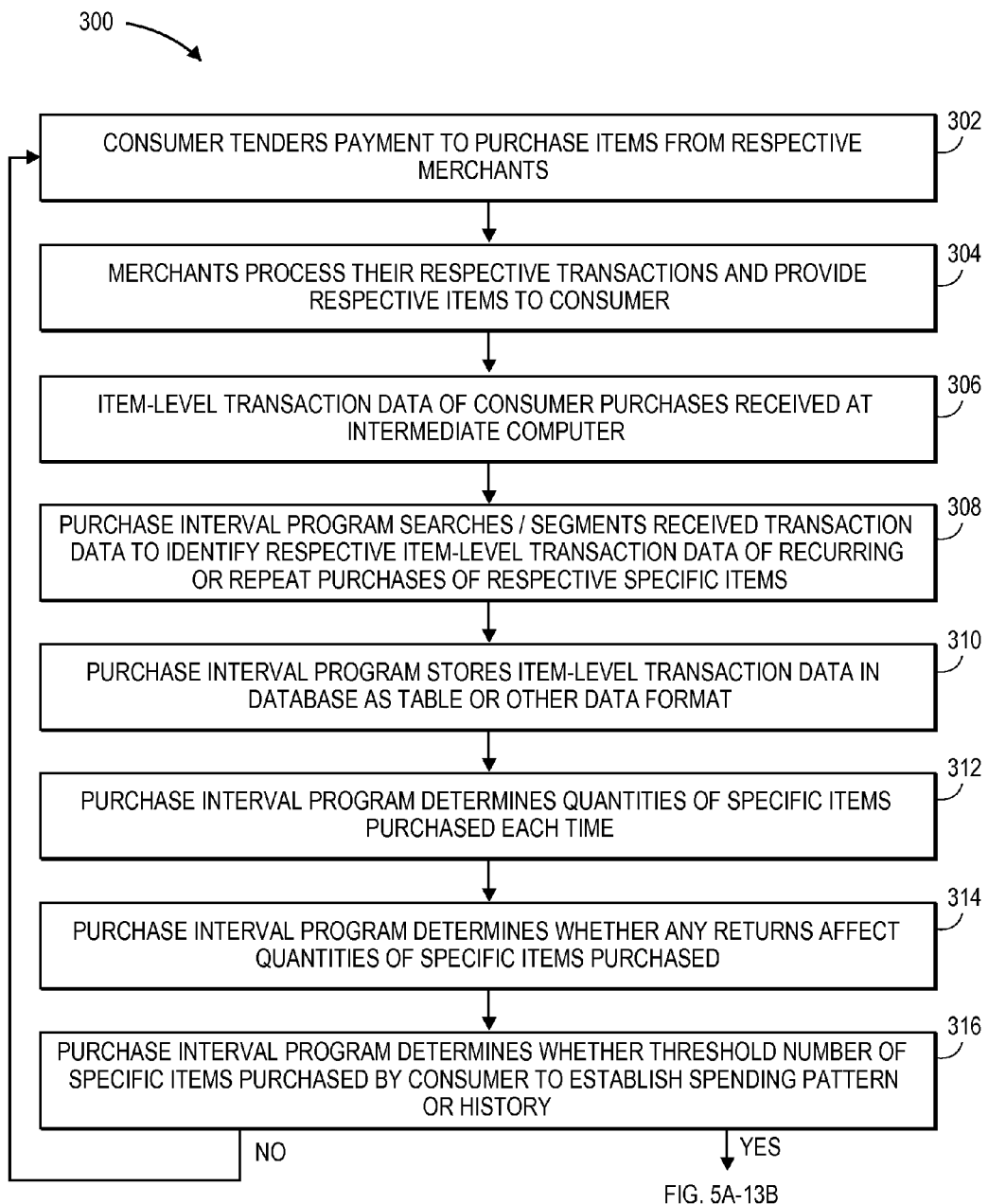
FIG. 3 is a flow chart of a method performed by a purchase interval program for processing item-level electronic transaction data to determine item purchase intervals and when an item will be purchased again by a consumer for use in generating shopping lists according to embodiments.

Referring to FIG. 3, one embodiment of a method 300 for determining purchase intervals 251 and for generating location-based shopping lists 235L that may be implemented with system 200 embodiments described above and other system configurations comprises, at 302, consumer 230 tendering payment to purchase one or more items 212 from merchant(s) 210. Payment may be made using, for example, a payment or transaction card (e.g., credit card, debit card), check, cash and other forms of payment.

Embodiments may apply to purchases of various types of items 212 by various consumers 230 including individual consumers 230 who purchase consumable goods such as groceries, healthcare or personal hygiene items, clothing, books, etc. and/or services such as dog groomer, house cleaning, car washes, dry cleaning, automobile maintenance, etc., corporate consumer and government consumers (e.g., for purchases of consumables such as office supplies, parts, materials, and other recurring purchases and services). For ease of explanation, reference is made generally to an individual consumer 230 purchasing items 212 from merchant 210, but embodiments may be used to analyze repeat purchases of various items 212 purchased by various consumers 230 including goods and/or services, and that a consumer 230 may, for example, be an individual, corporate or government consumer.

Certain embodiments may involve various types, classifications or categories of merchants 210 which, as described in further detail below, may serve as pre-determined segregation criteria to generate multiple location-based shopping lists 253L. For example, one type of merchant 210 may be "grocery store" examples of which include VONS, SAFEWAY, RALPHS, ALBERTSONS, STATER BROTHERS, JEWEL and DOMINICKS and smaller specialty or niche retail or grocery stores such as WHOLE FOODS, TRADER JOES, SPROUTS, HENRY'S. Another type of merchant 210 is "big box store," "superstore," "supercenter," "megastore" or "discount store" (generally, "big box store"), examples of which include TARGET and WAL-MART. Yet another type of merchant 210 type is "club membership store," examples of which include COSTCO and SAM'S CLUB and other club membership stores that allow consumers to shop at their club stores if consumers 230 are members or guests of members who are often required to pay an annual membership fee. Another example of a merchant 210 "type" is "on-line merchant," examples of which include AMAZON, E-BAY and websites of merchants 210. While embodiments are described with reference to examples of types or categories of merchants 210, it will be understood that there may be other merchant 210 types and sub-types, and that merchants 210 noted above may be of a different type or category for purposes of segregation or separation according to embodiments.

Continuing with FIG. 3, at 304, merchant 210 processes the transaction and provides purchased item(s) 212 including a specific item 212s to be tracked to consumer 230. If consumer 230 pays with a payment card, the payment card is swiped through POS payment terminal 215, which generates item-level electronic transaction or receipt data 216 for the purchase. A paper or electronic mail receipt identifying the item 212 purchased is also is provided to consumer 230. Merchant 210 may also manually enter item-level electronic transaction data 216 into POS payment terminal 215 (e.g., if consumer 230 pays cash). Item-level electronic transaction data 216 generated or entered by merchant 210 may be Level III data.

Item-level electronic transaction data 216 is stored electronically by merchant 210, and 302-304 are repeated at various times such that consumer 230 purchased the same item 212s multiple times. This may occur over a matter of days, weeks, months, years or other durations of time, with the result that consumer 230 purchases the same, specific item 212s multiple times.

At 306, item-level electronic receipt data 216 is transmitted from POS payment terminal 215 or another associated merchant computer or source to intermediate computer 225. Intermediate computer 225, e.g., using a FMS 260 such as QUICKRECEIPTS, receives and aggregates item-level electronic receipt data 216 including data related to multiple purchases of the same item 212s by consumer 230. Embodiments may also involve item-level electronic receipt data 216 that is received at the intermediate computer 225 from consumer 230 or generated based on data provided by consumer 230. For example, consumer 230 may have received an e-mail confirmation or receipt from merchant 210 identifying the particular item purchased, and that e-mail can be forwarded to intermediate computer 225 and analyzed to identify item-level electronic transaction data 216. Further, consumer 230 may photograph or scan the paper receipt and send it to intermediate computer 225. Consumer 230 may also send the paper receipt to host 220, which photographs or scans the receipt to generate item-level electronic transaction data 216. For this purpose, Optical Character Recognition (OCR) and other text recognition methods may be utilized to read data of the paper receipt. For example, embodiments may involve sources of item-level or Level III data such as receipt repositories such as neatreceipts.com, which provide services for scanning receipts, performing OCR processing, and storing receipts.

In the embodiments described above, the system configuration shown involves intermediate computer 225 and purchase interval program 250a or FMS 260 receiving item-level electronic transaction data 216 from an originator of the data, e.g., from POS payment terminals 215a-c of subscribing or member merchants 210a-c. Other embodiments may involve intermediate computer 225 or purchase interval program 250a receiving or retrieving item-level electronic transaction data 216 from another source.

Thus, in a single or multiple embodiments, item-level electronic transaction data 216, such as Level III data, identifies purchases of specific, particular items 212s by item name, description, serial number, code, symbol or other specific item identifier and may identify a particular brand or provider of cereal, diapers, and various services. Item-level electronic transaction data 216 may be received from one or multiple sources, which may be the same type or different types of sources. For example, in various embodiments, the sources are different stores of the same merchant 210, different merchants 210, a financial management system 260 or program that collects item-level electronic transaction data 216 from participating merchants 210 and/or that accesses consumer 230 accounts to receive or retrieve such data. Item-level electronic transaction data 216 may also be provided by or retrieved from a merchant 210 and a FI 280, a merchant 210 and a financial management system 260, a financial management system 260 and a FI 280, and other combinations of sources of item-level electronic transaction data 216.

As an example, item-level electronic transaction data 216 is received from a first source such as a first merchant 210 having a first electronic payment device 215 and from whom consumer 230 purchased an item 212s a first time, and from a second source such as a second merchant 210 having a second electronic payment device 215 and from whom consumer 230 purchased the same item 212s a second time. This data may be collected by a financial management system 260 that is operably coupled to or in communication with electronic payment devices 215 of merchants 210.

Referring again to FIG. 2A and with continuing reference to FIG. 3, at 308, purchase interval program 250a searches or segments transaction data 216 received at or retrieved or generated by intermediate computer 225 to identify recurring purchases of a specific item 212s. For this purpose, purchase interval program 250a may search for specific item 212s identifiers such as name, description, product codes, etc. At 310, item-level electronic transaction data 216 of recurrent purchases of specific item 221s is stored in database 255 as a table or other data format and may be for one or multiple consumers 230.

For example, referring to FIG. 4, purchase interval program 250a may generate a table 400 including item-level electronic transaction data 216 for each consumer 230 that includes a column 402 for consumer identification (e.g., name, user name or registration number with the system), a column 404 for purchase date, a column 406 for item identification (such as item name, description, product code, etc.), and a column 408 for quantity of items purchased. In the illustrated example, some of the items are recurring purchases (four purchases by consumer 1 involve recurring purchases whereas purchases by other consumers do not). FIG. 4 illustrates that this consumer 230 purchased item 212s during five different shopping trips since one item was purchased each time in this example.

Referring again to FIG. 3, at 312, purchase interval program 250a determines the quantity of specific items 212s purchased during a pre-determined time, e.g., items 212s purchased every week, every two weeks, every month, every two months, and other times, which accounts for consumer 230 purchasing one or multiple specific items 212s at a time.

At 314, if necessary or as needed and if return data is available, purchase interval program 250a determines whether any returns of specific items 212 affect the quantity of specific items 212 purchased and consumed or to be consumed and that is to be used in determining a purchase interval 251.

At 316, in certain embodiments, purchase interval program 250a determines whether a minimum or threshold number of specific items 212s has been purchased or purchased within a certain time. This may be done to establish an acceptable spending history on the specific item 212s. For example, embodiments may be configured such that an acceptable spending history is established with three, four, five or other numbers of purchases of the same specific item 212s.

If purchase interval program 250a determines that there has not been the threshold or minimum number of purchases of the same item 212s, then the purchase interval program 250a waits for additional purchases and the method goes back to 302. If purchase interval program 250a determines that there have been a sufficient number of purchases of the same item 212, then the method 300 proceeds to FIG. 5A.

Figure 5A:
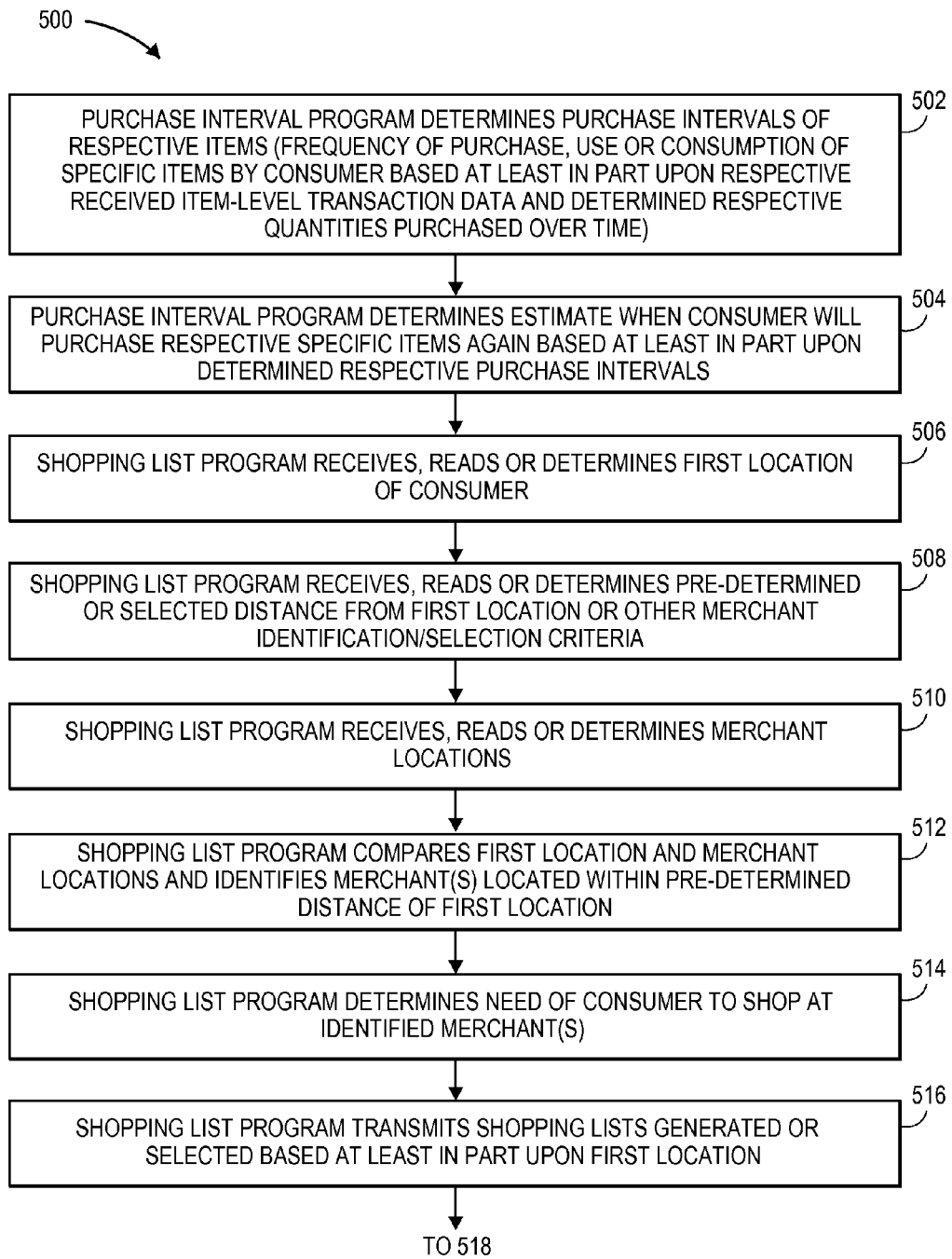
FIG. 5A is a flow chart of one embodiment of a method for processing item-level electronic transaction data to determine when items will be purchased again and to generate a shopping list including at least one of those items based at least in part upon consumer location.
Figure 5A:
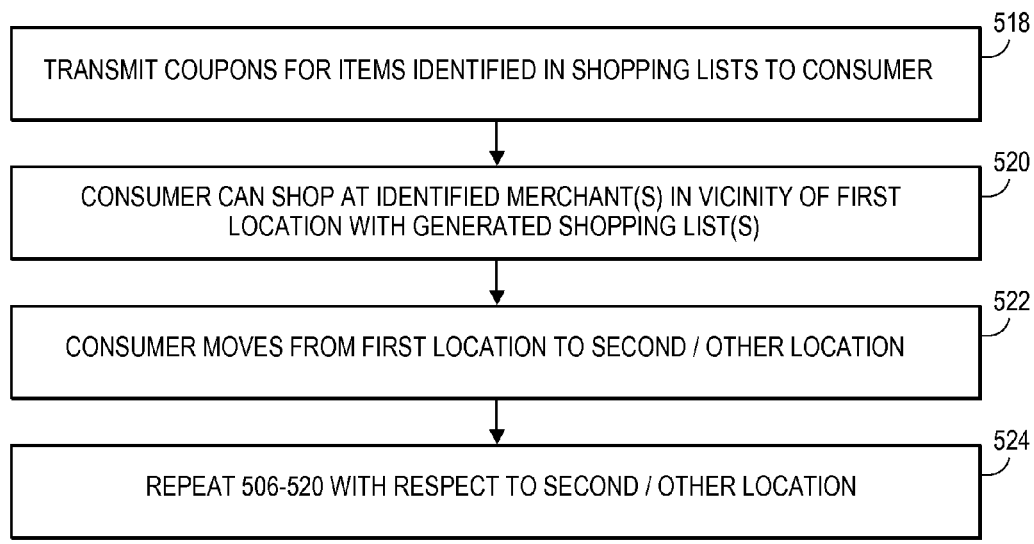

Referring to FIG. 5A, at 502, purchase interval program 250a determines or estimates purchase interval 251, which estimates the frequency of purchase or rate of consumption of specific item 212s by consumer 230. This determination is based at least in part upon received item-level electronic transaction data 216 and the determined quantity of specific items 212s purchased over a time.

For example, 502 may involve determining an average number of days between purchases of the specific item 212s, which indicates or approximates how quickly that item 212s is consumed and when that item 212s needs to be purchased again. Thus, purchase intervals 251 for different specific items 212s may vary since different specific items 212s are consumed at different rates.

At 504, purchase interval program 250a estimates when consumer 230 will purchase specific item 212s again based at least in part upon determined purchase interval 251. For example, purchase interval program 250a may indicate a particular estimated date 252 by which specific item 212s will be consumed or a number of days or weeks from a current date. The estimated date may also be a pre-determined or selected date, e.g., a weekend day when consumer 230 typically shops, and purchasing needs are made with respect to the estimated or pre-determined date. This estimated date 252 may be based upon the last date the specific item 212s was purchased and the determined purchased interval 251. These determinations are repeated such that purchase interval program 250a analyzes and generates a purchase interval 251 for each item 212s specifically identified by item-level transaction data 216, generates respective estimated dates 252 when consumer 230 will need to purchase those items 212s again. Purchase intervals 251 of different items 212s may be the same or different, and estimated dates 252 generated by purchase interval program 250a may be the same or different depending on purchase intervals 251 and the last time each item 212s was purchased.

FIGS. 6A-C illustrate a more detailed example of how purchase intervals 251 and estimated dates 252 may be determined. Referring to FIG. 6A, item-level electronic transaction data 216 received at host computer 225 may be searched and organized in the form of a table 600. In the illustrated embodiment, table 600 includes data related to an example involving weekly purchases from May 1 to June 5 of four specific items 212 by consumer 230: Cereal 1 (e.g. CHEERIOS), Cereal 2 (e.g., RAISIN BRAN), Diapers (e.g., PAMPERS) and Paper Towels (e.g., BRAWNY), as identified by item name, description, product code, etc. of the received item-level electronic transaction data 216. Data of each item 212s is provided in respective columns 602a-d of table 600. In this example, rows of table 600 include purchase dates of each item 212s spanning six weeks. Cereal 1 (C1) was purchased each week, Cereal 2 (C2) was purchased three of the six weeks (every other week), Diapers (D) were purchased three of the six weeks, and Paper Towels (PT) were purchased two of the six weeks. For ease of explanation of this example, it is assumed that consumer 230 purchased one of each item at each time. A timeline 610 further illustrating these weekly purchases is illustrated in FIG. 6B.

Purchase interval program 250a determines purchase interval 251 of each of the four specific items 212s based on historical item-level electronic transaction data 216. As shown in FIG. 6C, these determinations are summarized in a table 620 indicating that purchase interval 251a of Cereal 1 (CHEERIOS) is 7 days or one week, purchase interval 251b of Cereal 2 (RAISIN BRAN) is 14 days or two weeks, purchase interval 251c of Diapers (PAMPERS) is also 14 days or two weeks, and purchase interval 251d of Paper Towels (BRAWNY) is 21 days or three weeks. In the illustrated example, purchase intervals 251b,c of Cereal 2 (RAISIN BRAN) and Diapers (PAMPERS) are the same even though RAISIN BRAN and PAMPERS s were purchased at different times due to considering the average number of items 212s purchased over the same time.

Referring again to FIG. 5A, at 506, and according to embodiments, shopping list program 250b receives, reads, or determines a first location 233 of the consumer 230, at 508, receives, reads or determines pre-determined criteria 234 with respect to the first location 233 (e.g., a maximum or selected distance from the first location 233), and at 510, receives, reads or determines locations of merchants 210. The merchants 210 may be merchants from which consumer 230 has purchased items in the past (e.g., that were the subject of purchase interval determinations) or other merchants 210 from which items could be purchased (e.g., such as COSTCO, TARGET or RALPH'S, which has many different types of items for sale).

At 512, the shopping list program 250b compares the consumer location 233 and the location of the merchant 210 or reads the appropriate data within column 560 to determine whether the merchant 210 is sufficiently close to the location 233 of the consumer 230 to identify merchants 210 that are within the pre-determined distance 234 of the consumer 230. At 514, for these identified merchants 210, the shopping list program 250b determines whether the consumer 230 needs to shop at the identified merchants 210, e.g., based on the results generated by the purchase interval program 250a for a particular merchant 210 and/or based on item-level electronic transaction data 216 for a particular merchant 210. If the consumer 230 has a need to shop at a merchant 210 within the pre-determined distance 234 of consumer 230, at 516, the shopping list program 250b transmits the generated or selected location-based shopping lists 253L (and may also transmit electronic coupons at 518 if available). For example, a location-based shopping list 253L may be sent to computing device 235 of consumer 230 in the form of an e-mail or SMS message or displayed to consumer 230 in advance of or on an estimated date 252 or in response to consumer 230 request such that, at 520, consumer 230 is prepared to purchase identified items from identified merchants 210 in the vicinity of the consumer location 233.

Referring to FIGS. 5A-B, 506-516, may involve the shopping list program 250b maintaining, updating and accessing a table or other data structure stored in database 255. In the illustrated embodiment, a table includes rows for various merchants 210 and columns for different types of data including a merchant identifier 550 (such as merchant 210 name or other identifier), merchant location 552 (e.g., expressed as GPS data, address, intersection, city, zip code or other location data) and first consumer location 554a (generally, consumer location 554), examples of which include locations based on GPS data, address, intersection, city, zip code or other location data depending on desired specificity, distances between merchant location and the consumer location 556, pre-determined or selected criteria 558 such as a desired or maximum distance from consumer 230 that consumer is willing or able to travel, whether a merchant location satisfies the pre-determined criteria 234, e.g., whether the merchant is within the pre-determined distance 560, whether there are any location-based shopping lists 253L that can be provided to the consumer 230 for the current date or other particular or selected date, e.g., whether the purchase interval program 250a determined that the consumer 230 was due to purchase certain items, and whether, based on the location data 233 and related comparisons, whether a location-based shopping list 253L is provided to the consumer 564.

In the embodiment illustrated in FIG. 5B, column 562 indicates that based on the purchase interval and estimates generated by the purchase interval program 250a,x3 one or more location-based shopping lists 253L can be generated for consumer 230 to shop at Merchants 1-4. However, with further reference to FIG. 5C, since Merchants 3-4 are farther than the pre-determined or maximum distance 218 (1 mile in this example), they are not considered (generally illustrated as "X" in FIG. 5C), leaving Merchants 1-2, which are 0.8 mile and 0.5 mile respectively from the location 233a of consumer 230. Thus, certain embodiments utilize consumer and merchant locations to filter which location-based shopping lists 253L are to be provided to the consumer 230 such that in this example, location-based shopping lists 253L for Merchants 1 and 2 are transmitted to the computing device 253 of the consumer 230.

Figure 5D:
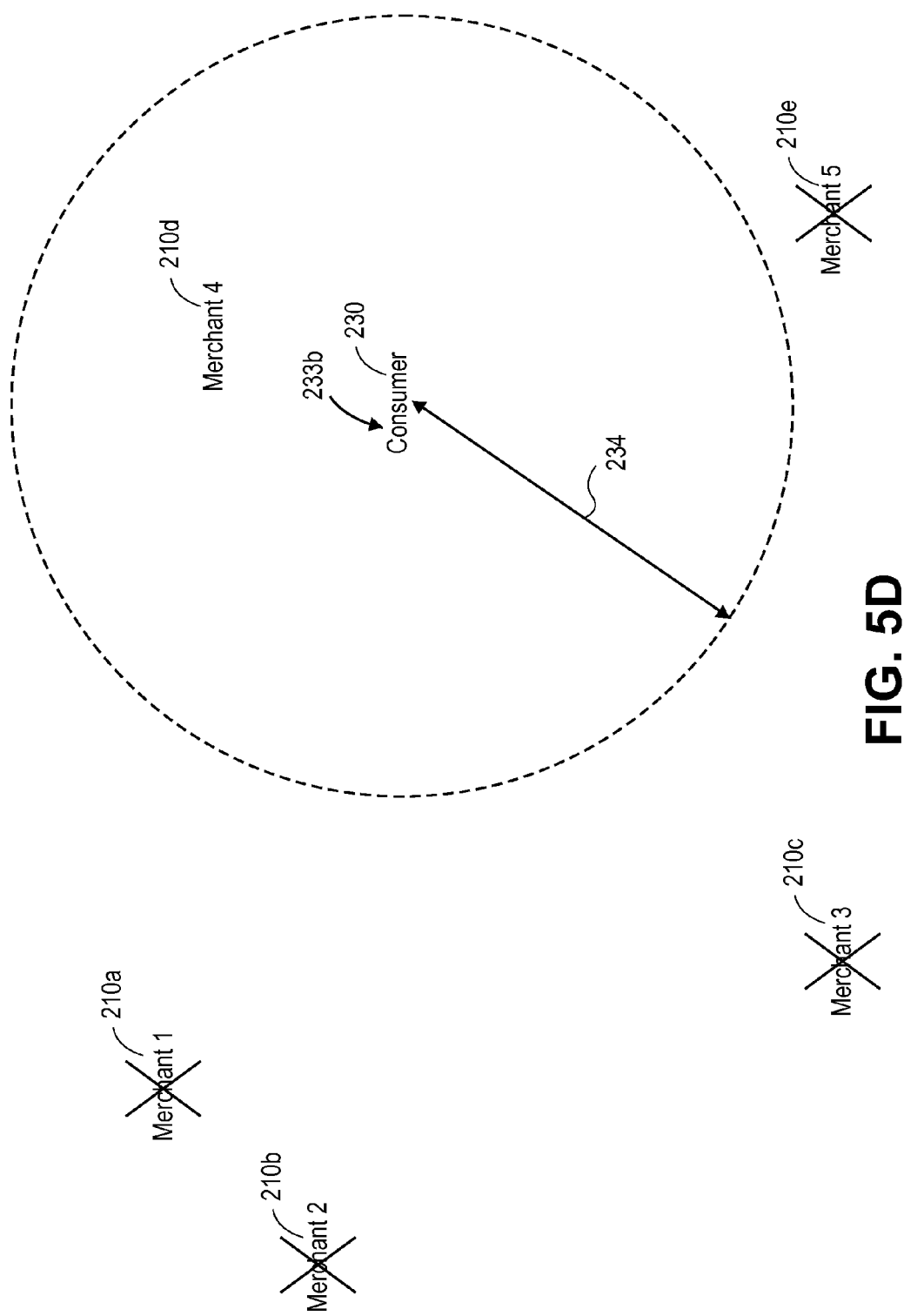
FIG. 5B illustrates a table constructed according to one embodiment that may be utilized to generate location-based shopping lists, FIG. 5C generally illustrates merchant locations relative to a consumer location and a pre-determined or minimum distance from the consumer location, FIG. 5D generally illustrates the consumer moving from a first location to a second location and different merchants being identified for location-based shopping lists.
FIG. 5E illustrates a table that may be utilized to generate location-based shopping lists and that includes data for the second consumer location.

Referring again to FIG. 5A, and with further reference to FIGS. 5D-E, the consumer 230 may move from an initial or first location 233a to a different, second location 233b, in which case, process components 506-520 of FIG. 5A are repeated with respect to the second location 233b which, in the example illustrated in FIGS. 5D-E, results in a location-based shopping list 253L for Merchant 4 being transmitted to computing device 253 of consumer 230. Thus, even though purchase interval program 250a identified items to be purchased on an estimated date from Merchants 1-4, Merchants 1-3 and 5 are too far away from the consumer 230 such that a location-based shopping list 253L for only Merchant 4 is transmitted to consumer 230. It will be understood that embodiments may involve various numbers of consumer 230 and merchants 210, locations 233 and pre-determined distances 234, and that FIGS. 5A-E are provided for purposes of illustrating one manner in which embodiments could be implemented.

Figure 7A:
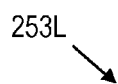
Figure 7B:
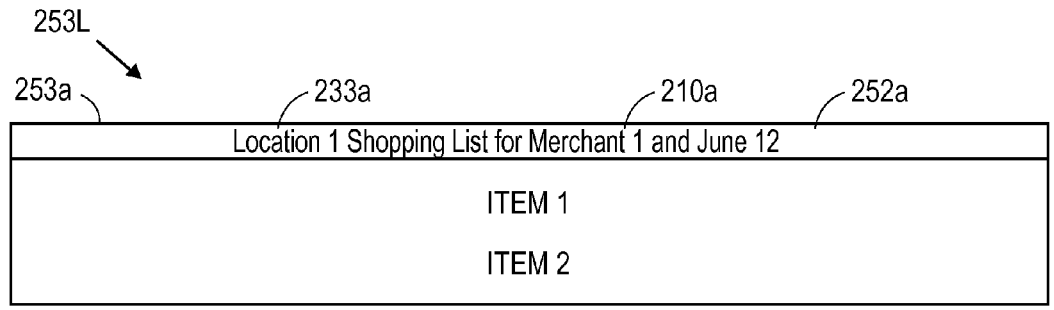
Figure 7C:
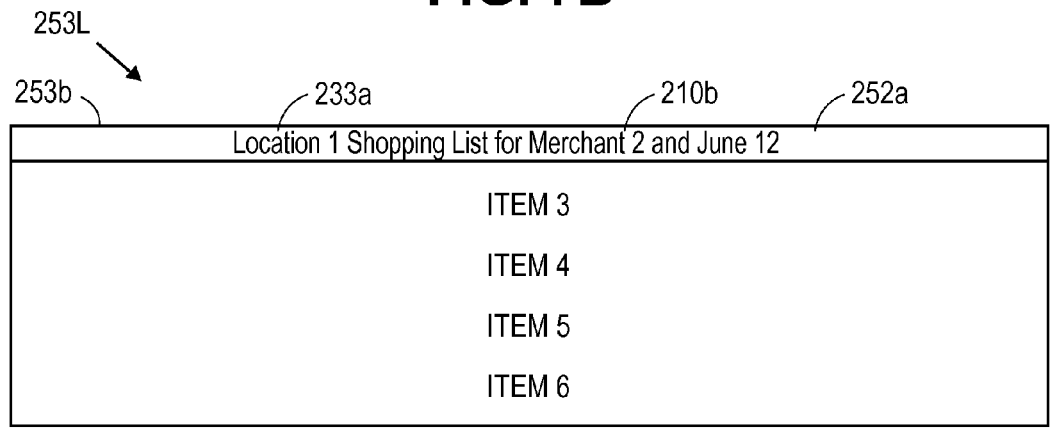
Figure 7D:
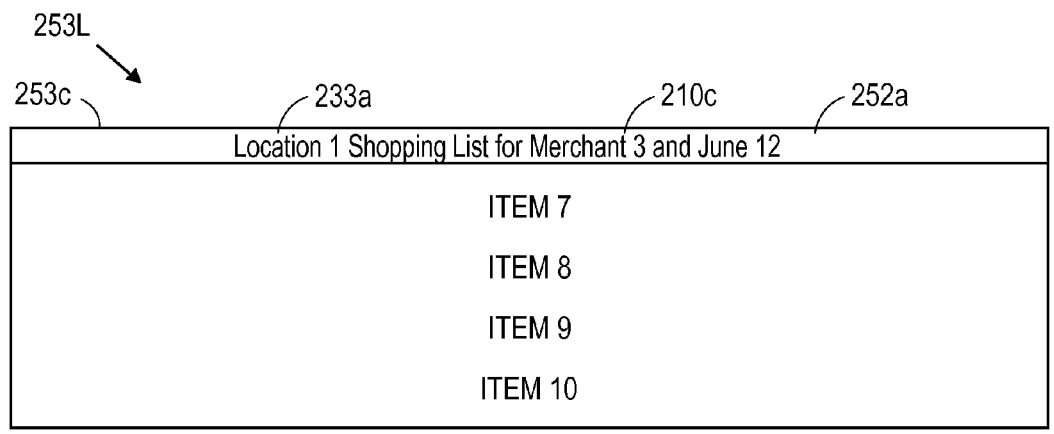

Referring to FIG. 7A, according to one embodiment, a location-based shopping list 253L provided to the consumer 230 and includes items identified by purchase interval program 250a that were determined to be needed by an estimated date. In the illustrated embodiment, the location-based shopping list 253L is not merchant specific.

In other embodiments, location-based shopping lists 253L are based on the results generated by the purchase interval program 250a but categorized or segregated by, e.g., merchant 210, such that the consumer 230 is aware of which merchants 210 are in the area and from which the consumer 230 may have purchased items in the past. For example, referring to FIGS. 7B-D, according to another embodiment, rather than generating a single location-based shopping list 253L for a first estimated dates 252a (generally, estimated date 252) including all items 212 identified by purchase interval program 250a for that estimated date 252, embodiments utilizing shopping list program 250b are operable to analyze recurring purchases of specific items 212s, merchants 210 from whom those purchases were made, and generate multiple location-based shopping lists 253L that are segregated or separated according to pre-determined segregation criteria.

According to one embodiment, shopping list program 250b is operable to generate merchant-specific shopping lists 253 for each merchant 210 from whom recurring item 212 purchases have been made. Thus, in the embodiment generally illustrated in FIGS. 7B-D, shopping list program 250b generates multiple location-based shopping lists 253L for a given estimated date 252a and based at least in part upon prior purchases of items 212 from various merchants 210. In the illustrated embodiment, for a given estimated date 252a (e.g. June 12), shopping list program 250b generates a first location-based shopping list 253a with certain items 212 (e.g., ITEMS 1-2) to be purchased from a first merchant 210a, a second location-based shopping list 253b identifying other items 212 (e.g., ITEMS 3-6) to be purchased from a second merchant 210b, and a third shopping list 253c identifying additional items 212 (e.g., ITEMS 7-10) to be purchased from a third merchant 210c. According to one embodiment, each location-based shopping list 253a-c is specifically tailored to identify items 212 that were previously purchased by consumer 230 and from those respective merchants 210 such that first shopping list 253a includes ITEMS 1-2 that consumer 230 previously purchased from Merchant 1 210a, second shopping list 253b includes ITEMS 3-6 that consumer 230 previously purchased from Merchant 2 210b, and third shopping list 253c includes ITEMS 7-10 that consumer 230 previously purchased from Merchant 3 210c.

A location-based shopping list 253L may list items for purchase on the estimated date 252 as described above, and in other embodiments, a location-based shopping list 253 also identifies the quantity of items to be purchased. The quantity may be based at least in part upon the determined purchase interval and/or estimated date for which the location-based shopping list 253L is generated. For example, if it is determined that consumer 230 utilizes one box of cereal per week, a shopping list 253 generated for the following week would indicate "1" box of that cereal, whereas a shopping list 253 generated for an estimated date 252 of two weeks may indicate "2" boxes of that cereal. It will be understood that a shopping list 253 may include various items and/or quantities determined utilizing data such as the determined purchase interval and/or estimated date, and for ease of explanation, reference is made to location-based shopping lists 253 generally or location-based shopping lists 253 that list items.

Figure 8A:
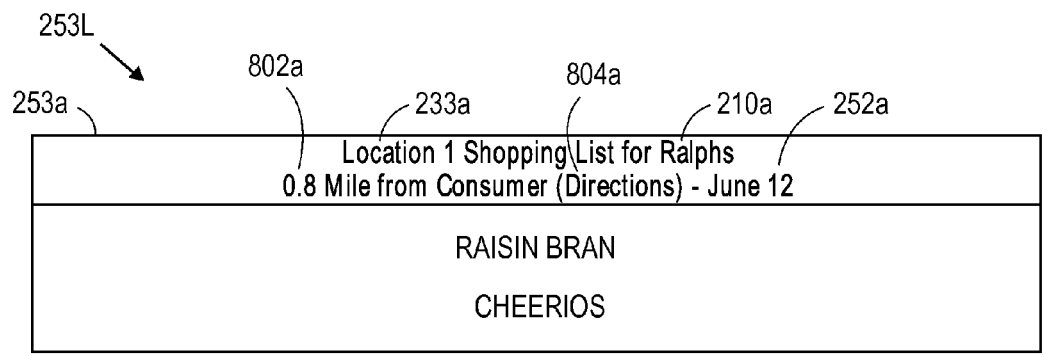
FIGS. 8A-B illustrate examples of how location-based segregated shopping lists can be generated for an estimated date for merchants of the same type and based at least in part upon consumer location.
Figure 8B:
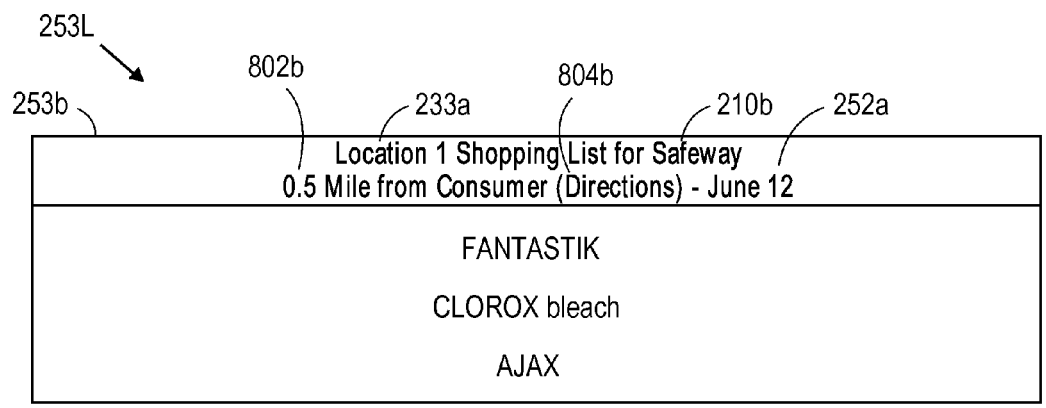

Referring to FIGS. 8A-B, one example of how embodiments may be implemented involves generation of multiple location-based shopping lists 253L for a given estimated purchase or need date (e.g., June 12) for merchants 210 of the same type or category (e.g., merchant type "grocery store"). A first location-based shopping list 253a (FIG. 8A) is generated for items (CHEERIOS and RAISIN BRAN cereals) to be purchased from RALPHS grocery store 210a, and a second location-based shopping list 253b (FIG. 8B) is generated for meat and seafood items (steaks, hamburgers, salmon and shrimp) items to be purchased from SAFEWAY grocery store 210b.

FIGS. 8A-B also illustrate that location-based shopping lists 253L may indicate the respective distances 802a (0.8 miles) and 802b (0.5 mile) to respective merchants 210a (Ralphs) and 210b (Safeway). Further, FIGS. 8A-B illustrate that location-based shopping lists 253L may include directions or hypertext links 804a-b to directions from the consumer location to merchants 210a,b.

Thus, shopping list program 250b is operable to generate multiple location-based shopping lists 253L for different grocery stores at which consumer 230 has shopped in the past and bought respective items 212 identified in respective shopping lists 253a-b. There may be various reasons for consumer's prior shopping activities or preferences, e.g., consumer 230 may believe the quality of the meat seafood is better at SAFEWAY than other grocery stores, or RALPHS may have better or more frequent sales on cereal. Further, while embodiments are described with reference to three examples of grocery store merchants 210, it will be understood that embodiments may involve other numbers of lists for other numbers of grocery stores including, for example, VONS, STATER BROTHERS, JEWEL, DOMINICKS, WHOLE FOODS, TRADER JOES, SPROUTS, HENRY'S, etc.

Figure 8C:
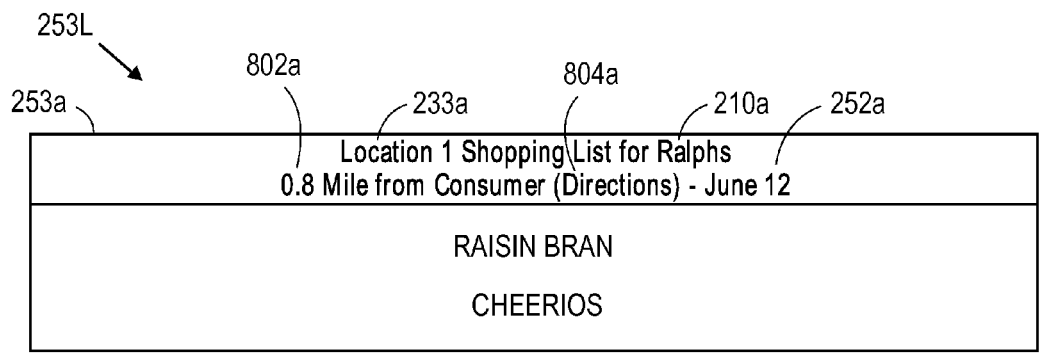
FIGS. 8C-D illustrate examples of how location-based segregated shopping lists can be generated for an estimated date for different types of merchants.
Figure 8D:
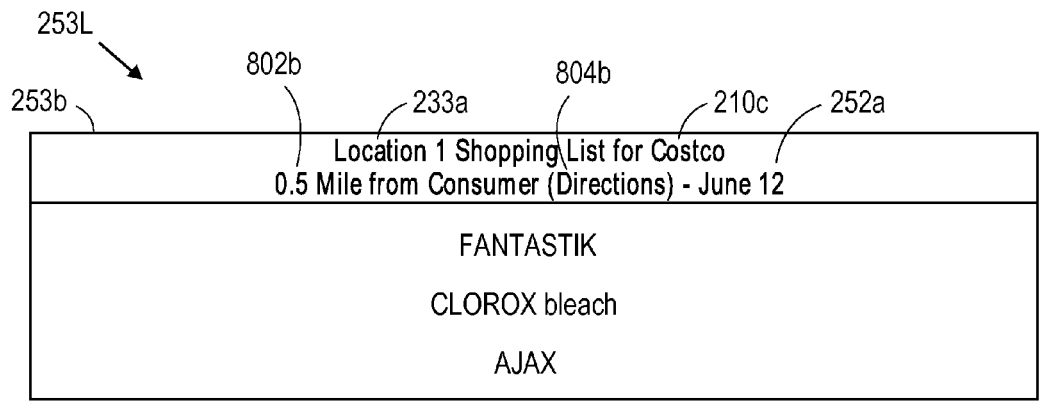

Referring to FIGS. 8C-D, another example of how embodiments may be implemented involves generation of multiple location-based shopping lists 253L (e.g., two shopping lists 253a-b) for different types of merchants 210 rather than all of the location-based shopping lists 253L being for the same type of merchant 210 as in FIGS. 8A-B. In the illustrated embodiment, a first location-based list 253a (FIG. 8C) is generated for items (CHEERIOS and RAISIN BRAN cereals) to be purchased from a RALPHS grocery store 210a (as discussed above with reference to FIG. 8A), and a second location-based list 253b (FIG. 8D) is generated for cleaning products (FANTASTIK, CLOROX and AJAX) items to be purchased from Costco (club membership store).

Thus, certain embodiments are configured to generate multiple location-based shopping lists 253L for the same or different numbers and types of merchants 210. Further, FIGS. 8A-D illustrate how electronic item-level transaction data 116 can be used to generate multiple, segregated location-based shopping lists 253L that identify a specific item by name or brand or that specific items that are identified can be categorized such that a shopping list 253L that is generated identifies categories or types of items rather than identifying items by name or brand.

While embodiments are described with reference to two merchants 210 (as described with reference to FIG. 5C), it should be understood that embodiments may involve other numbers of location-based shopping lists 253L for other numbers of merchants 210, which may be the same type of merchant 210 or different types, such as grocery stores, club membership stores, other numbers of big box stores or superstores, or other types of merchants 210 and combinations thereof. Moreover, while FIGS. 8C-D illustrate an example involving location-based shopping lists 253L for one grocery store and one club membership store such that there are certain merchants 210 of the same type and at least one merchant 210 of a different type, other embodiments may involve different numbers and combinations of different types of merchants 210 or each of the location-based shopping lists 253L being for a different type of merchant 210. Thus, FIGS. 8A-D are provided as illustrative examples of how different embodiments may be implemented to generate segregated location-based shopping lists 253L for the same type or different types of merchants 210.

Figure 9A:
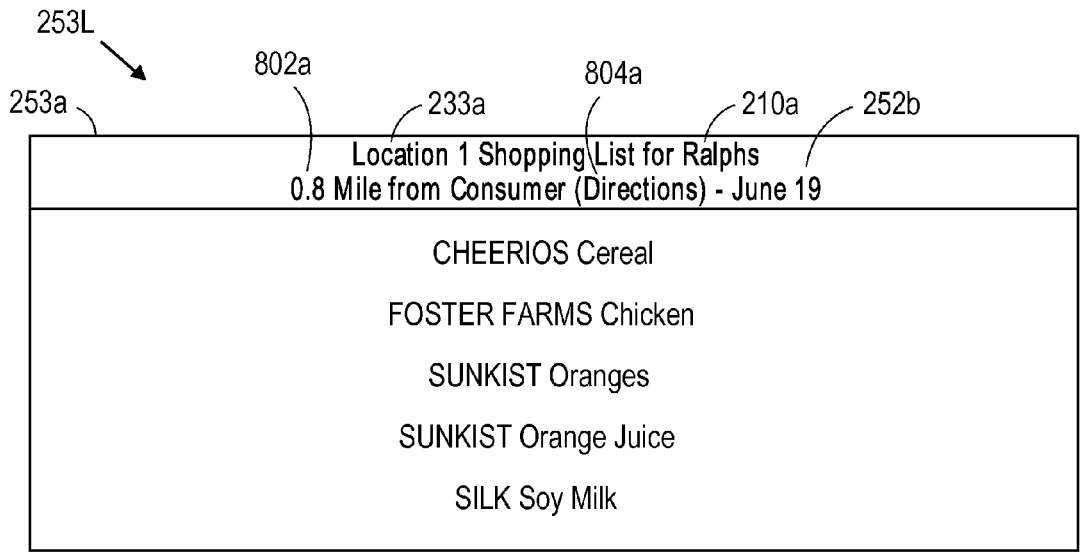
FIGS. 9A-B illustrate examples of how location-based segregated shopping lists may change for different estimated dates.
Figure 9B:
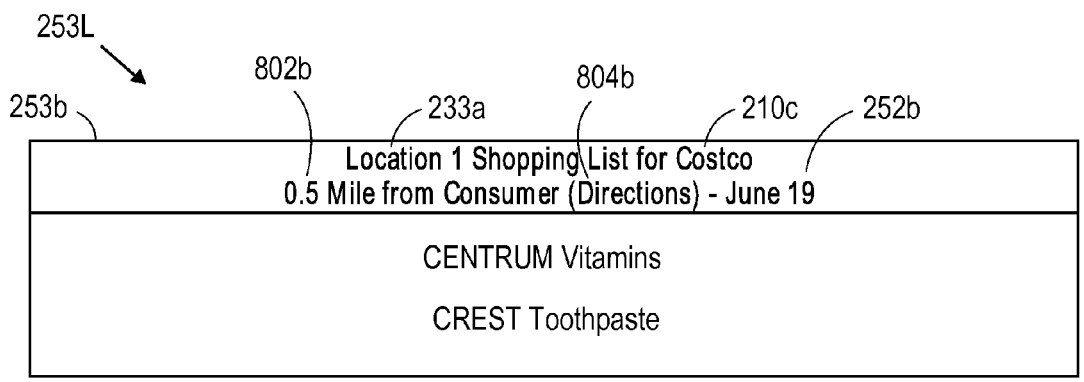

FIGS. 9A-B further illustrate how multiple, segregated location-based shopping lists 253L generated according to embodiments are dynamic and change over time depending on purchase needs of the consumer 230. FIGS. 9A-B illustrate two location-based shopping lists 253a-b for two merchants 210a-b, at least one of which is a different type relative to the others. FIGS. 9A-B illustrate how consumer 230 needs as determined by purchase interval program 250a change from week to week or other time period, and location-based shopping lists 253L generated according to embodiments also change. For example, while it was determined that consumer 230 needed CHEERIOS cereal and other items on a first estimated date 252a of June 12 from RALPHS, on estimated date 252b of June 19, it was determined by purchase interval program 250a that consumer 230 did not need CHEERIOS cereal but needed other items, and these different needs are reflected in different shopping lists 253. Thus, FIGS. 9A-B generally illustrate how embodiments may be utilize to generate multiple location-based shopping lists 253L segregated on a merchant-specific basis, and how lists for each merchant 210 may be adjusted for different estimated or shopping dates.

Figure 10A:
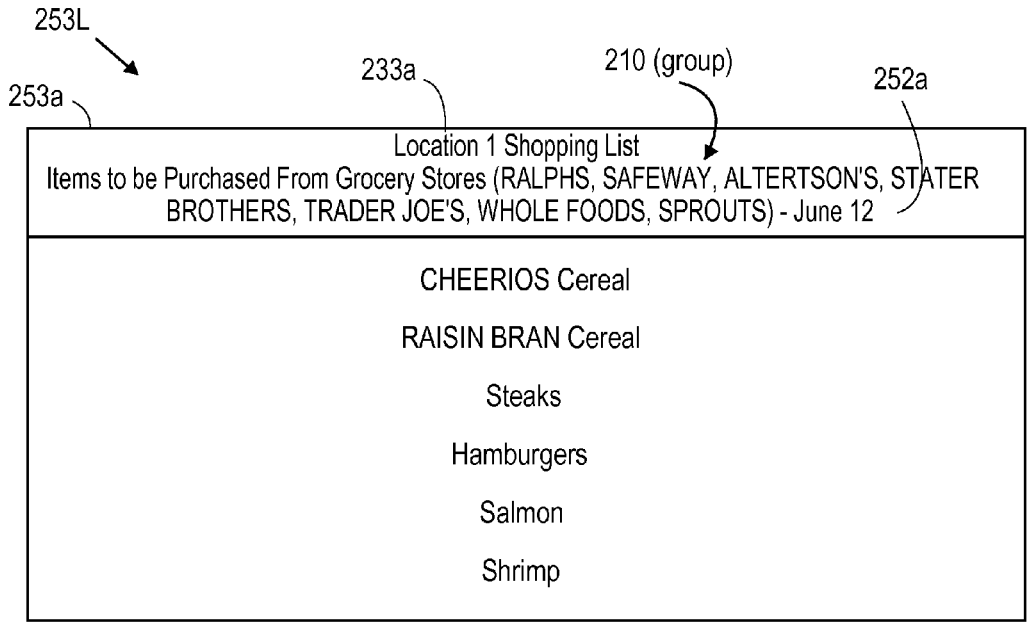
Figure 10B:
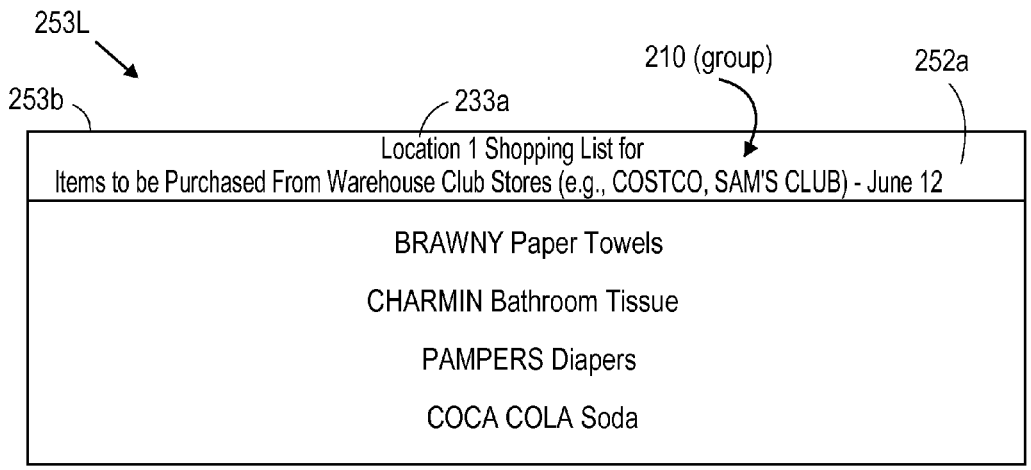

Referring to FIGS. 10A-B, according to another embodiment, location-based shopping lists 253L may be for specific, individual merchants 210 and/or one or more location-based shopping lists 253L may be generated for groups of merchants 210, e.g., a group of the same type of merchants 210. For example, FIG. 10A illustrates a first location-based shopping list 253a including items to be purchased from one or more merchants 210 of a first group 1000a, and a second location-based shopping list 253b including items to be purchased from one or more merchants 210 of a second group 1000b. Thus, rather than generating a location-based shopping list 253L specifically for RALPHS or specifically for COSTCO, a first location-based shopping list 253a may include items to be purchased from RALPHS or other identified merchants 210 of the same type and in the group 1000a, e.g., SAFEWAY, ALBERTSON'S, STATER BROTHERS, etc. and a second location-based shopping list 253b may include items to be purchased from COSTCO or other merchants 210 of the same type, e.g., SAM'S CLUB, etc. that are grouped together with COSTCO in shopping list 253b.

In this manner, for example, two separate location-based shopping lists 253a,b for merchants 210 within the pre-determined distance 234 of consumer 230 of the same type or within the same group 1000 of merchants 210 can be merged together or consolidated such that items 212 that may be in different shopping lists 253 for different specific merchants 210 are segregated based on merchant type and included in the same shopping list for a group 1000 of merchants 210. Embodiments directed to generating location-based shopping lists 253L based on groups 1000 of merchants 210 may be helpful if, for example, there are various grocery stores in consumer 230's area or consumer 230 is traveling to a different area with the same or different grocery stores.

FIGS. 11A-C illustrate embodiments in which multiple location-based shopping lists 253L are generated as described in embodiments above, except that location-based shopping lists 253L may be segregated by type of item, and a location-based shopping list 253L may identify a specific item. For example, FIG. 11A shows a location-based shopping list 253a for "cereal" and location-based shopping list 253b for "cleaning supplies." A location-based shopping list 253 may include specific items and/or types or categories of items to be purchased from particular merchants 210. For example, FIG. 11C shows a shopping list 253c with types of "fruits and vegetables." These types of lists may be helpful when a consumer 230 is in a particular section of a store so that items to be purchased in that particular section are included within a single location-based shopping list 253L. Such lists may also be segregated by merchant 210. For example, a "cleaning supplies" shopping list 253 may be generated for a warehouse club store, whereas a "fruits and vegetables" shopping list may be generated for a grocery store.

Figure 12:
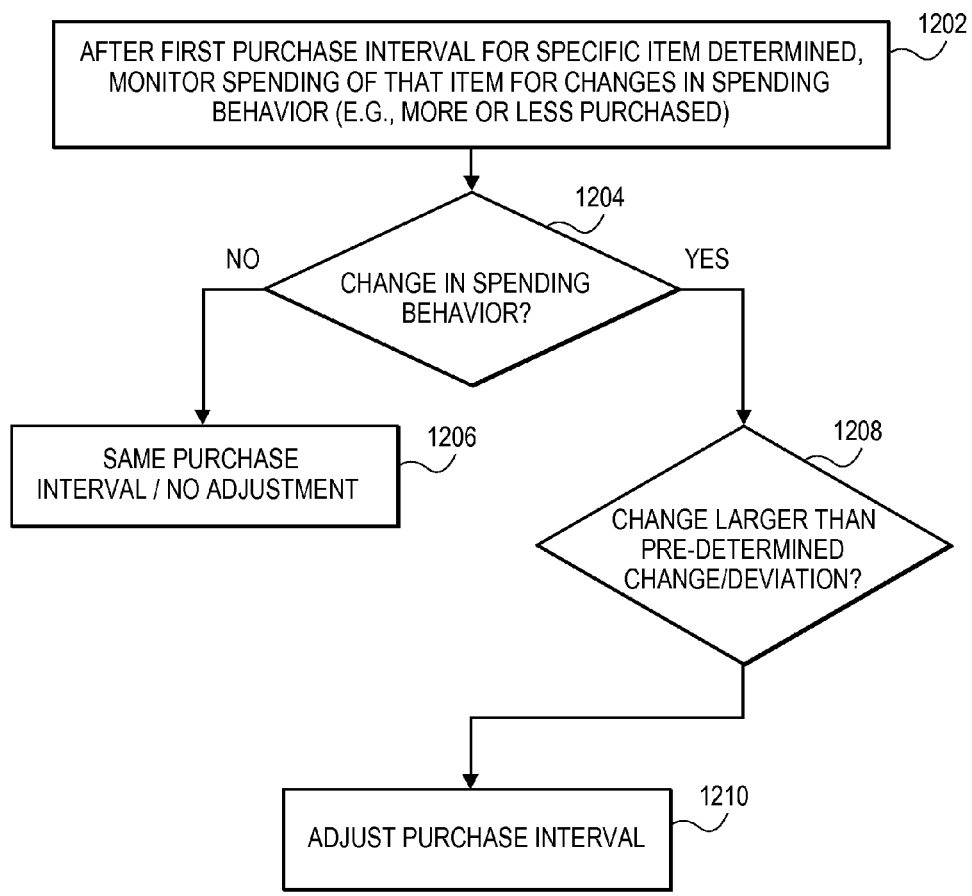
FIG. 12 is a flow chart of one embodiment of a method for monitoring consumer purchases after determination of a purchase interval to dynamically adjust purchase intervals based upon changes of consumer purchases of specific items.

Referring to FIG. 12, embodiments may also utilize a feedback to dynamically adjust purchase interval 251 based on changes in consumer 230 spending on a specific item 212s. For example, if a consumer 230 purchases diapers once every two weeks, consumer 230 may have had another baby, thus requiring additional diapers and resulting in consumer 230 purchasing diapers every week rather than every other week.

More particularly, at 1202, after purchase interval 251 is determined based upon an acceptable number of prior purchases, purchase interval program 250a continues to monitor consumer 230 spending on that specific item 212s. At 1204, purchase interval program 250a determines whether there is a change in spending behavior over time on that item 212s. If not, then at 1206, the original purchase interval 251 for that item 212s continues to be utilized. However, if a change in purchasing a specific item 212s has been detected, the original purchase interval 251 may continue to be used or be adjusted automatically as purchase activity changes. In other embodiments, purchase interval 251 is adjusted only if the change is sufficiently large and deviates from "normal" fluctuations thus indicating a substantial change in spending on the specific item. Thus, in these embodiments, at 1208, purchase interval program 250a determines whether purchase interval 251 change is greater than a pre-determined amount. If not, then the original purchase interval 251 continues to be utilized. If so, then at 1210, purchase interval program 250a can adjust purchase interval 251, e.g., based upon an average number of items 212s purchased during a certain time as discussed above.

In one embodiment, purchase interval 251 is changed upon determining a change of spending on a particular item 212s. According to another embodiment, purchase interval program 250a analyzes item-level electronic transaction data 216 to determine whether there is a minimum or threshold number of purchases of the new spending pattern before changing the purchase interval 251.

Figure 13A:
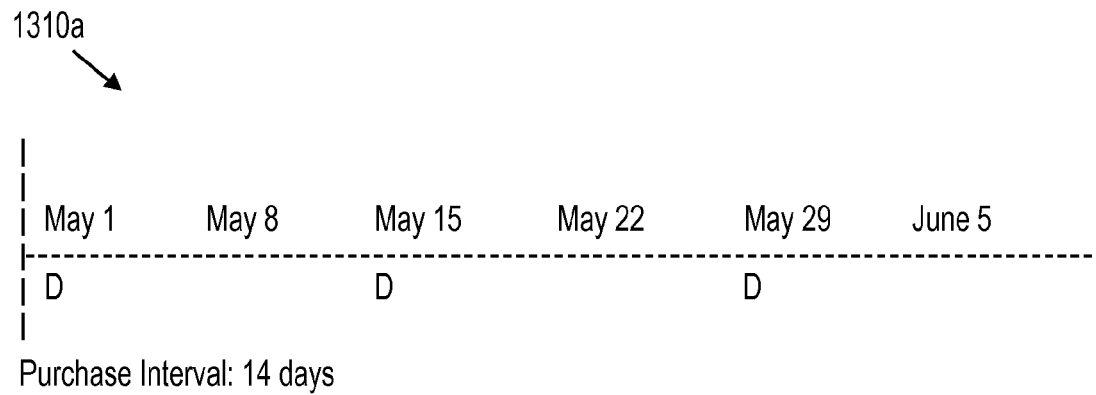
FIGS. 13A-B illustrate an example of how a purchase interval may be dynamically adjusted to reflect consumption changes.
Figure 13B:
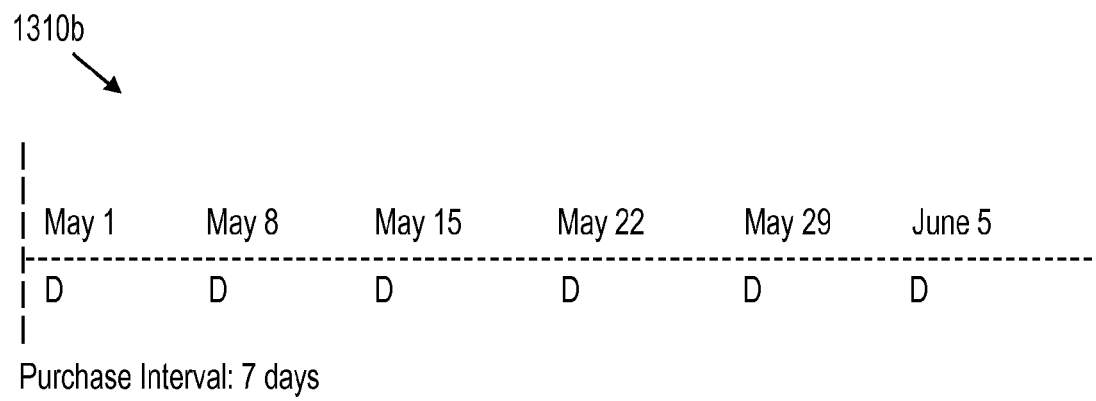

For example, referring to the timeline 1310a shown in FIG. 13A, and continuing with the example of consumer 230 purchasing diapers, consumer 230 initially purchased diapers on average once every two weeks. However, referring to the timeline 1310b shown in FIG. 13B, consumer 230 had another baby and now purchases diapers every week or purchases twice the quantity at the original purchase frequency. This change is detected by purchase interval program 250a, and purchase interval 251 is dynamically adjusted to reflect additional diaper purchases and such that message or shopping list 253 provided to consumer 230 will be updated to reflect more frequent diaper purchases. These purchase interval 251 changes or adjustments are then analyzed by shopping list program 250b such that shopping lists 253m generated according to embodiments are adjusted and updated accordingly.

While certain embodiments described with reference to FIGS. 1-13 relate to location-based shopping lists 253L including specific items 212s purchased by a particular consumer 230, embodiments may apply to monitoring item-level spending and notifying multiple consumers 230n, e.g., two, three, ten, hundreds and thousands of consumers 230 who participate in a purchase tracking program of the host 220 or who purchase or sign up for the purchase interval program 250a and shopping list program 250b so that respective consumers 230 can receive respective location-based shopping lists 253 based on their respective purchase history and analysis performed by purchase interval program 250a.

Schedule-Based Electronic Shopping Lists

Figure 14A:
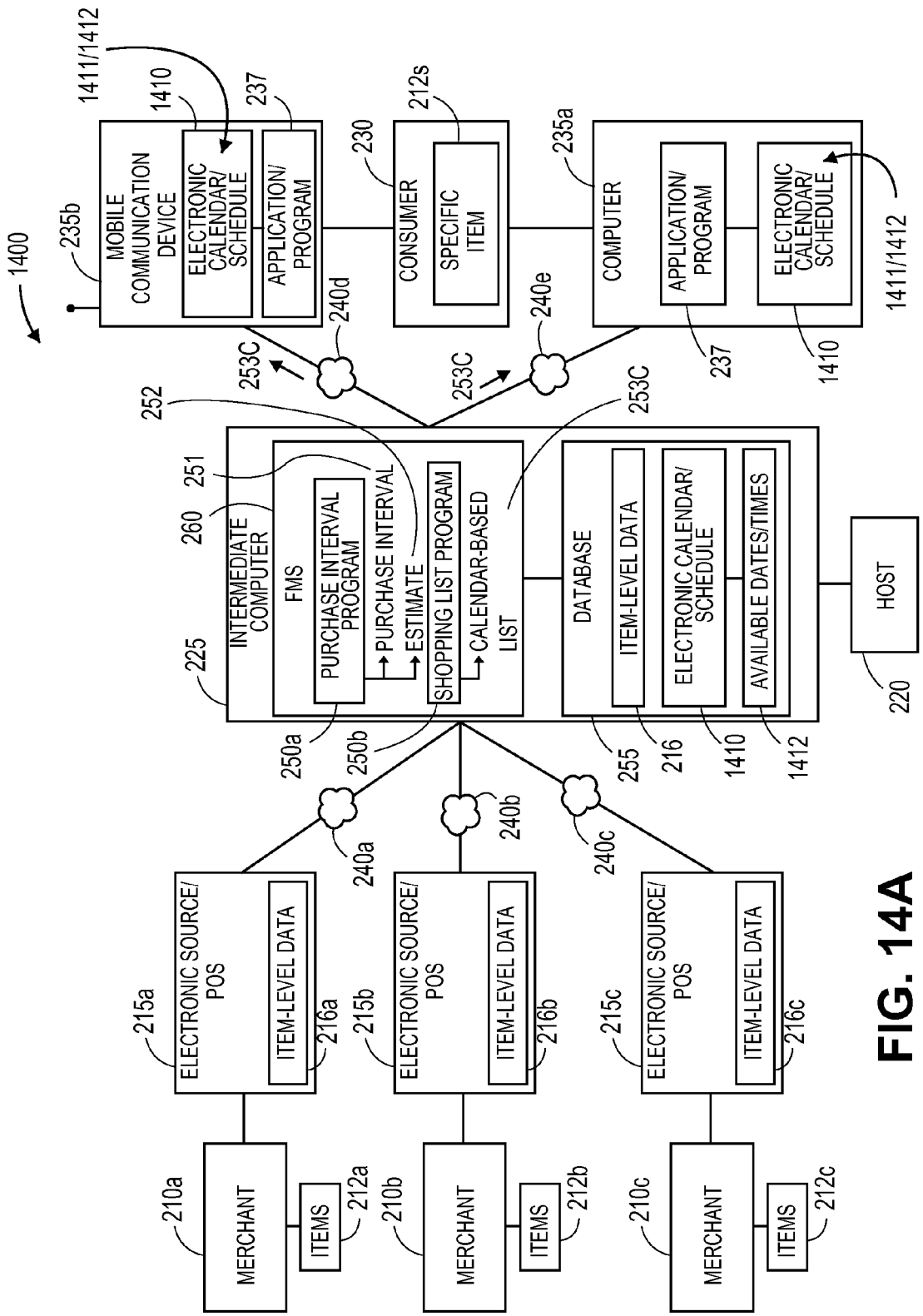
FIG. 14A is diagram of a system constructed according to one embodiment for generating schedule or calendar-based shopping lists.

Referring to FIGS. 14A-F, a system 1400 constructed according to another embodiment is directed to utilizing shopping list program 250b to generate shopping lists 253C that account for a calendar, schedule, or available time of the consumer 230 ("C" identifying "Calendar-based" or schedule-based shopping lists). For this purpose, as shown in FIG. 14A (noting that other system configurations using components shown in FIGS. 2B-C may also be utilized), shopping list program 250b and/or the application or program 237 executing on computing device 235 are configured or operable to read, determine or access an electronic schedule or calendar 1410, which indicates which dates and/or segments of time (e.g., 15, 30 or 60 minute increments) during which consumer 230 is busy (e.g. with work, meetings, travel, etc.) and which dates and/or times the consumer 230 is free and does not have other commitments.

Figure 14B:
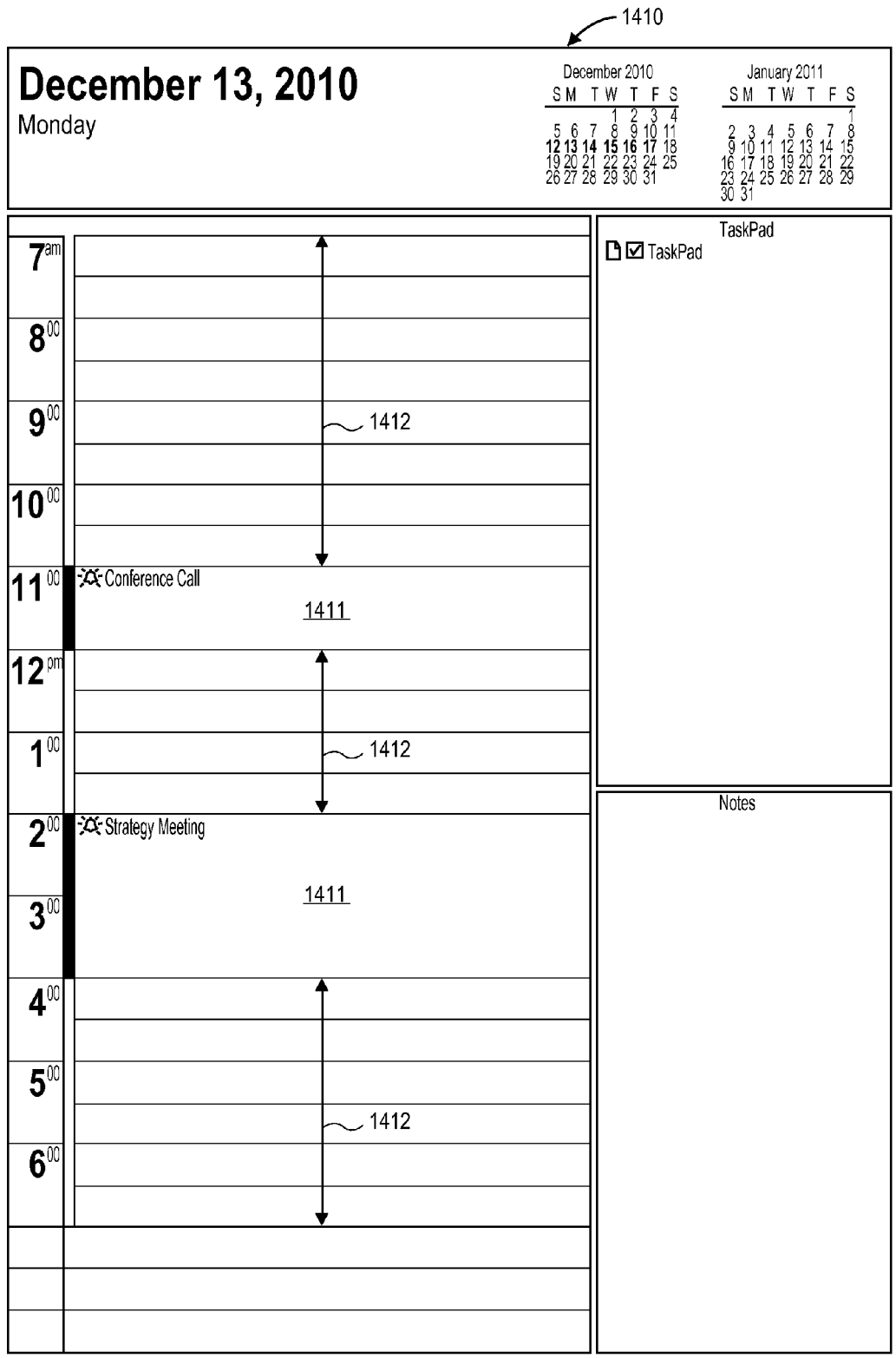
FIGS. 14B-C illustrates examples of an electronic calendar that indicates available time.
Figure 14C:
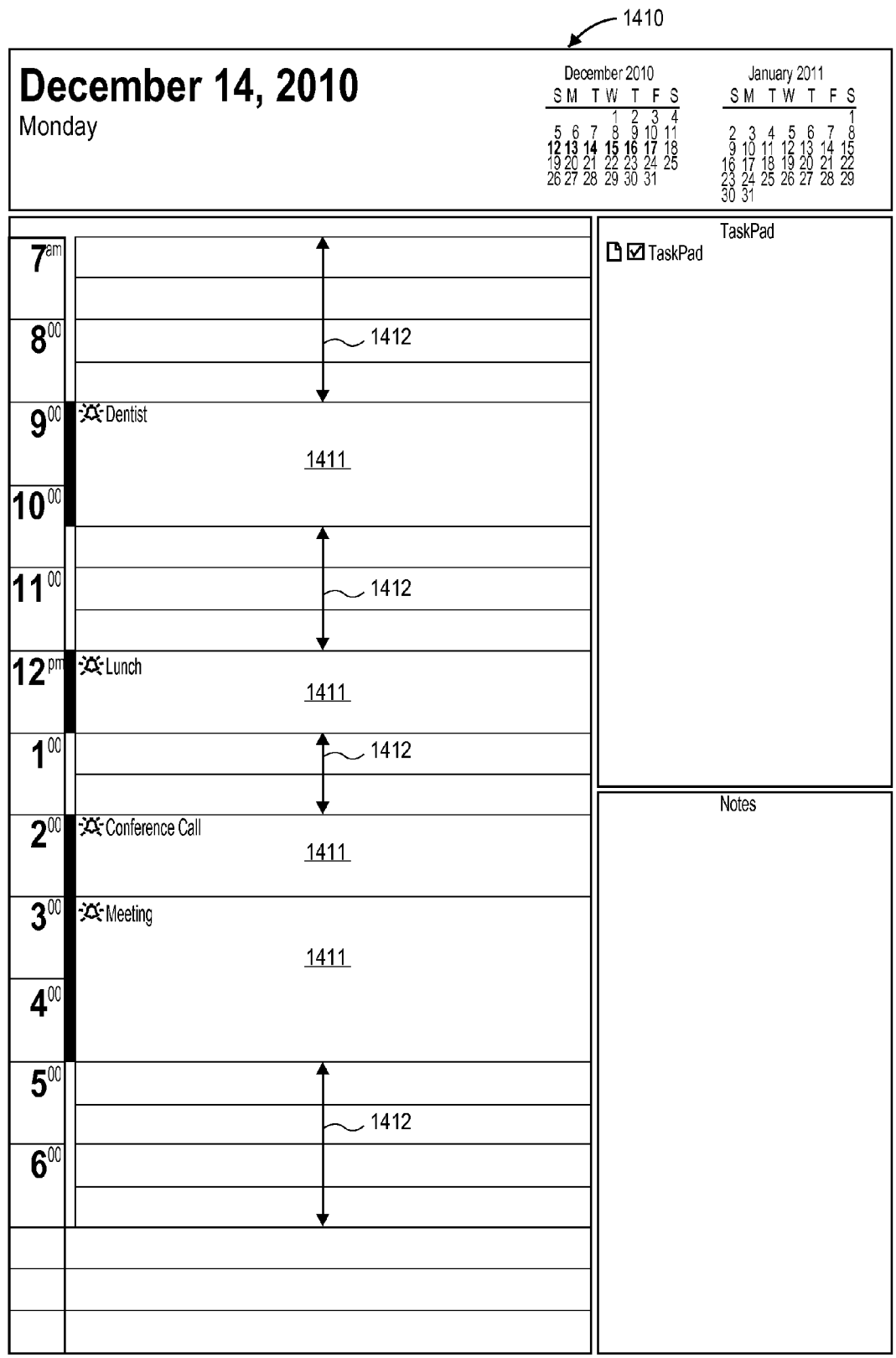

For example, referring to FIGS. 14B-C, one example of an electronic calendar 1410 that may be utilized for this purpose is a calendar of MICROSOFT OUTLOOK or another electronic calendar). The electronic calendar 1410 may be displayed in various increments including days of a month, hours of a day, and minutes or segments of a day. In the illustrated example, a daily calendar 1410 illustrates times or parts of the day 1411 during which the consumer 230 is busy (e.g., during work or other activities or commitments) and other parts of the day 1412 during which the consumer 230 is able to shop, e.g., during a day off, during a weekend, during a lunch hour, during personal time, etc.

Figure 14D:
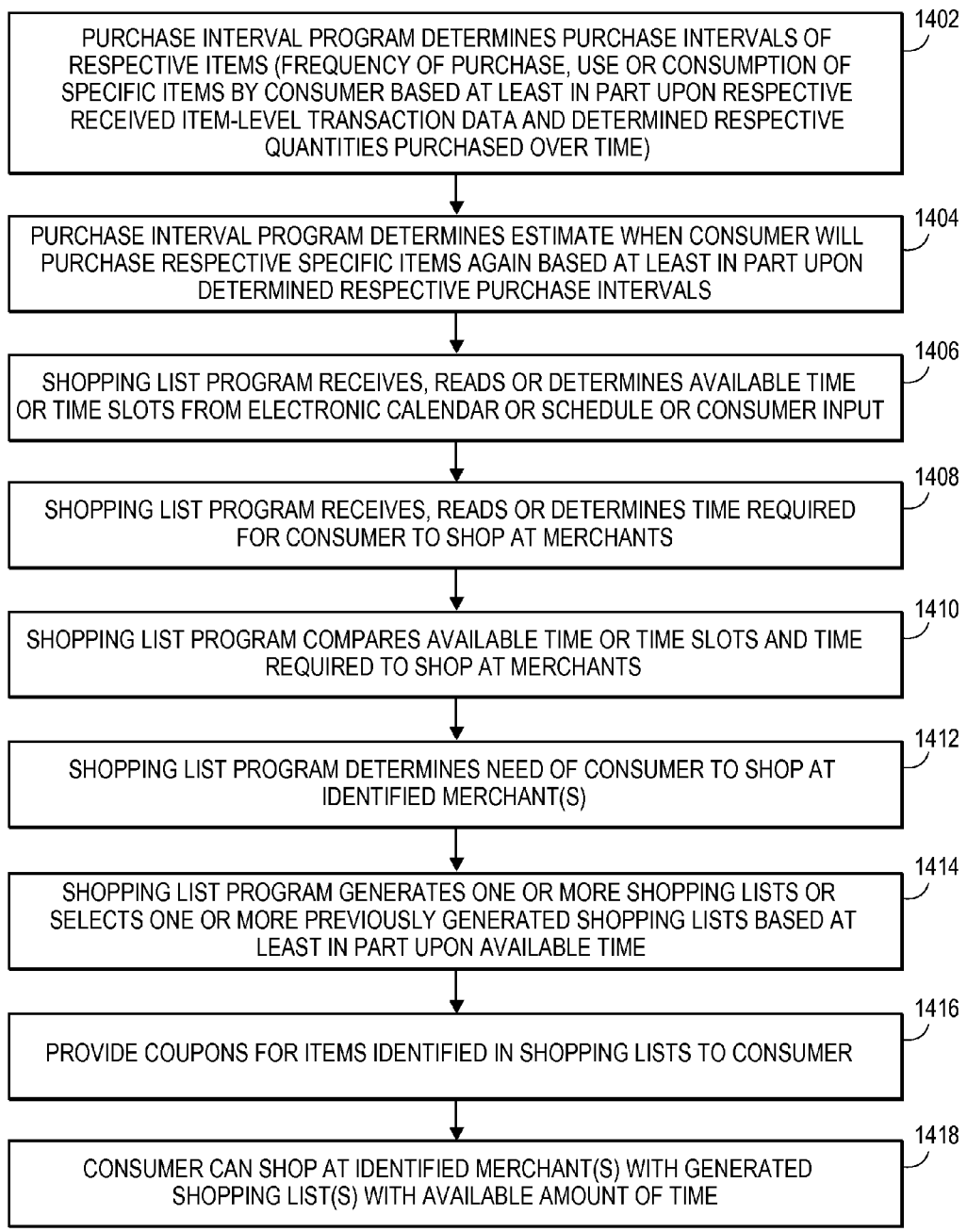
FIG. 14D is a flow chart of one embodiment of a method for processing item-level electronic transaction data to determine when items will be purchased again and to generate a schedule or calendar-based shopping list including at least one of those items.

Thus, referring to FIG. 14D, one embodiment of a method for generating calendar-based electronic shopping lists 253C includes determining purchase intervals 251 of respective items at 1402 based on item-level electronic transaction data 216 and determining an estimate 252 when the consumer 230 will need to purchase those items again at 1404 (as described above with respect to location-based shopping lists 253L, and thus further details are not repeated). At 1406, rather than using location or GPS data 233, the shopping list program 250b receives, reads or determine when the consumer 230 is able to shop and determines available dates and/or times that consumer 230 is free or available. For this purpose, shopping list program 250b is operable to communicate with electronic calendar 1410, or shopping list program 250b may communicate with program or application 237 that interfaces with electronic calendar 1410.

Certain embodiments involve determining whether consumer 230 has time without regard to a particular merchant 210 or how long shopping at a particular merchant 210 would take. In other embodiments, continuing with 1408, the shopping list program 250b receives, reads or determines the amount of time that would be required to shop at various merchants 210, and at 1410, compares the available dates and/or times as determined at 1406 to the time required as determined at 1408. At 1412, the shopping list program 250b determines the need of the consumer 230 to shop at merchants 210 identified based on the date/time comparisons, i.e., whether the consumer 230 needs to shop at the merchant 230 again based on the prior purchase interval 251 determinations. At 1414, shopping list program 250b generates or selects one or more schedule-based shopping lists 253C based at least in part upon the dates/times that consumer 230 is available (and electronic coupons may also be provided to consumer 230 at 1416 if desired) such that at 1418, consumer 230 can shop at merchants 210 identified based at least in part upon consumer's schedule 1410 or availability.

Referring to FIG. 14E, 1406-1414, may involve the shopping list program 250b maintaining, updating and accessing a table or other data structure stored in database 255. In the illustrated embodiment, a table includes rows for various merchants 210 and columns for different types of data including a merchant identifier 550 (such as merchant name or other identifier), in certain embodiments—an amount of time required to shop at a merchant 1450 (which, for example, may be determined from consumer or merchant surveys or entered by a consumer 230), available dates/times or time slots 1452 as determined from the electronic calendar 1410 or manually entered by consumer 230, an indicator 1454 of whether, based on available time, consumer 230 can shop at a particular merchant 210, and an indication 562 whether the purchase interval program 250a has identified items to be purchased from respective merchants 210 identified as those merchants at which consumer 230 could shop given the electronic schedule 1410 and/or time needed to shop at merchant 210, and an indicator 564 whether the shopping list for a merchant 210 is provided to the consumer 230 based on the consumer's electronic schedule 1410.

According to one embodiment, if, according to the electronic schedule 1410, consumer 230 has pre-determined or minimum amount or sufficient available time, one or more calendar-based shopping lists 253C, e.g., for merchants 210 identified by the purchase interval program 250a as merchants from whom consumer 230 previously purchased items can be transmitted to computing device 235. Thus, certain embodiments transmit shopping lists based on whether a minimum amount or block of time is available.

Figure 15A:
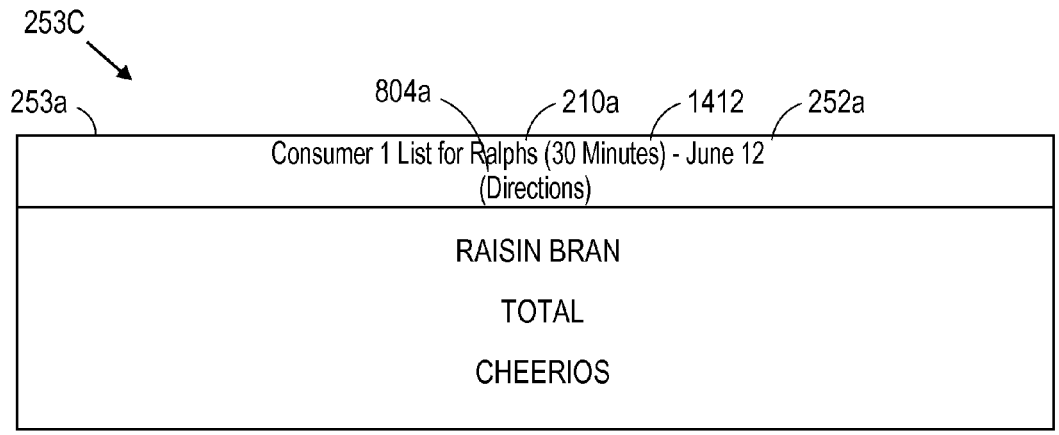
FIGS. 15A-B illustrate how a shopping list program may generate different types of schedule or calendar-based shopping lists for a first shopping date or date consumer is estimated to need listed items.
Figure 15B:
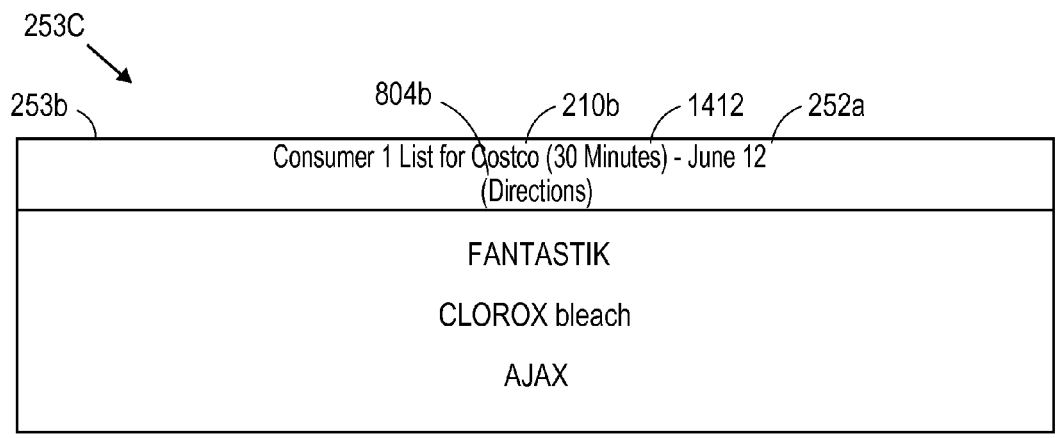

According to another embodiment, as shown in FIG. 14E, column 562 indicates that based on the purchase interval 251 and estimates 252 generated by the purchase interval program 250a, a calendar-based shopping list 253C can be generated for consumer 230 to shop at Merchants 1-2. However, since consumer 230 only has 30 minutes available, but other merchants (Merchants 3-5) require more time to shop, Merchants 3-5 are excluded, even if the purchase interval program 250a has determined that there are items to be purchased from those merchants on a particular estimated date. Thus, based on the data in the table of FIG. 14C and results generated by the purchase interval program 250a, schedule-based shopping lists 253a,b (as shown in FIGS. 15A-B) are generated for the consumer 230 since the consumer 230 has 30 minutes of time available for shopping (e.g. during a lunch break). The shopping list program 250b may provide multiple calendar-based shopping lists 253C to the consumer, and as shown in FIGS. 15A-B, items for each merchant 210, as determined using the results generated by the purchase interval program 250a, are provided in respective schedule-based shopping lists 253C, and the consumer 230 can decide which merchant 210 to select based on available time and/or shopping needs. FIGS. 15A-B also illustrate that directions 804a,b may be provided to respective merchants 210a,b.

Figure 16A:
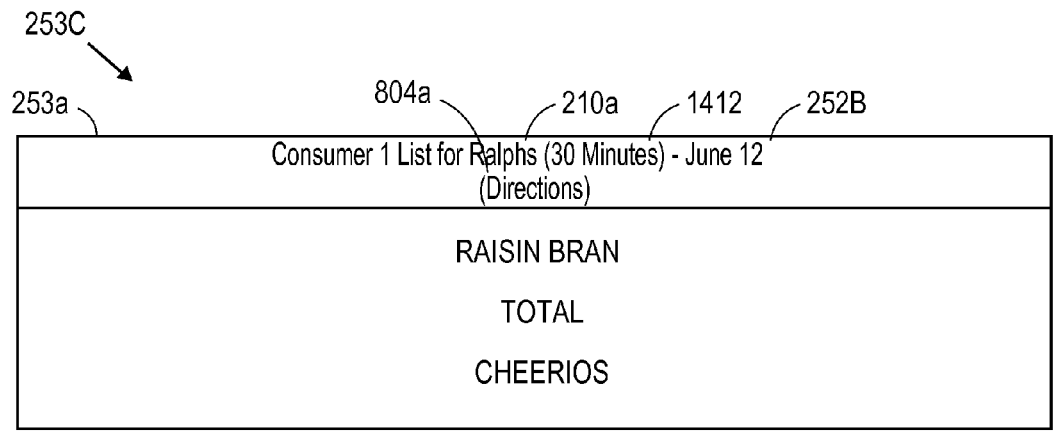
FIGS. 16A-B illustrate how a shopping list program may generate different types of schedule or calendar-based shopping lists for a different, second shopping date or other date consumer is estimated to need listed items.
Figure 16B:
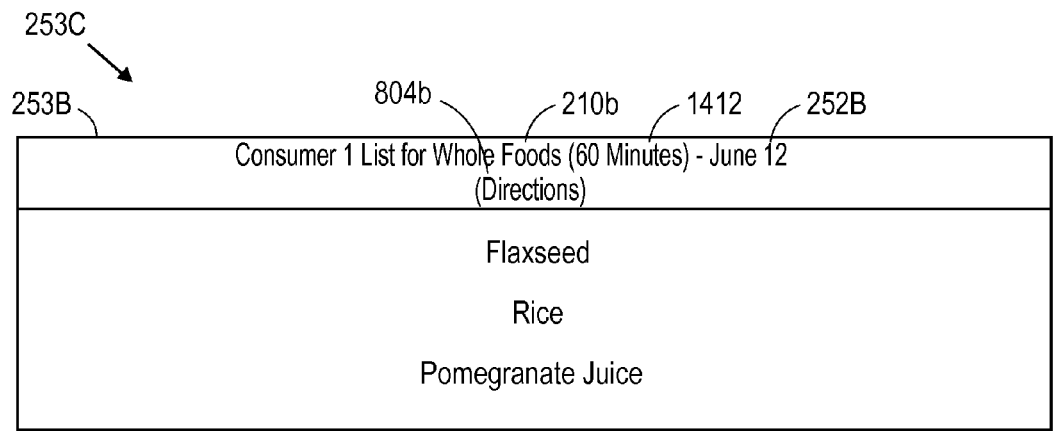

Referring to FIG. 14F, on a different date (e.g. June 19), the consumer 230 may have more time or different blocks of time (e.g., due to different work, meeting, lunch, driving, etc. schedules as reflected in the electronic calendar or schedule) such that calendar-based shopping lists 253C for other or additional merchants 210 (generally illustrated in FIGS. 16A-B) are provided to the consumer 230, based at least in part upon the results generated by the purchase interval program 250a and time comparisons discussed above. For example, while FIGS. 15A-B are shopping lists generated based at least in part upon consumer having 30 minutes to shop, FIGS. 16A-B show shopping lists generated based on electronic calendar 1410 or schedule date for a different date during which consumer 230 has more time to shop such that calendar-based shopping lists 253C for merchants 210 at which consumers 230 spend more time shopping can be generated or selected and transmitted to consumer 230, who may then select which where and when to shop.

It will be understood that electronic calendars or schedules 1410 of consumers 230 can vary from day to day or week to week, and that the merchants 210 that are selected based upon available time and whether the purchase interval program 250a determines that the consumer 230 is due to purchase items from those merchants 210 can vary.

Further, calendar-based shopping lists 253C may also be segregated as discussed above with respect to location-based shopping lists 253L, e.g., one or multiple lists may be generated, lists may be segregated by item type, merchant, merchant type, groups of merchants, etc. and, therefore, aspects of shopping lists discussed with respect to location-based embodiments are not repeated.

Location-Based and Schedule-Based Electronic Shopping Lists

While certain embodiments have been described with reference to location-based shopping lists 253L and schedule-based shopping lists 253C including specific items 212s purchased by a particular consumer 230, other embodiments are directed to using both location and schedule data to generate or select and transmit location-based and schedule based shopping lists 253LC to a consumer 230 ("LC" identifying a combination of "Location" and "Calendar" or Schedule).

Figure 17A:
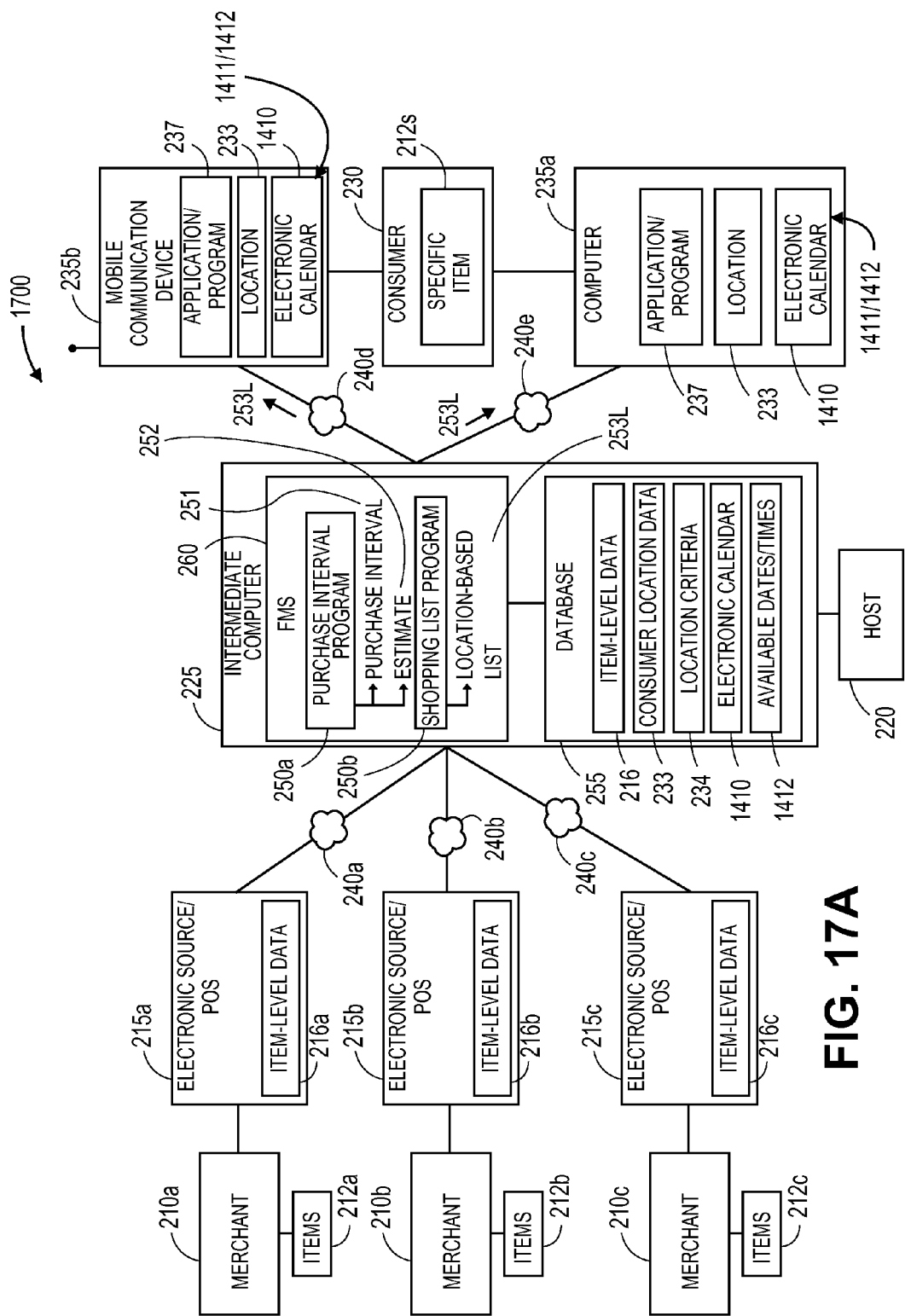
FIG. 17A is diagram of a system constructed according to one embodiment for generating shopping lists based on both a location and a calendar or schedule of a consumer.

More particularly, referring to FIG. 17A, in a system 1700 constructed according to another embodiment, the shopping list program 250b and/or the application or program 237 executing on the consumer computing device 253 are configured or operable to receive, read or determine location data 117 (e.g., GPS or other location data as discussed above with respect to FIGS. 1-13B) and also to receive, read or determine electronic calendar 1410 (e.g., a calendar of MICROSOFT OUTLOOK or another electronic calendar) such that shopping lists 253LC are generated based on both a location (current or future) and schedule such that, if time permits, consumer 230 can shop at merchants 210 within the vicinity of consumer location 117.

Figure 17B:
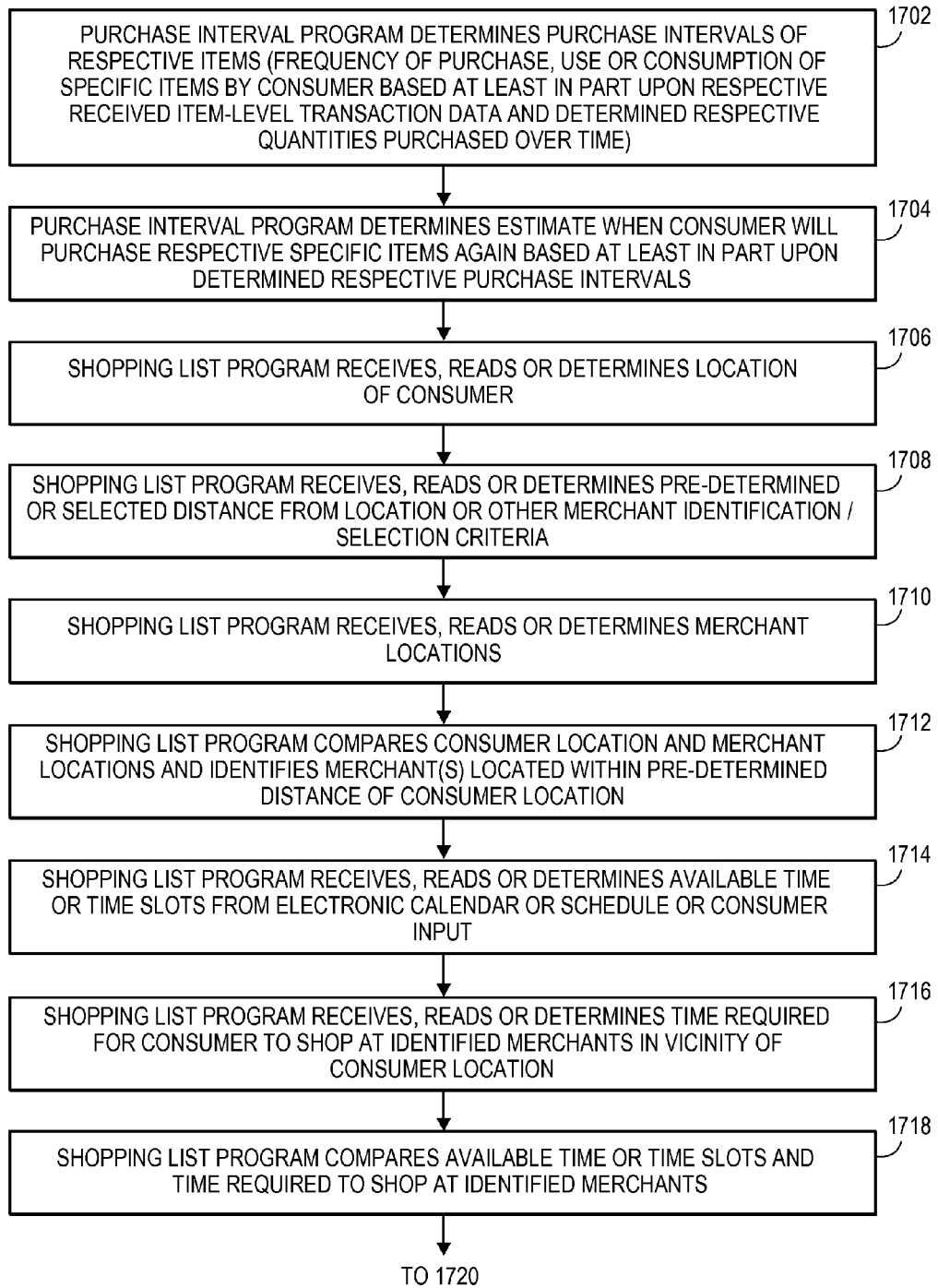
FIG. 17B is a flow chart of one embodiment of a method for processing item-level electronic transaction data to determine when items will be purchased again and to generate a shopping list including at least one of those items based at least in part upon both a location and calendar or schedule of a consumer.
Figure 17B:
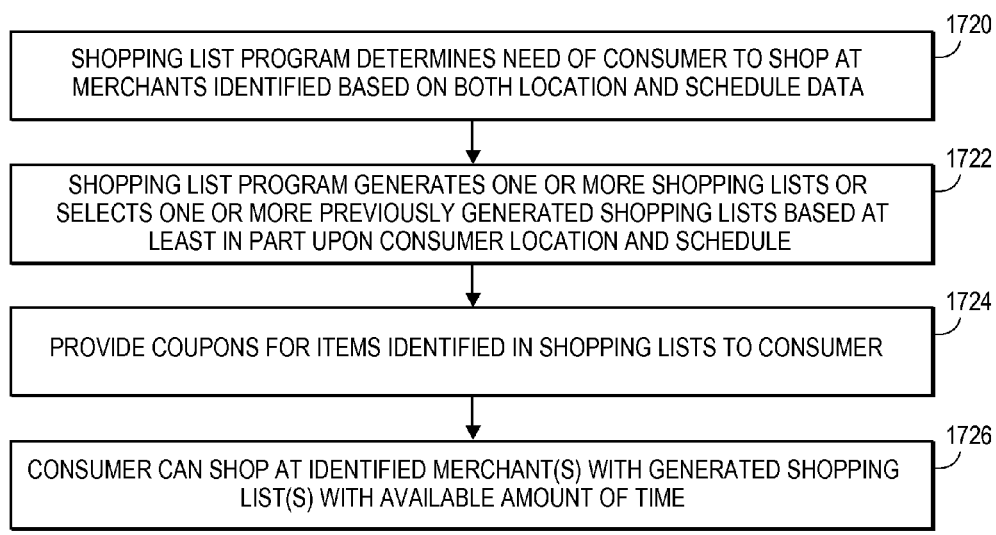

Thus, referring to FIG. 17B, an embodiment of a method for generating location and calendar based electronic shopping lists 253LC includes determining purchase intervals 251 of respective items at 1702 based on item-level electronic transaction data 116 and determining an estimate 252 of when the consumer 230 will need to purchase those items again at 1704 (as described above with respect to location-based shopping lists 253L and calendar-based shopping lists 253C). The shopping list program 250b conducts location-based processing as discussed above and at 1706, receives, reads or determines a location 233 of the consumer 230, e.g., sing GPS data or other location data as discussed above, and also, at 1708-1712, receives, reads or determines the pre-determined or selected maximum distance 234 and merchant 210 locations, and performs a comparison to identify merchants 210 within a pre-determined distance 234 of the location 234 of the consumer 230. Further, the shopping list program 250b conducts schedule-based processing as discussed above and at 1714-1716, receives, reads or determines data of an electronic calendar or schedule 1410 and the amount of time or time slots for a particular date that the consumer 230 is available to shop and, according to certain embodiments, the amount of time that is needed to shop at certain merchants 210 to compare the available time and needed time at 1718 to identify merchants 230 that satisfy both location and schedule criteria at 1720. In other words, the shopping list program 250b identifies merchants 210 that are within the pre-determined distance 234 of the consumer 230 and is generated for a certain date when the consumer 230 has available time. The available time may be based on the consumer 230 having a pre-determined minimum amount of time or an amount of time greater than the time that is usually required to shop at a particular merchant 210. At 1722, for the identified merchants 210, the shopping list program 250b determines whether the purchase interval program 250a determined that the consumer 230 would need to purchase items from those merchants 210, and at 1722, generates or selects one or more location and calendar-based shopping lists 253L based on both the location 233 and electronic calendar or schedule 1410 of the consumer 230. At 1724, electronic coupons for the particular items may also be provided to the consumer 230 who can shop at the identified merchants 210 with the generated or selected shopping lists 252 that account for both consumer location 233 and schedule or available time 1410.

Referring to FIG. 17C, 1706-1422, may involve the shopping list program 250b maintaining, updating and accessing a table or other data structure stored in database 255. In the embodiment illustrated in FIG. 17C, the table is a combination of data of tables shown in FIGS. 5B and 14C and includes rows for various merchants 210 and columns for different types of data including location-based data such as a merchant identifier 550 (such as merchant name or other identifier), a merchant location 552, a consumer location 554, the distance between a merchant and consumer 556, a pre-determined or maximum distance 558, an indicator 560 whether a merchant 210 is located within the pre-determined distance 118 of the consumer 230. In certain embodiments, the table may indicate whether the consumer 230 has free time to shop such that location and calendar-based shopping lists 253LC can be transmitted to consumer 230. In certain other embodiments, as illustrated, the table includes schedule-based data such as how much time is required to shop at a merchant 1450 (if such data is necessary), how much time the consumer 230 has to shop (1452), whether the consumer is able to shop at a particular merchant (if 1450 is utilized), whether the purchase interval program 250a has a shopping list for the merchant 230, and whether the location and calendar-based shopping list 253LC is provided to the consumer 230 (if 1450 is utilized).

Figure 18A:
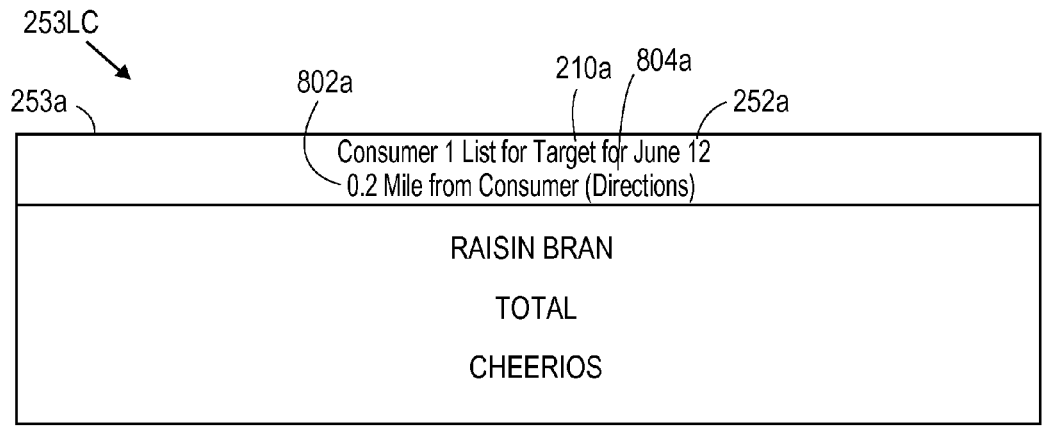
FIGS. 18A-B illustrate how a shopping list program may generate different types of shopping lists based on consumer location and a calendar or schedule of the consumer.
Figure 18B:
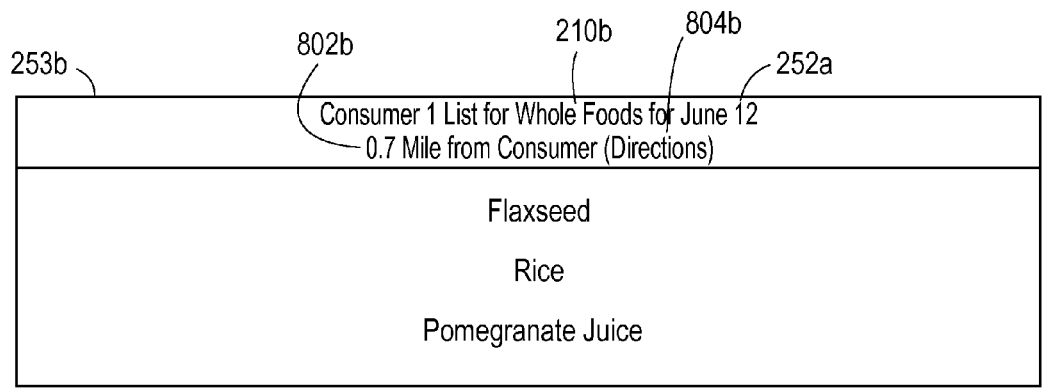

Thus, for example, referring to FIG. 18A, a first location-based and schedule based shopping list 253a may be generated for a first merchant 210 (e.g. Target) within the pre-determined distance 234 (e.g., 1 mile) of the consumer 230 and since the consumer 230 has time to shop or has sufficient time to shop at Target, which may typically require 30 minutes, and a second location-based and schedule-based shopping list 253LC may be generated for second merchant 210 (e.g. Whole Foods) within the pre-determined distance 234 of the consumer 230 and since the consumer 230 has time to shop or has sufficient time to shop at Whole Foods, which may typically require about 15 minutes to purchase items.

Figure 19:
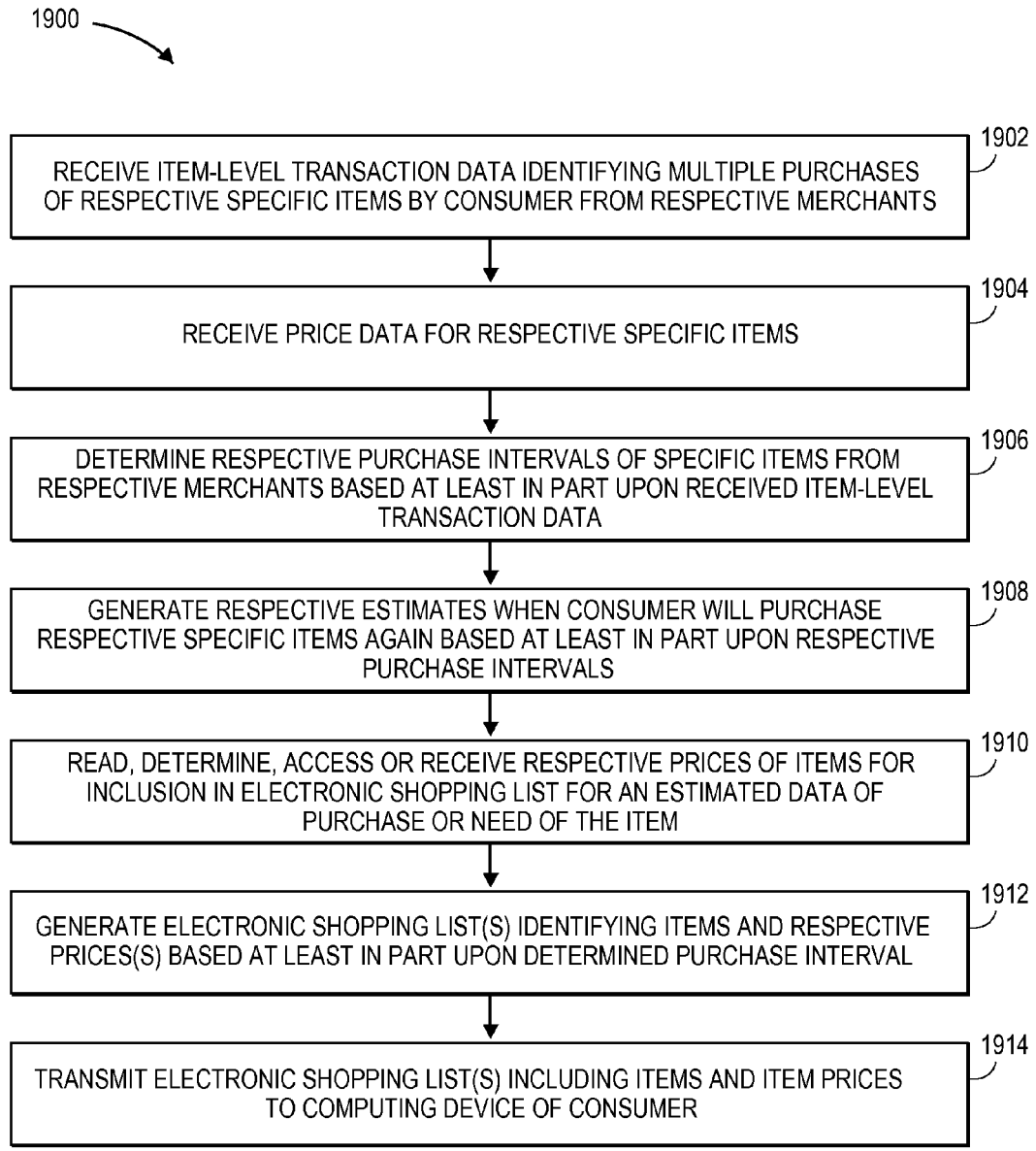
FIG. 19 is a flow chart of one embodiment of a method for generating an electronic shopping list based at least in part upon one more of electronic item-level transaction data of prior purchases by a consumer, estimates when specific items will be needed again by the consumer, and identifying items and item prices.

Thus, it will be understood that embodiments may involve location-based shopping lists 253L, calendar or schedule-based shopping lists 253C, and shopping lists generated based on both location and calendar 253LC, and that shopping lists may be structured or segregated as discussed above in all of these embodiments Electronic Shopping Lists with Item and Price Data Referring to FIG. 19, a method 1900 for generating electronic shopping lists 253IP that identify items and prices of those items ("I" referring to "Item" and "P" referring to "Price") comprises, as described with reference to FIG. 1 above, receiving item-level transaction data 216 identifying multiple purchases of respective specific items 212 by consumer 230 from respective merchants 210 at 1902. With embodiments, at 1904, the method 1900 also comprises receiving prices of those specific items 212. Price data may be received from the same merchants 210 or merchant computing or payment devices 215 or from another source that collects price data of one or multiple merchants 210.

Figure 20A:
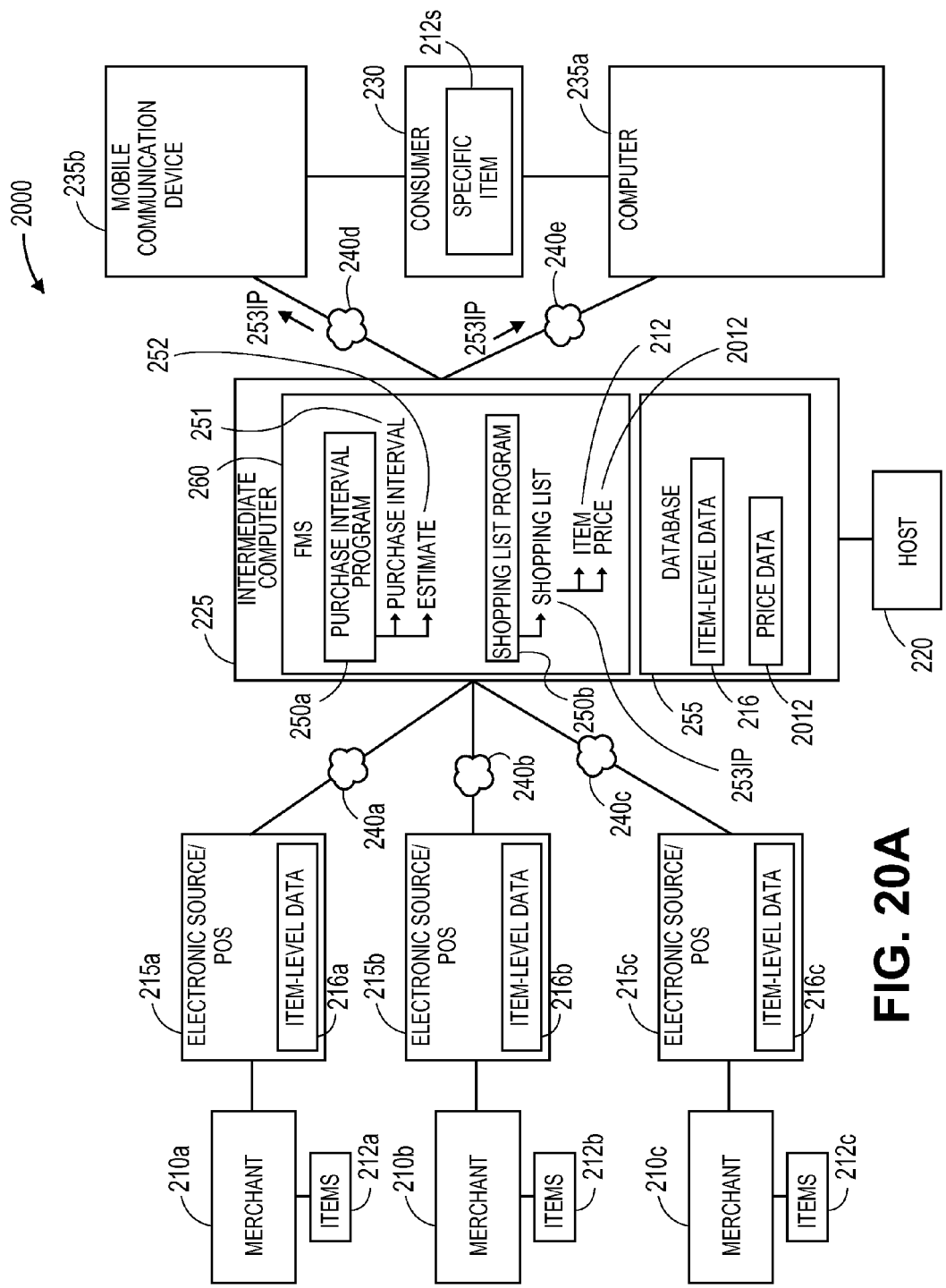

Referring to FIG. 20A, a system 2000 for generating electronic shopping lists 253IP including item and price data according to embodiments includes various system components and parties as described above with reference to FIGS. 1-18 such as a host 220 that collects item-level electronic transaction data 216 from merchants 210 and other originators of such data, a consumer 230 who purchases a particular or specific item 212s multiple times from one or more merchants 210. Details regarding system 2000 components are described above in further detail with reference to FIGS. 1-18 and in applications incorporated by reference and, therefore, are not repeated.

According to embodiments, the intermediate computer 225 also receives price data 2012 of items 212 identified by the purchase interval program 250a. Price data 2012 is received from a source 2010 which, in the illustrated embodiment, is the same as the source of item-level electronic transaction data 216, namely, an electronic payment device or POS terminal 215 of the merchant 210 or other computer or database of the merchant 210. In other embodiments, merchants 210 may provide their price data 2012 to an intermediate party or to another host (not shown in FIG. 20A) that collects price data 2012 from one or multiple merchants 210, and that is received at or accessed by intermediate computer 225. Intermediate parties or hosts may also collect price data 2012 independently, e.g., by screen scraping, scanning advertisements, manual entry, etc. Accordingly, it will be understood that the source of price data 2012 may be a merchant 210 and received at the intermediate computer 225 directly or indirectly from merchant 210, the source 2010 may be the same or different than the source of item-level electronic transaction data 216, or another host that collects price data 2012.

According to one embodiment, the price 2012 of an item 212 is the price that was previously paid for the item 212. According to another embodiment, the price 2012 is the current or market price for that item 212. The current or market price may be the same or different than the price that was previously paid depending on whether the price changed since the item 212 was last purchased.

Referring to FIG. 20B, according to certain embodiments, prices 2012 of various items received at the intermediate computer 220 are stored in the database 255 as a table 2020 or other data structure. In the illustrated embodiment, table 2020 includes a column 2021 identifying items (e.g., Items 1-3) and a column 2022 identifying respective prices (e.g., Prices 1-3) of Items 1-3. It will be understood that table 2020 may include data of different numbers of items 212, and that FIG. 20B is provided as an example of how embodiments may be implemented.

Referring to FIG. 20C, in another embodiment, the table 2020 also includes a third column 2023 identifying the merchant 210 who sells that item 212 at that price 2012. FIG. 20C shows that Merchant 1 sells Item 1 at Price 1, Merchant 2 sells Item 1 at Price 2, and Merchant 3 sells Item 1 at Price 3.

In certain embodiments, as shown in FIGS. 20B-C, each item 212 is associated with a single price 2012 and a single merchant 210 offering the item 212 at that price 2012. In other embodiments, a single item 212 may be associated with multiple prices 2012.

For example, referring to FIG. 20D, a table 2020 according to another embodiment stores multiple prices 2012 a-c (generally, price 2012) for an item 212 and identifies the merchants 210a-c that offer that item at those respective prices 2012a-c. While FIG. 20D illustrates a table 2020 including three prices 2012 for each item 212, it will be understood that the table 202 may include the same or different number of prices 2012 for each item 212, and the table 220 may include two, four, five and other numbers of prices 2012 for each item 212 and different numbers of merchants 210.

Referring to FIG. 20E, in another embodiment, the table 2020 or another table or other data structure includes or indicates the lowest price 2012L ("L" referring to Lowest price") for each item 212. As an example, with reference to the multiple prices of FIG. 20D, the shopping list program 250b may analyze the various prices 2012 of an item 212, select the lowest price 2012L, and generate another table or display the lowest prices 2012L in the same table 2010. In the illustrated example, the shopping list program 250b analyzes prices 2112a-i (Prices 1A-C, 2A-C, 3A-C for each of the three respective items 212a-c (Items 1-3) and determines that Merchant A offers Item 1 at the lowest Price 1-A, Merchant C offers Item 2 at the lowest Price 2-C, and Merchant B offers Item 3 at the lowest Price 3-B.

Referring again to FIG. 19, at 1906, and as discussed above with reference to FIGS. 1-18, respective purchase intervals 251 of specific items 212 are determined based at least in part upon received item-level transaction data 216, and at 1908, respective estimates 252 when consumer 230 will purchase respective specific items 212s again are generated and based at least in part upon respective determined purchase intervals 251. With embodiments, at 1910, with the identities of items 212s for a particular estimated date 252, shopping list program 250b reads, determines, accesses or receives, from database 255 on or associated with intermediate computer 225 or from a merchant computer 235 or other source 2010 of price data 2012, respective prices 2012 of items 212 identified to be included in electronic shipping list 253IP for estimated date 252. At 1912, shopping list program 250b generates an electronic shopping list 253IP for estimated date 252. The electronic shopping list 253IP identifies the items 212 identified by purchase interval program 250a and also the prices 2012 of those items 212. At 1914, electronic shopping list 253IP identifying items 212 and respective prices 2012 is transmitted to a computing device 235 of consumer 230 such as a computer or mobile communication device. FIGS. 21A-24C illustrate examples of how electronic shopping lists 253 IP may be structured according to embodiments.

Figure 21A:
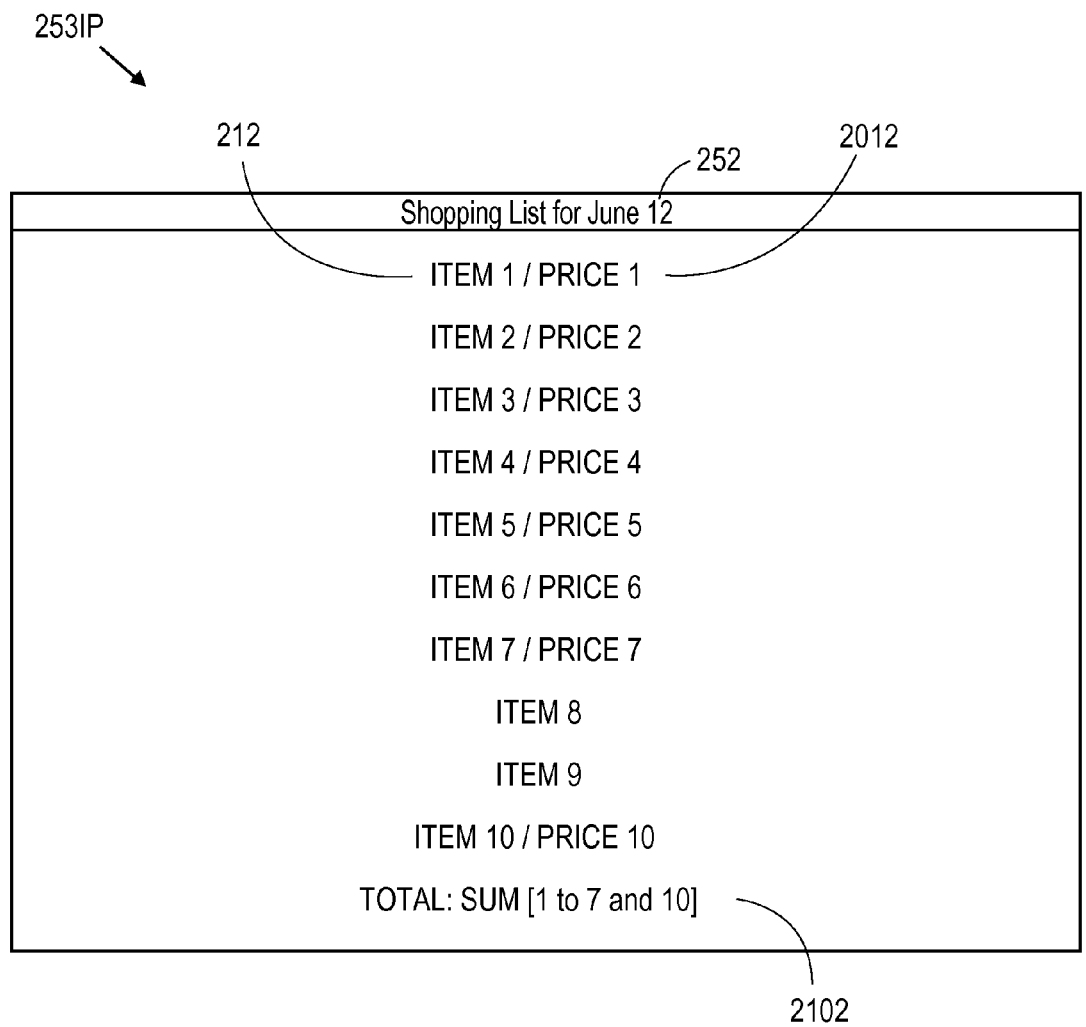

For example, referring to FIG. 21A, a single electronic shopping list 253IP for a given estimated date 252 (e.g., June 12) that is not for a specific merchant 210 is generated and transmitted to consumer 230 and includes items 212 identified by purchase interval program 250a that were determined to be needed by estimated date 252 and, if known, respective prices 2012 of those items 212. For example, as shown in FIG. 21A, price data 2012 for some items 212 (e.g., Items 1-7 and 10), but not all items 212 (e.g., Items 8-9) may be received at intermediate computer 220 and incorporated by shopping list program 250b into electronic shopping list 253IP. While FIG. 21A illustrates an embodiment in which electronic shopping list 253IP includes a price 2012 for only certain items 212, it will be understood that electronic shopping list 253IP may include a price 2012 for each item 212. FIG. 21A also illustrates an embodiment in which shopping list program 250b adds prices 2012 to determine a total amount 2102, which is displayed within electronic shopping list 253IP and represented as "SUM" of the available prices 2012.

Figure 21B:
Figure 21C:
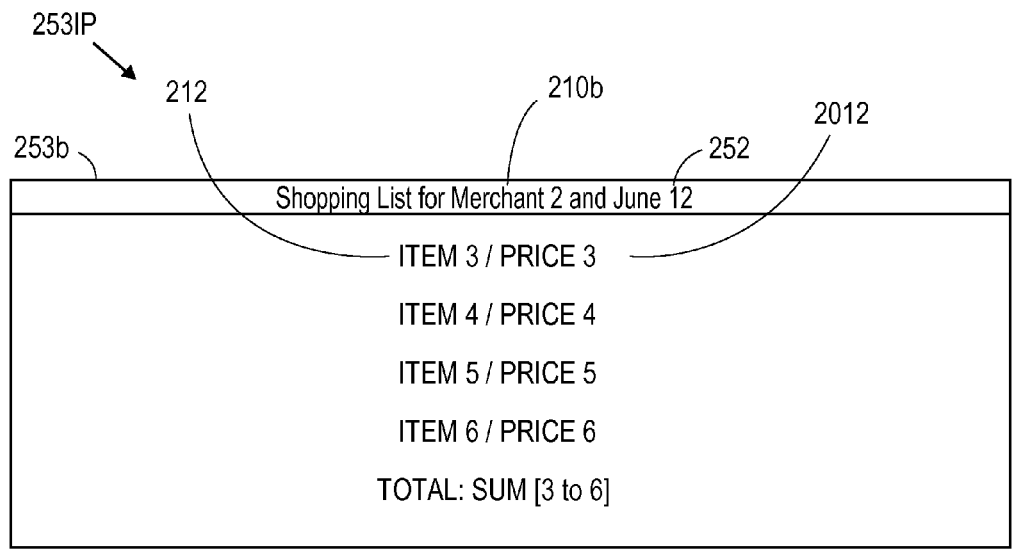
Figure 21D:
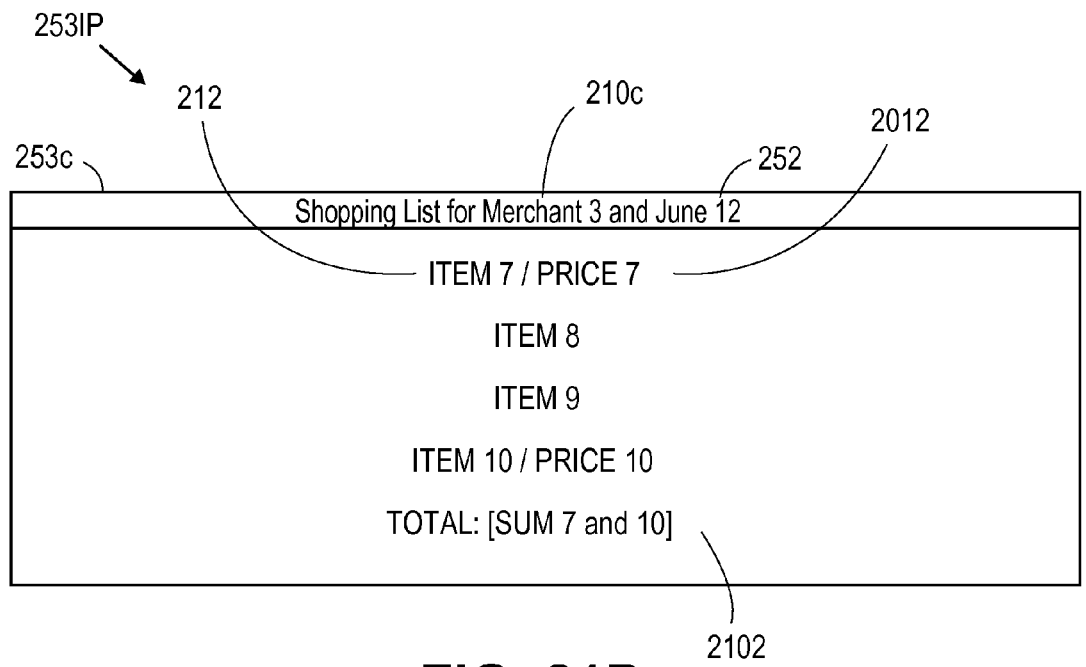

Referring to FIGS. 21B-D, according to one embodiment, rather than generating a single electronic shopping list 253IP including all items 212 identified by purchase interval program 250a for that estimated date 252, embodiments utilizing shopping list program 250b are operable to analyze recurring purchases of specific items 212s, merchants 210 from whom those purchases were made, and generate multiple shopping lists 253IP segregated or separated according to pre-determined segregation criteria such as by merchant 210. In this manner, consumer 230 can be provided with a first electronic shopping lists 253IP that identifies items 212 and prices 2012 for a first merchant 210a, and a second electronic shopping list 253IP for a second or other merchant 210b.

For example, as shown in FIGS. 21B-D, shopping list program 250b generates multiple shopping lists 253IP that identify items 212 and item prices 2012 for a given estimated date 252. In the illustrated embodiment, for a given estimated date 252 (e.g. June 12), shopping list program 250b generates a first shopping list 253a with certain items 212 (e.g., ITEMS 1-2) and their respective prices 2012 (PRICES 1-2) to be purchased from a first merchant 210a, a second shopping list 253b identifying other items 212 (e.g., ITEMS 3-6) and their respective prices (PRICES 3-6) to be purchased from a second merchant 210b, and a third shopping list 253c identifying additional items 212 (e.g., ITEMS 7-10) and available prices (PRICES 7 and 10) to be purchased from a third merchant 210c. Again, other embodiments may involve a price 2012 for each item 212, and one or more or all of the shopping lists 253IP may indicate the total of all of the available prices 2012.

Figure 22A:
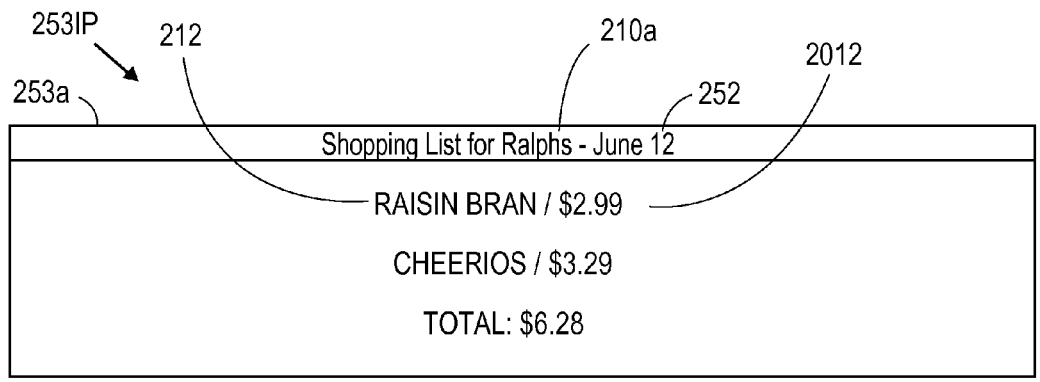
FIGS. 22A-B illustrate an embodiment in which electronic shopping lists including items and respective prices can be generated for an estimated date for merchants of the same type.
Figure 22B:
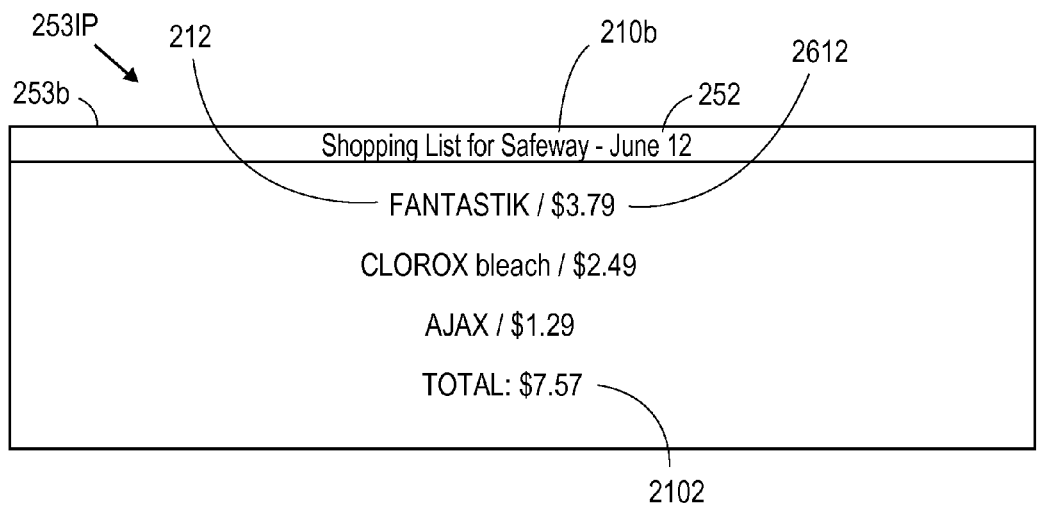

Referring to FIGS. 22A-B, one example of how embodiments may be implemented involves generation of multiple shopping lists 253IP for a given estimated purchase or need date (e.g., June 12) for merchants 210 of the same type or category (e.g., merchant type "grocery store"). A first shopping list 253a (FIG. 22A) is generated for items 212 (CHEERIOS and RAISIN BRAN cereals) and includes respective prices 2012 ($2.99, $3.29) of items 212 to be purchased from RALPHS grocery store 210a, and a second shopping list 253b (FIG. 22B) is generated for other items 212 (FANTASTIK, CLOROX, AJAX) and includes respective prices 2012 ($3.79, $2.49, and $1.29) to be purchased from SAFEWAY grocery store 210b. Each shopping list 253a,b may also indicate a total amount 2102.

Figure 23A:
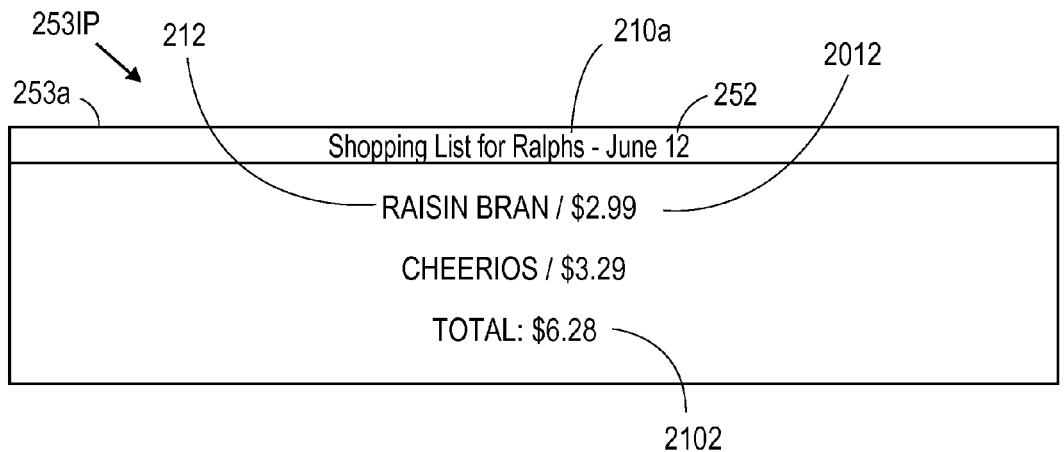
FIGS. 23A-B illustrate an embodiment in which electronic shopping lists including items and respective prices can be generated for an estimated date for different types of merchants.
Figure 23B:
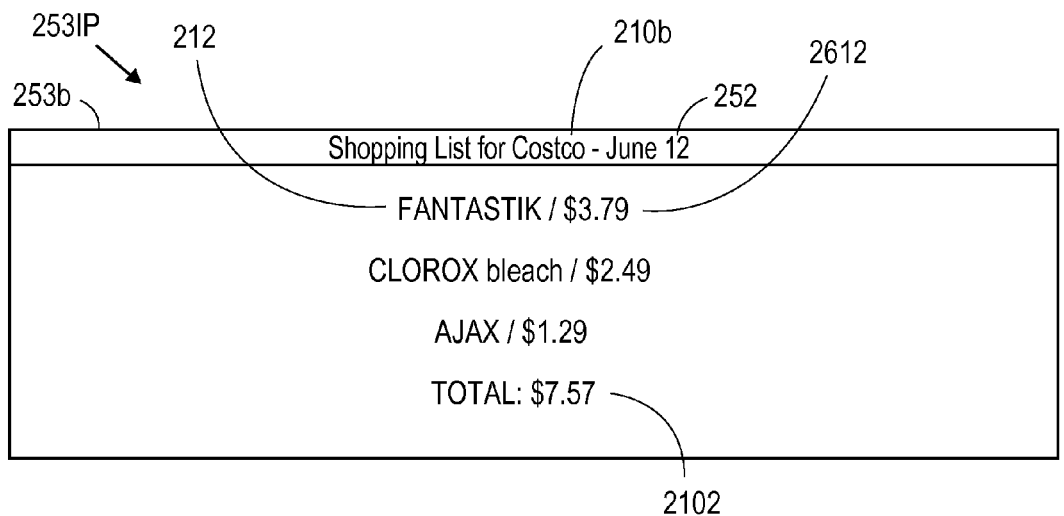

Referring to FIGS. 23A-B, another example of how embodiments may be implemented involves generation of multiple shopping lists 253IP (e.g., two shopping lists 253a-b) for different types of merchants 210 rather than all of the shopping lists 253L being for the same type of merchant 210 as in FIGS. 22A-B. In the illustrated embodiment, a first shopping list 253a (FIG. 23A) is generated for items 212 (CHEERIOS and RAISIN BRAN cereals) to be purchased from a RALPHS grocery store 210a (as discussed above with reference to FIG. 22A), and a second shopping list 253b (FIG. 23A) is generated for cleaning product (FANTASTIK, CLOROX and AJAX) items 212 to be purchased from COSTCO, a club membership store. The first shopping list 253a indicates that RALPHS offers RAISIN BRAN at a price 2012 of $3.29 and CHEERIOS at a price 2012 of $2.99, and COSTCO offers the identified cleaning products at respective prices 2012 of $3.79, $2.49 and $1.29.

Thus, shopping list program 250b is operable to generate multiple shopping lists 253IP for different merchants 210 from whom consumer 230 has purchased identified items 212 in the past and the prior price 2012 paid or current price 2012 of those items 212 so that consumer 230 knows how much the items 212 in the shopping list 253IP will cost.

Figure 24A:
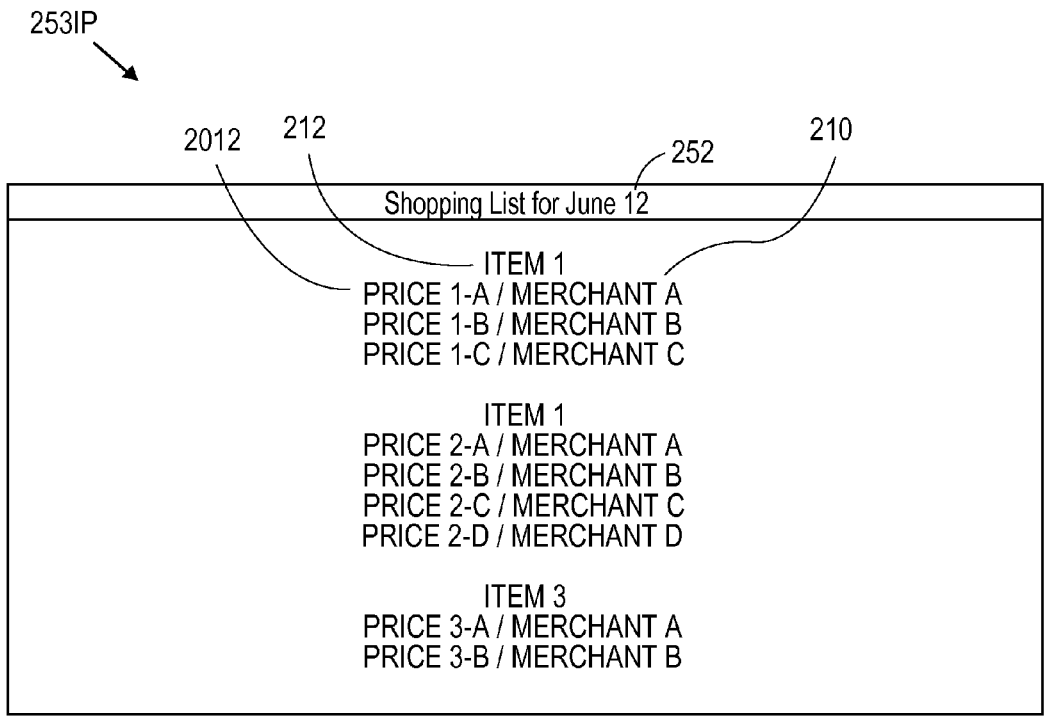
FIGS. 24A-B illustrate an embodiment in which electronic shopping lists including items and one or multiple prices for one or more items and respective merchants who offer items for sale at those prices.

Referring to FIG. 24A, according to another embodiment, an electronic shopping list 253IP generated according to embodiments identifies items 212 to be purchased on a particular estimated date 252 and also identifies various merchants 210 and respective prices 2012 charged by those merchants 210 for the items 212. For example, referring to FIG. 24B, shopping list program 250b may access database 255 or another external source of price data 2012 to generate electronic shopping list 253IP identifying items 212 offered by merchants 210 and respective prices 2012. In the illustrated example, the electronic shopping list 253IP includes CHEERIOS and indicates that RALPHS sells CHEERIOS for $3.29, SAFEWAY sells CHEERIOS for $3.59, and COSTCO sells CHEERIOS for $2.79. Other items (RAISIN BRAN and FANTASTIK) are also identified together with respective prices 2012 and merchants 210 who sell those items 212 at those prices 2102.

Figure 24B:
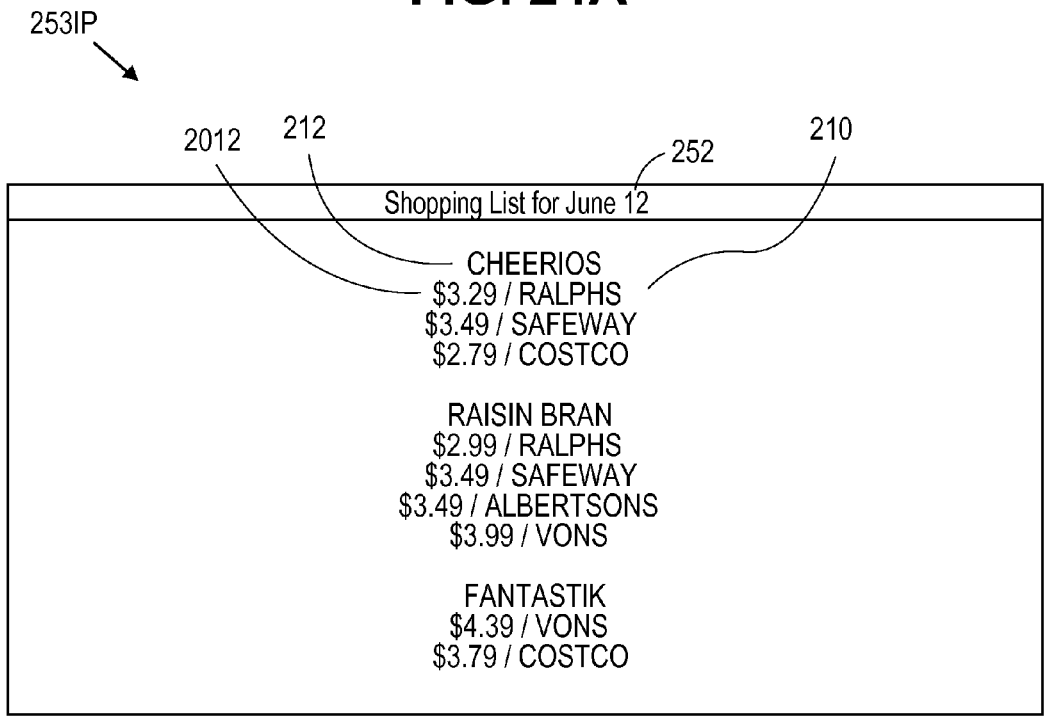
Figure 24C:
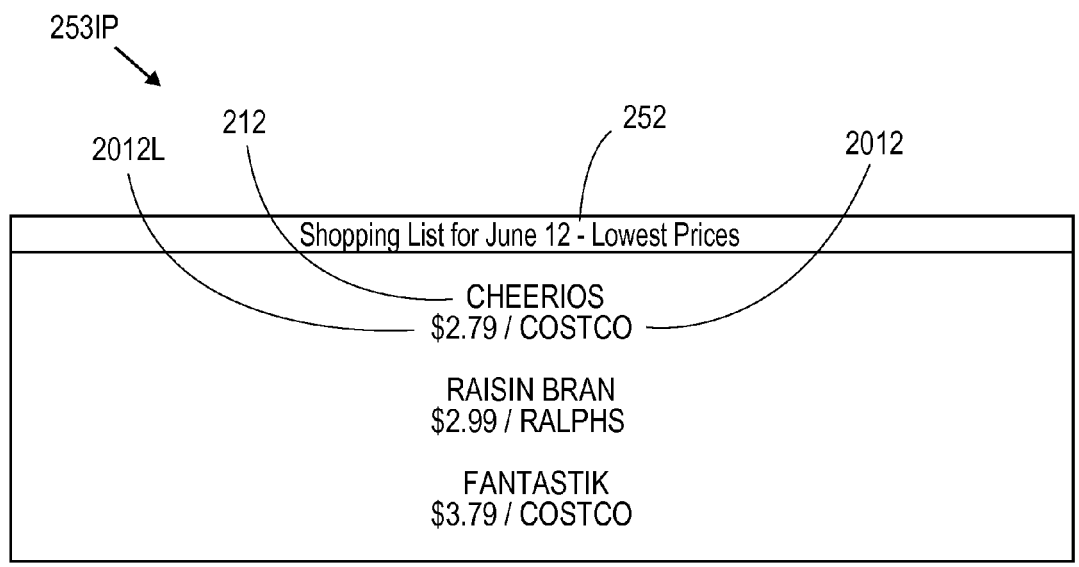
FIG. 24C illustrates an embodiment of an electronic shipping list that identifies items and lowest prices of the identified items.

Referring to FIG. 24C, according to another embodiment, the shopping list program 250B is configured, e.g., based on a user input or selection, to identify the lowest price 2012L for an item 212 identified by the purchase interval program 250a and the merchant 210 who sells that item 212 at that lowest price 2012L. In the illustrated embodiment, shopping list program 250b analyzes available prices 2012 for a particular item (e.g., merchants as shown in FIG. 24B sell CHEERIOS at $3.29, $3.59 and $2.79), and the selects the lowest price 2012L for the item 212 and includes that lowest price 2012L and the merchant 210 who sells the item at that lowest price 2012L in the shopping list 253IP. Thus, based on the embodiment illustrated in FIG. 24B, the shopping list program 250b selects the lowest price for each item 212, which is particularly beneficial to consumers 230 trying to reduce or minimize their spending, and embodiments identify the lowest prices 2012L and merchants 210 at which consumer 230 has previously shopped as determined from item-level electronic transaction data 216.

Electronic Shopping Lists with Item, Price and Coupon Data

Figure 25:
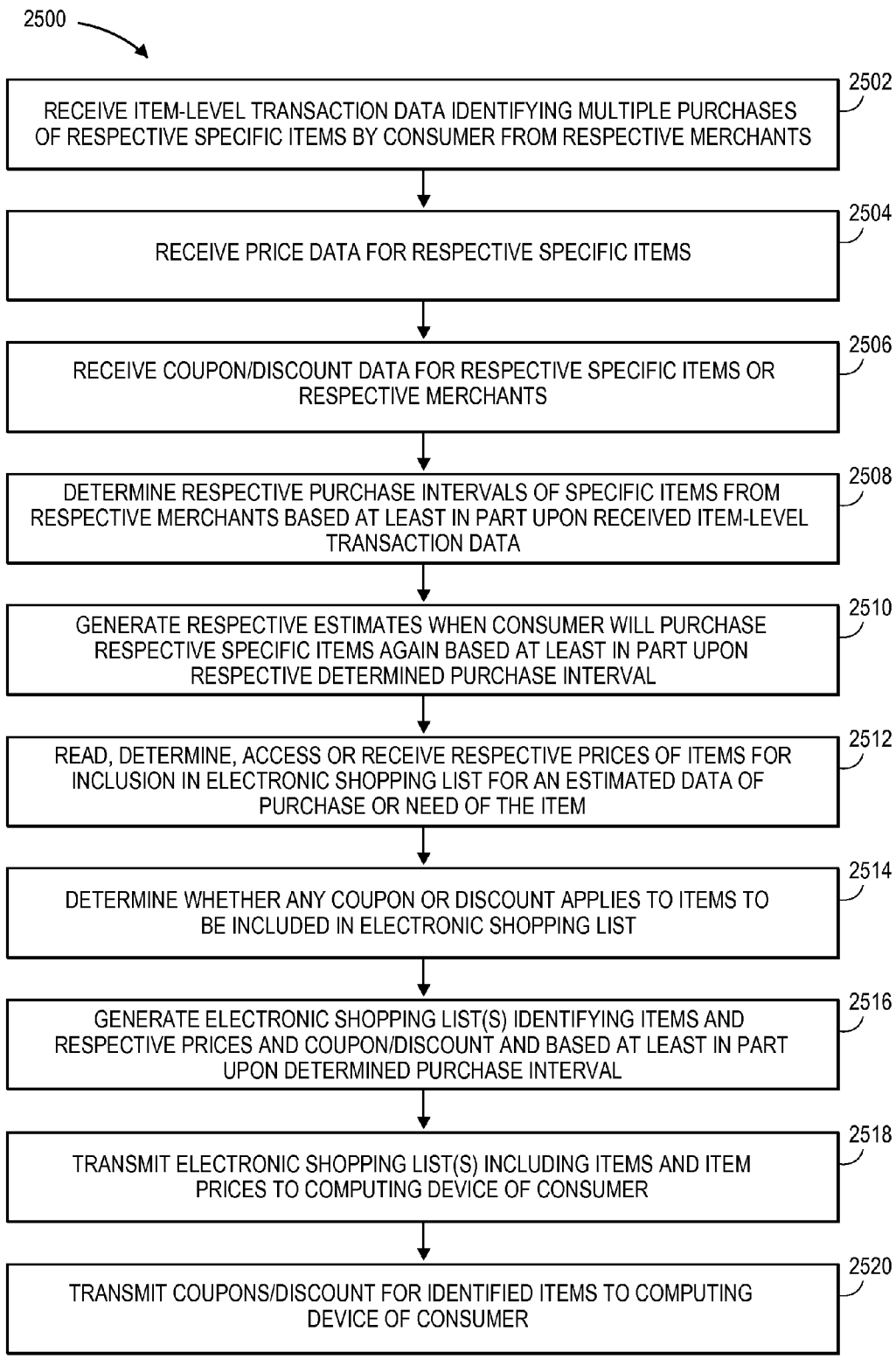
FIG. 25 is a flow chart of one embodiment of a method for generating an electronic shopping list based at least in part upon one more of electronic item-level transaction data of prior purchases by a consumer, estimates when specific items will be needed again by the consumer, and identifying items, items prices, and applicable coupons.

Referring to FIG. 25, in another embodiment, a method 2500 for generating electronic shopping lists involves shopping lists 253IPC that include items identified by the purchase interval program, prices of those items as discussed above, and coupon data applicable to the items ("I" referring to "Item," "P" referring to "Price" and "C" referring to Coupon or discount). At 2502-2504, as discussed above, item-level transaction data 216 identifying multiple purchases of respective specific items 212s by consumer 230 and respective prices 2012 of those items 212 are received at intermediate computer 220. At 2506, according to embodiments, intermediate computer 220 receives coupon or discount data related to an item 212 identified by purchase interval program 250a or an amount spent by the consumer 230 at merchant 210 offering a discount.

Figure 26A:
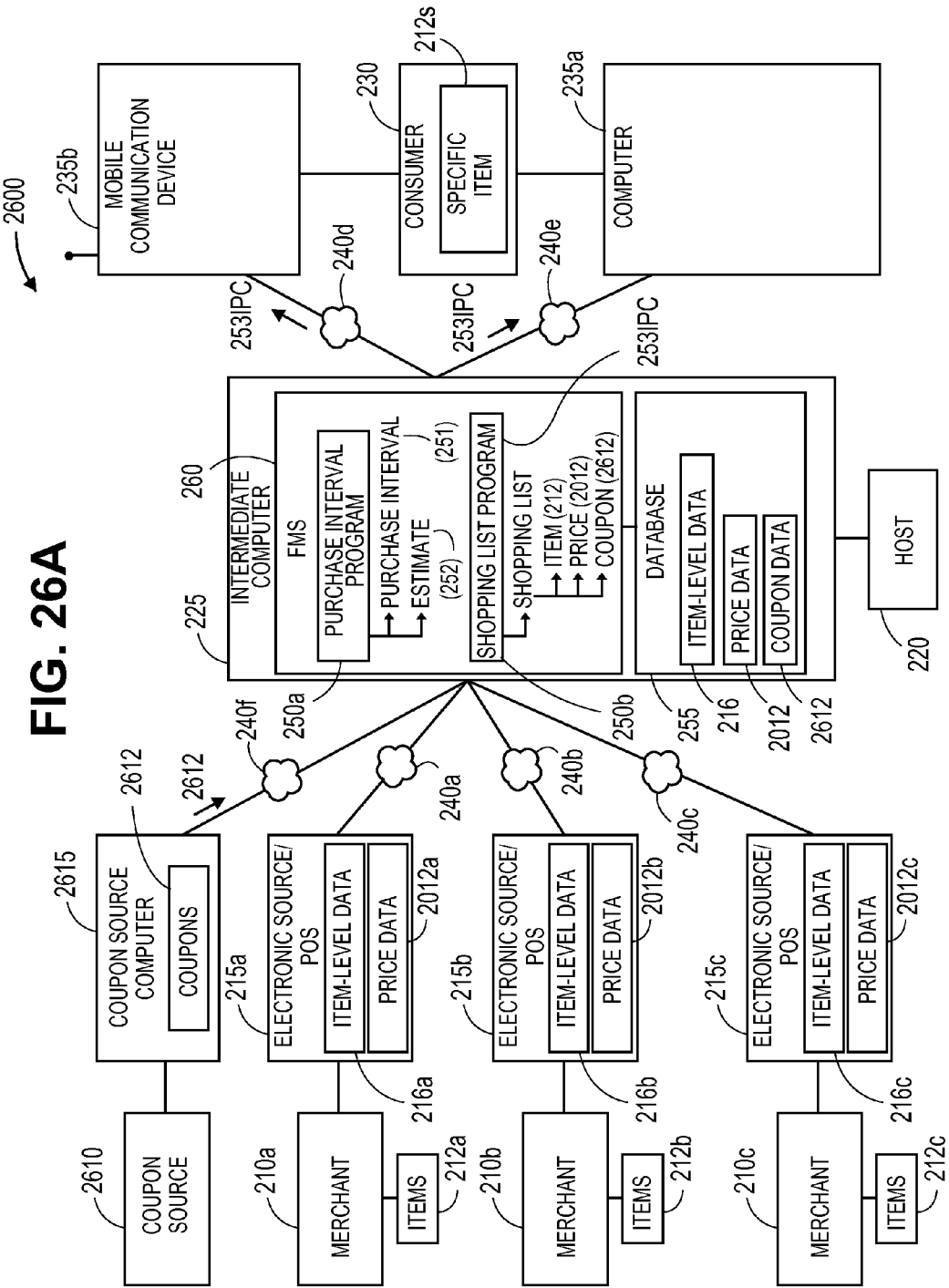
FIGS. 26A-B illustrate embodiments of systems and associated databases for generating electronic shopping lists that identify items, items prices and coupons.

Referring to FIG. 26A, a system 2600 for generating electronic shopping lists 253IPC including item, price data and coupon or discount data according to embodiments includes various system components described above, details of which are provided above and not repeated. According to embodiments, in addition to receiving item-level electronic transaction data 216 and price data 2012, intermediate computer 225 also receives coupon data 2612 from a source 2610 for an item 212 identified by purchase interval program 250a and/or related to a total cost 2102 of the items 212 on the shopping list 253IPC. For example, FIG. 26A shows coupon data 2612 being received from a coupon source computer 2615 through a network 240f at intermediate computer 225 for inclusion in database 255.

Coupon or discount data 2612 (generally, coupon data) may be in the form of a redeemable coupon offered by the manufacturer or supplier of an item 212 or by a merchant 210. For example, in the illustrated embodiment, a source 2610 such as an item manufacturer may offer a coupon 2612 redeemable for $1.00 off a box of CHEERIOS. Coupons 2612 may also be received at intermediate computer 220 from an on-line source or website that provides on-line coupons to consumers 230. According to another embodiment, a coupon 2612 is offered by a merchant 210 and may or may not be item specific. For example, coupon data 2612 may be in the form of a discount of $5 if a consumer spends $75 at a merchant store. For ease of explanation, reference is made to a coupon or coupon data 2612, which is defined to include both types of coupon or discount data, which may be offered by a merchant 210, a manufacturer or a source that collects coupons such as a coupon website.

Accordingly, while FIG. 26A illustrates intermediate computer 220 receiving item-specific coupons 2612 from a computer 2615 of a source 2610 such as a manufacturer, distributor or supplier of the item 212 to which a coupon 2612 applies, it will be understood that intermediate computer 220 may be in communication with various numbers and many computers 2615 of other manufacturers, distributors and suppliers of other items 212. Further, in other embodiments, the source 2610 of coupon data 2612 is the same as the source of item level electronic transaction data 216 and/or item price data 2012. Further, the coupon data 2612 may be item specific or for spending at a merchant 210 generally.

Figure 26B:

Coupon data 2612 can be accessed when a shopping list 253IPC is to be generated or, referring to FIG. 26B, coupon data 2612 can be stored in database 255 with item-level transaction data 216 and price data 2012 in the same or different table or data structure. In this manner, shopping list program 250*b* can access item, price and coupon data from the same database 255, and the item, price and coupon data can be updated periodically or as needed to ensure that the data is current and accurate.

For example, as shown in FIG. 26B, a table or other data structure 2620 includes columns 2621 and 2622 for item and price, and an additional column 2624 for coupon data 2612. As illustrated, the table 2620 may also include a column 2623 identifying merchants 210. In the illustrated embodiment, coupon data 2612 stored in database 255 indicates that Merchants A-C offer respective Coupons when Item 1 is purchased, whereas no coupon or discount is offered for Item 2, and for Item 3, the coupon may be the same for all merchants, e.g., the coupon may be issued by a manufacturer and can be redeemed at various merchants and is not merchant specific. It will be understood that some items 212 may have coupons 2612 whereas others do not, and a coupon 2612 offered may be offered by the manufacturer of the item, merchant and/or other source.

Referring again to FIG. 25, at 2508, purchase interval program 250*a* determines respective purchase intervals 251 of specific items 212*s* from respective merchants 210 based at least in part upon received item-level transaction data 216, and at 2510, generates respective estimates 252 when consumer 230 will purchase respective specific items 212*s* again based at least in part upon respective determined purchase intervals 251. As discussed above, for the identified items 212, the shopping list program 250*b* reads, determines, accesses or receives respective prices 2012 of items 212 for inclusion in electronic shopping list 253IPC for an estimated date 252 of purchase or need of the item 212 at 2512, and at 2514, determines whether any coupon 2612 and can be included in electronic shopping list 253IPC.

At 2516, shopping list program 250*b* generates an electronic shopping list 253IPC that identifies items 212 that may be necessary by or are to be purchased by consumer 230 for the estimated dates 252, one or more prices 2012 of the items 212 (e.g., one price, the lowest price, multiple prices as discussed above), and an indication of whether a coupon 2612 applies or an actual coupon 2612 or link thereto, and at 2518, electronic shopping list 253IPC is transmitted to consumer computing device 235.

Figure 27A:
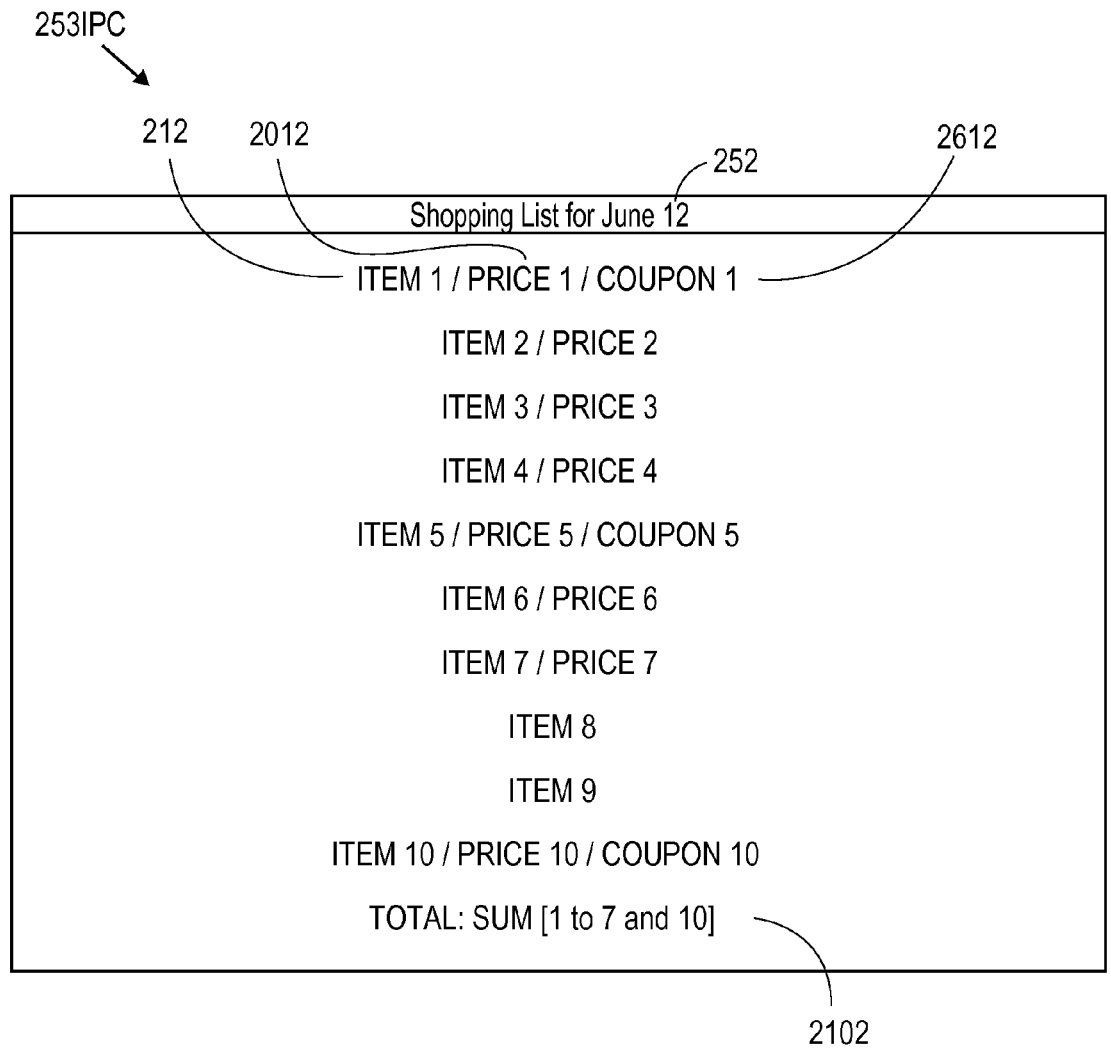

Referring to FIG. 27A, according to one embodiment, electronic shopping list 253IPC includes item, price and coupon data. As shown in FIG. 27A, the shopping list 253IPC reflects that a coupon 2612 may be or was applied. Shopping list program 250*b* may include an indicator that coupons 2612 for these items are available, display the actual coupon 2612, provide a link to the coupon 2612, or send a separate electronic mail or SMS message to computing device 235 with coupon 2612. The total amount 2102 of the shopping list 253IPC may reflect no coupon redemption or redemption coupons 2612 identified in the shopping list 253IPC resulting in a reduced total amount 2102. As illustrated in FIG. 27A, the total amount 2102 may be calculated, and the amount 2702 that can be saved by using coupons 2612 is displayed. While FIG. 27A refers to "COUPON" it will be understood that the shopping list program 250*b* can generate and display various coupon 2612 indicators and various information about available coupons 2612 and how to access and redeem them. For example, purchase interval program 250*a* may identify a particular cereal that costs $3.00 at a particular merchant, determine that there is a coupon for $1.00 off, and notify the consumer of the price of the item, and that the consumer 230 could save $1.00 on the cereal, or display the discounted price of 2.00 for the cereal with a notification to the consumer 230 that the discounted price assumes redemption of an available coupon 2612. The electronic coupon 2612 may be displayed on the computing device 235 such as a mobile communication device so that the coupon 2612 can be scanned by the merchant 210, or the shopping list program 250*b* may transmit the electronic coupon 2612 or link thereto in an electronic mail, SMS or other electronic message.

As another example, the shopping list program 250*b*, upon determining that a certain list 253IPC is for a particular merchant 210, may search the database 255 for any discount offers 2612 of the merchant 210 and notify the consumer 210 whether any discount offers 2612 may apply. For example, the shopping list program 250*b* may determine that an identified merchant 210 has an offer that provides a $5.00 credit or discount if a consumer 230 spends a pre-determined or minimum amount, e.g., $75.00, at merchant 210. If the cost of the items 212 within the electronic shopping list 253IPC for a particular merchant 210 is within a pre-determined amount of the minimum amount or exceeds $75.00, the shopping list program 250*b* notifies consumer 230 of the discount offer 2612, which may be displayed within or in conjunction with the related electronic shopping list or sent an electronic mail, SMS or other electronic message.

Figure 27B:
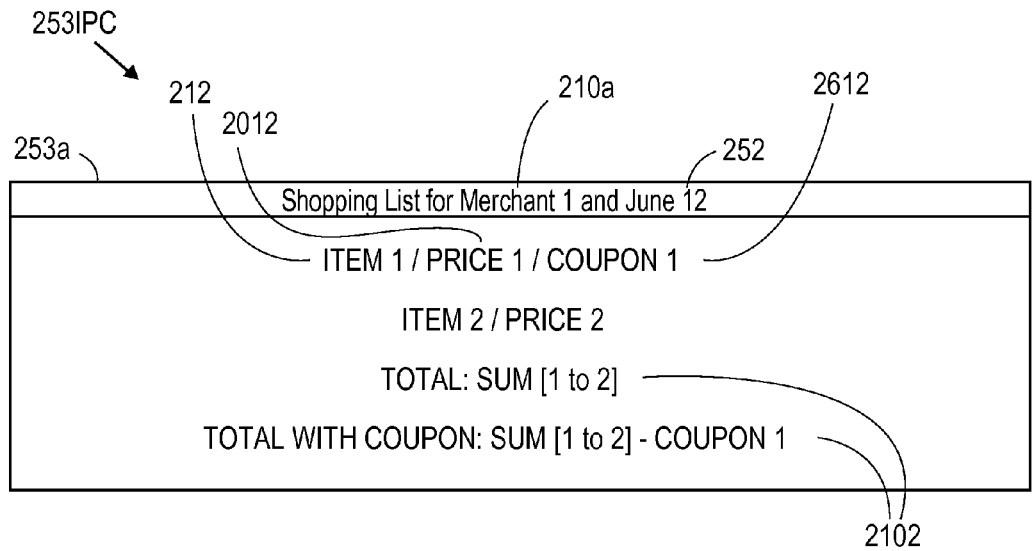
Figure 27C:
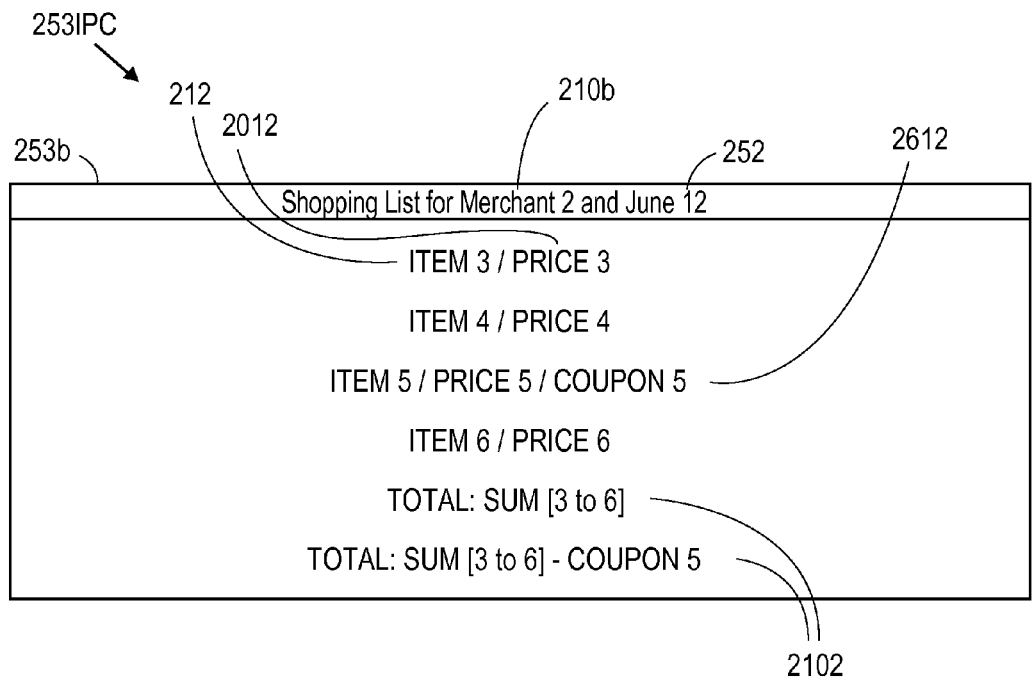
Figure 27D:
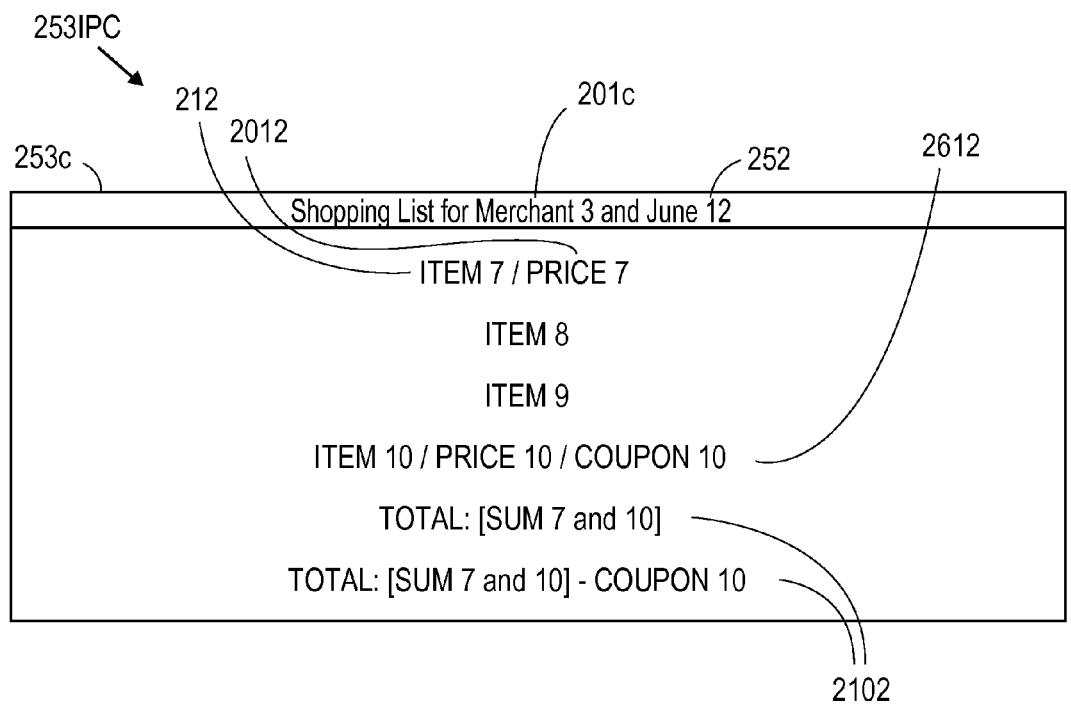

FIGS. 27B-D illustrate how electronic shopping lists 253IPC generated according to embodiments can be segregated by merchant. FIG. 27B illustrates a first shopping list 253*a* including item, price and coupon data for Merchant 1, FIG. 27C illustrates a second shopping list 253*b* including item, price and coupon data for Merchant 2, and FIG. 27D illustrates a third shopping list 253*c* including item, price and coupon data for Merchant 3.

Figure 28A:
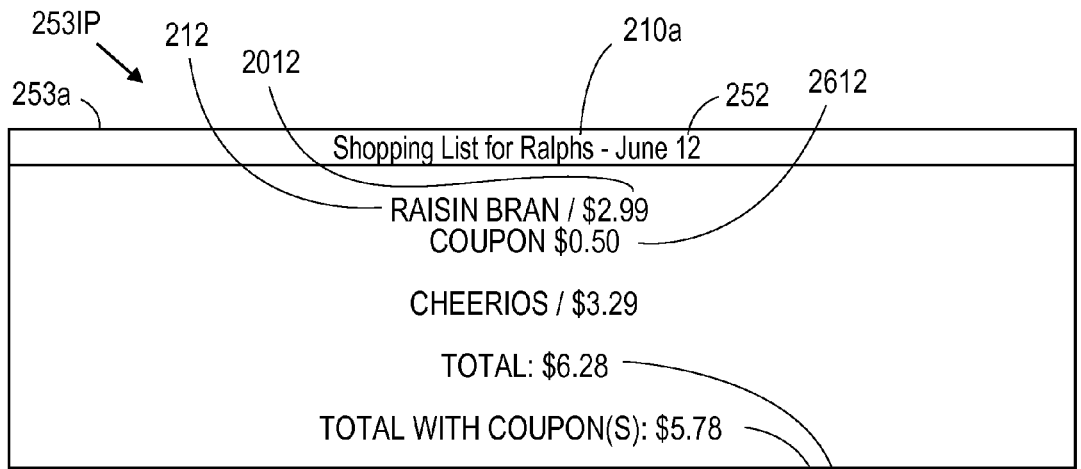
FIGS. 28A-B illustrate an embodiment in which electronic shopping lists including item, price and coupon information can be generated for an estimated date for merchants of the same type.
Figure 28B:
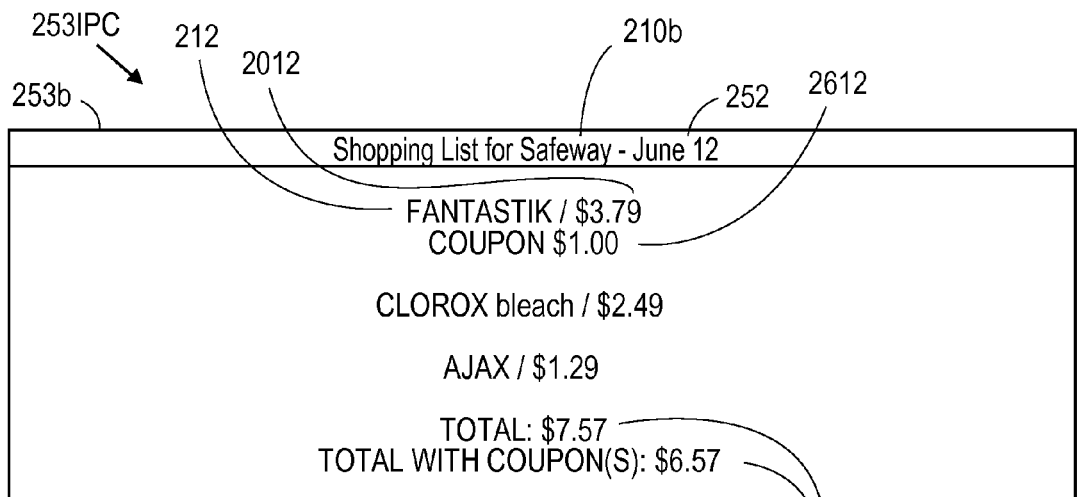
Figure 29A:
FIGS. 29A-B illustrate an embodiment in which electronic shopping lists including item, price and coupon information can be generated for an estimated date for different types of merchants.
Figure 29B:
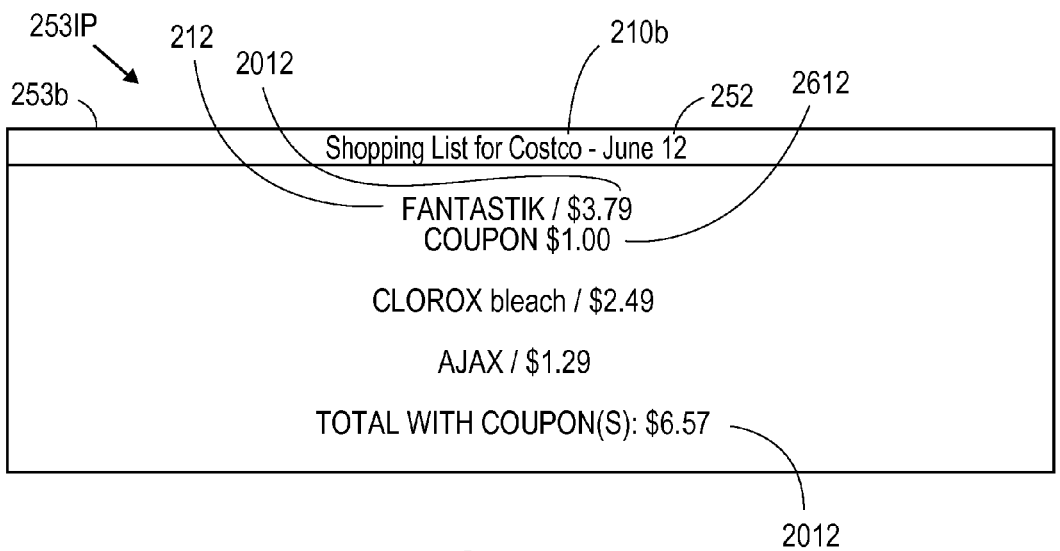

Referring to FIGS. 28A-B, electronic shopping lists 253IPC including item, price and coupon data for particular merchants 210 may also be generated for the same types of merchants, e.g., for grocery stores as shown in FIGS. 28A-B and as described above in further detail, and for different types of merchants as shown in FIGS. 29A-B, e.g., a first electronic shopping list 253a for a grocery store such as RALPHS and a second electronic shopping list 253 for a club membership store such as COSTCO. It will be understood that embodiments may involve multiple lists 253IPC that are segregated in various ways, each list including a single price and coupon, multiple prices, the lowest price, and combinations thereof, as discussed above.

Further, location-based, schedule-based and location and schedule based embodiments may also utilize electronic shopping lists 253IP including item and price data, and electronic shopping lists 253IPC including item, price and coupon data. For example, while the consumer 230 is at a particular location, shopping list program 250b may determine that location, search for nearby merchants 210, and notify, by electronic mail, SME or other type of message, the consumer 230 that a particular merchant 210 is nearby and that consumer 230 may need to purchase certain items 212 again. Electronic or mobile coupons 2612, or links to coupons or other information about coupon availability, may be displayed within the electronic shopping list 253IPC (as illustrated in various Figures or sent to the consumer 230 as an electronic mail or SMS message such that when consumer 230 visits the identified merchant 210, consumer 230 can access and display coupon data 2612 so that coupons 2612 can be redeemed using, for example, a Smartphone and a merchant 210 scanning a coupon 2612 displayed on a screen of the Smartphone.

Thus, it will be understood that embodiments involving items and prices, and items, prices and coupons, may be integrated into or utilize other embodiments related to shopping list segregation (e.g., by merchant, types of merchants, groups of merchants, item categories, etc.) and location and/or schedule based shopping lists.

Figure 30:
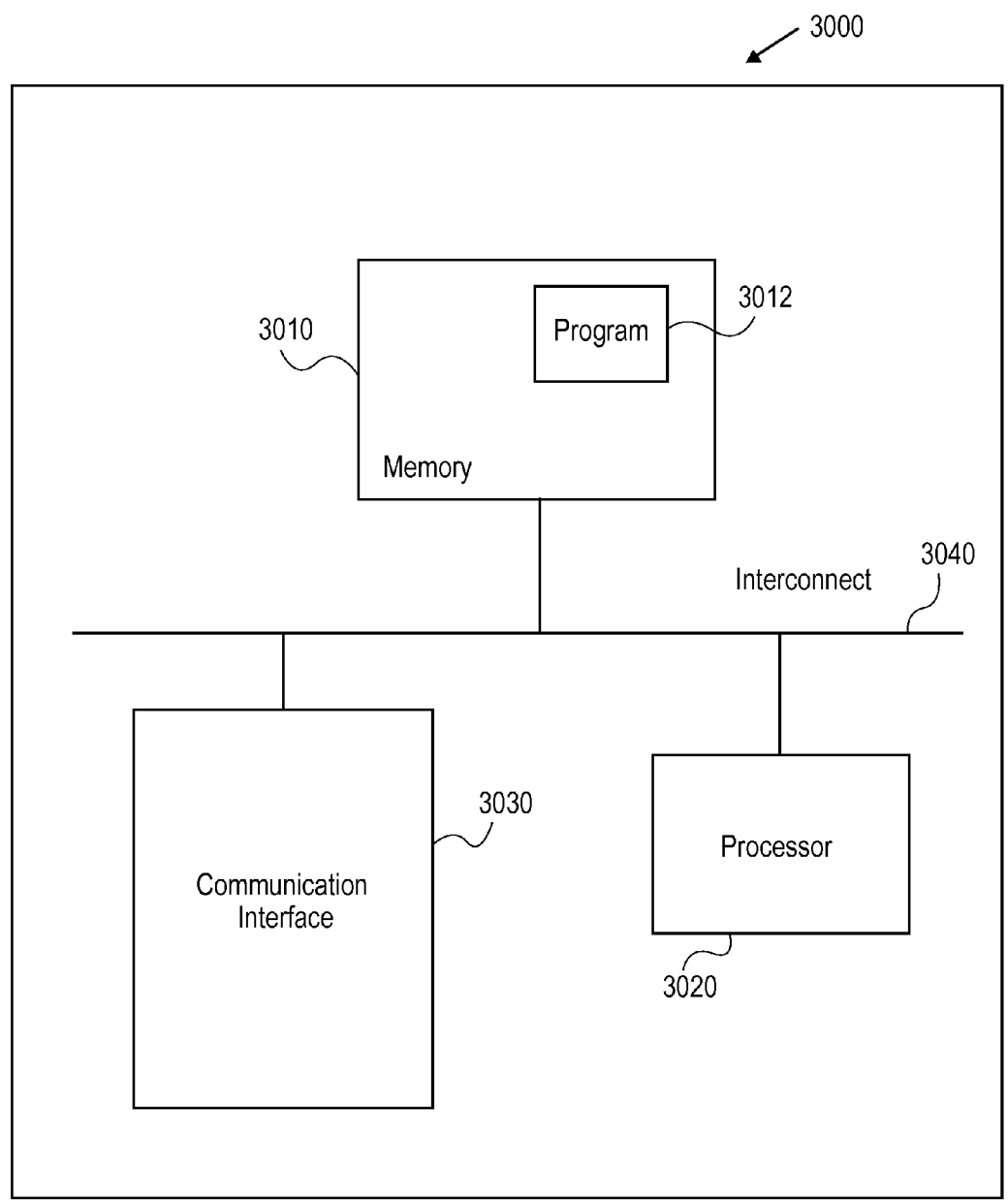
FIG. 30 is a block diagram of components of a computing apparatus or system in which various embodiments may be implemented or that may be utilized to execute embodiments.

FIG. 30 generally illustrates components of a computing device 3000 that may be utilized to execute embodiments and that includes a memory 3010, account processing program instructions 3012, a processor or controller 3020 to execute account processing program instructions 3012, a network or communications interface 3030, e.g., for communications with a network or interconnect 3040 between such components. The memory 3010 may be or include one or more of cache, RAM, ROM, SRAM, DRAM, RDRAM, EEPROM and other types of volatile or non-volatile memory capable of storing data. The processor unit 3020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 3030 may be configured to enable a system component to communicate with other system components across a network which may be a wireless or various other networks. It should be noted that one or more components of computing device 3000 may be located remotely and accessed via a network. Accordingly, the system configuration provided in FIG. 30 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 3020 executes program instructions 3012 within memory 3010 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of services or both good and services consumed by individuals and corporate and government entities.

Embodiments may involve purchase interval program 250a and/or shopping list program that are stand-alone programs or that are part of another system or program such as a FMS that is in communication with merchant payment devices and/or FIs hosting consumer accounts.

While embodiments are described with reference to segregated shopping lists that identify particular brands (e.g., CHEERIOS and PAMPERS), shopping lists generated according to embodiments may also refer to good and services generally or by type or category, which may be determined from item-level electronic transaction data or categorized by purchase interval program 250a or another program such as QUICKRECEIPTS. With such embodiments, for example, consumers may purchase the same specific items in the shopping list again (e.g., due to brand loyalty) or consumer may purchase other brands of products identified in shopping list. For example, shopping list may identify "diapers" or "PAMPERS" but consumer may purchase another brand of diapers such as HUGGIES because HUGGIES is on sale. In both cases, however, electronic shopping lists generated and sent to consumer according to embodiments notify consumer about which items should be purchased again.

Further, item level electronic transaction data sent to host computer can be stored based on various types of purchase including, but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

Moreover, it should be understood that a shopping list program may generate segregated or divided shopping lists based on various types of pre-determined criteria including merchant or store name, groups or types of merchants and item category, and combinations thereof.

Further, shopping list programs according to embodiments may be utilized to generate, store and distribute or transmit shopping lists generated for a particular merchant, for respective merchants, which may be the same or different types of merchants, for a type or category of merchant, for merchants within a group (e.g., based on being the same type or category), for item type or category, e.g., if certain types or categories of items are typically purchased from a grocery store whereas other types or categories of items are typically purchased from a big box store, and/or based on groups of merchants from whom items of a certain type or category can be purchased.

Additionally, while certain embodiments are described with reference to segregation criteria such as merchant-specific criteria, embodiments may also involve criteria of time, e.g., generating shopping lists for one month, two months, six months or one year from a current date, and such lists may also be segregated by merchant, groups, etc. as discussed above. Generation of segregated shopping lists on future dates may be useful for budgeting purposes, spending projections and spending analysis on a merchant, group or item basis.

Additionally, embodiments may involve location and/or schedules to generate or select shopping lists, and location data may be various types of data. Further, while MICROSOFT OUTLOOK is provided as one example of a program having an electronic calendar, data of which can be utilized by the shopping list program, it will be understood that other calendar and scheduling programs may be utilized for this purpose.

Further, while certain embodiments directed to schedule-based shopping lists are described with reference to comparing a consumer's available time to the amount of time typically required to shop at a merchant, other embodiments may not consider the amount of time typically required to shop at a merchant and instead be based on whether the consumer has available time and/or how much time is available, without regard to how long it typically takes to shop at a particular merchant.

Further, it should be understood that embodiments may involve electronic shopping lists including item and price data; item, price and merchant data; item, price and coupon data and item, price, coupon and merchant data. Further, such shopping lists may identify one price per item; one price and one merchant per item; one price and one coupon per item and one price, one merchant and one coupon per item. Other embodiments may involve multiple prices for a single item, multiple prices and respective merchants for a single item, multiple prices and respective merchants and any available coupons for those merchants or item. Further, embodiments in which electronic shopping lists include item prices and/or coupons may be structured or segregated according to various criteria and generated in response to a consumer request, as a notification or alert to the consumer and based on a consumer location and/or schedule.

Additionally, while certain embodiments are described with reference to coupon data being related to a coupon that can be redeemed or a merchant discount offer, embodiments may also involve both types of coupon data. In other words, a consumer may utilize an electronic coupon presented in conjunction with an electronic shopping list and spend enough to also qualify for a discount offered by the merchant.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

For example, the shopping list program may receive, read or determine various types of data in different orders or sequentially. Further, in embodiments involving both location and schedule-based criteria, location-based determinations can be performed first, or schedule-based determinations can be performed first. As another example, searches for and analysis involving specific items, merchants, prices and coupons may occur in different orders and concurrently. Accordingly, the sequences described are provided as examples of how embodiments may be implemented.

Accordingly, embodiments are intended to exemplify alternatives, modifications, and equivalents that may fall within the scope of the claims.

What is claimed is:

1. A computer-implemented method for generating customized shopping lists for a consumer, the method comprising:
   an intermediate computer, in communication with a computing device of the consumer and respective electronic sources of item-level transaction data, aggregating respective item-level electronic transaction data of respective electronic sources for respective prior purchases made by the consumer;
   the intermediate computer analyzing aggregated item-level electronic transaction data;
   the intermediate computer determining respective purchase intervals of a plurality of respective items purchased by the consumer from respective merchants based at least in part upon analysis of aggregated item-level electronic transaction data;
   the intermediate computer determining respective estimated dates when the consumer will purchase respective items again based at least in part upon respective purchase intervals;
   the intermediate computer generating an electronic shopping list for an estimated date, the electronic shopping list comprising an item identified by the intermediate computer for the estimated date, different merchants offering the identified item, and respective prices charged by the different merchants for the identified item; and
   the intermediate computer transmitting the electronic shopping list to the computing device of the consumer.

2. The method of claim 1, the electronic shopping list being transmitted as an electronic mail or SMS message to the computing device comprising a mobile communication device.

3. The method of claim 1, the intermediate computer receiving at least one of the prices from a merchant from whom the consumer previously purchased the identified item, the at least one price being determined based at least in part upon item-level electronic transaction data.

4. The method of claim 1, the intermediate computer receiving at least one of the prices from a merchant from whom the consumer has not previously purchased the identified item.

5. The method of claim 1, further comprising the intermediate computer:
   receiving respective prices of the identified item through respective networks from respective computers of or associated with respective merchants; and
   storing respective prices of the identified item in a data store of or accessible by the intermediate computer,
   the intermediate computer accessing the data store, selecting at least two prices charged by at least two respective merchants for the identified item and incorporating the at least two selected prices and identities of the at least two respective merchants into the electronic shopping list.

6. The method of claim 5, the intermediate computer selecting a lowest price of respective prices of the identified item and incorporating the lowest price and the identity of the merchant that charges the lowest price into the electronic shopping list.

7. The method of claim 1, the electronic shopping list indicating that a coupon for the identified item is available or discounting the price to reflect redemption of the coupon.

8. The method of claim 1, the electronic shopping list comprising a plurality of identified items and respective prices of respective identified items offered by respective merchants.

9. The method of claim 1, further comprising the intermediate computer:
receiving respective prices of respective identified items from respective computing devices of respective merchants through respective networks; and
storing respective prices to a data store of or accessible by the intermediate computer,
the intermediate computer accessing the data store, and for each of the identified items, selecting at least two prices charged by at least two merchants for respective identified items, and incorporating the at least two selected prices and identities of the at least two respective merchants into the electronic shopping list.

10. The method of claim 9, the intermediate computer selecting a lowest price of each identified item, the electronic shopping list comprising: a plurality of items identified by the intermediate computer for the estimated date, respective lowest prices of respective identified items, and identities of respective merchants offering respective identified items at respective lowest prices.

11. The method of claim 9, the intermediate computer generating at least two electronic shopping lists, at least one of the electronic shopping lists comprising:
an identity of a merchant;
one or more items identified by the intermediate computer for the estimated date;
respective prices of the one more identified items charged by the merchant.

12. The method of claim 11, the intermediate computer selecting a lowest price of respective prices and incorporating the lowest price and the identity of the merchant that offers an identified item at the lowest price into the at least one of the electronic shopping lists.

13. The method of claim 1, the item-level electronic transaction data comprising Level III data that specifically identifies the item by at least one identifier selected from the group consisting of name, description, code and symbol.

14. The method of claim 1, the intermediate computer executing a purchase interval program for determining respective purchase intervals of the plurality of respective identified items and determining respective estimated dates when the consumer will purchase respective identified items again, and executing a shopping list program for generating the electronic shopping list for the estimated date.

15. The method of claim 1, further comprising the intermediate computer receiving the price of the identified item, the item-level electronic transaction data and the price of the identified item being received from the same source.

16. The method of claim 1, further comprising the intermediate computer receiving the price of the identified item, the item-level electronic transaction data and the price of the identified item being received from different sources.

17. The method of claim 1, at least one electronic source comprising an electronic payment device of a merchant utilized to process respective purchases made by the consumer.

18. The method of claim 1, at least one electronic source comprising a computer of a financial institution at which the consumer has an account.

19. The method of claim 1, at least one electronic source comprising an electronic payment device of a merchant utilized to process respective purchases made by the consumer, and at least one electronic source comprising a computer of a financial institution at which the consumer has an account.

20. The method of claim 1, the intermediate computer selecting a lowest price for the identified item and identifying a merchant that offers the identified item at the lowest price, at least one of the merchants in the electronic shopping list comprising the merchant that offers the identified item at the lowest price.

21. A system for generating customized shopping lists for a consumer, comprising:
an intermediate computer in communication through respective networks with a computing device of a consumer and respective electronic sources of item-level transaction data;
a purchase interval program executing on the intermediate computer, the purchase interval program being configured to
analyze aggregated item-level electronic transaction data,
determine respective purchase intervals of a plurality of respective items purchased by the consumer from respective merchants based at least in part upon analysis of aggregated item-level electronic transaction, and
determine respective estimated dates when the consumer will purchase respective items again based at least in part upon respective purchase intervals; and
a shopping list program executing on the intermediate computer and in communication with the purchase interval program and configured to generate an electronic shopping list for an estimated date, the electronic shopping list comprising an item identified by the purchase interval program for the estimated date, different merchants offering the identified item, and respective prices charged by the different merchants for the identified item, and configured to transmit the electronic shopping list to the computing device of the consumer.

22. The system of claim 21, the shopping list program being configured to transmit the electronic shopping list in an electronic mail or SMS message, the computing device comprising a mobile communication device.

23. The system of claim 21, further comprising a data store, the shopping list program being configured to receive respective prices of the identified item at the intermediate computer through a network and from a computing device of or associated with a merchant, store the received prices in the data store, and incorporate the received prices into the electronic shopping list.

24. The system of claim 23, the merchant comprising a merchant from whom the consumer previously purchased the identified item as determined from the item-level electronic transaction data.

25. The system of claim 23, the merchant comprising a merchant from whom the consumer has not previously purchased the identified item.

26. The system of claim 21, further comprising a data store, the shopping list program being configured to receive respective prices from respective computers of or associated with respective merchants, store respective prices of the identified item in the data store, select at least two prices charged by at least two respective merchants for the identified item, and incorporate the at least two selected prices and identities of the at least two respective merchants into the electronic shopping list.

27. The system of claim 26, the shopping list program being configured to select a lowest price of respective prices of the identified item and incorporate the lowest price and the identity of the merchant that charges the lowest price into the electronic shopping list.

28. The system of claim 21, the shopping list program being configured to receive coupon data from a coupon source, and to incorporate received coupon data into the electronic shopping list, the electronic shopping list indicating that a coupon for the identified item is available or discounting the price to reflect redemption of the coupon.

29. The system of claim 21, the electronic shopping list comprising a plurality of identified items and respective prices of respective identified items offered by respective merchants.

30. The system of claim 21, further comprising a data store, the shopping list program being configured to receive respective prices of respective identified items from respective computing devices of respective merchants, store respective prices to the data store, and incorporate respective prices of respective identified items into the electronic shopping list, the electronic shopping list comprising a plurality of identified items, respective prices of respective identified items, and respective merchants offering respective identified items at respective prices.

31. The system of claim 30, the shopping list program being configured to select a lowest price of each identified item, the electronic shopping list comprising: a plurality of items identified by the purchase interval program for the estimated date, respective lowest prices of respective identified items, and respective merchants offering respective identified items at respective lowest prices.

32. The system of claim 30, the shopping list program being configured to generate at least two electronic shopping lists, at least one of the electronic shopping lists comprising:
an identity of a merchant;
one or more items identified by the purchase interval program for the estimated date; and
respective prices of the one more identified items charged by the merchant.

33. The system of claim 32, the shopping list program being configured to select a lowest price of the plurality of prices and incorporate the lowest price and the identity of the merchant that offers an identified item at the lowest price into the at least one of the electronic shopping lists.

34. The system of claim 21, the item-level electronic transaction data comprising Level III data that specifically identifies the item by at least one identifier selected from the group consisting of name, description, code and symbol.

35. The system of claim 21, the purchase interval program and the shopping list program residing on the same computer managed by the same host.

36. The system of claim 21, the shopping list program being configured to receive the item-level electronic transaction data and the price of the identified item at the first computing device from the same source.

37. The system of claim 21, the shopping list program being configured to receive the item-level electronic transaction data and the price of the identified item at the first computing device from the different sources.

38. A computer program product comprising a non-transitory computer readable storage medium embodying one or more instructions executable by an intermediate computer, in communication with a computing device of the consumer and respective electronic sources of item-level transaction data, to perform a process for notifying a consumer about recurring purchases of the same item, the process comprising:
the intermediate computer aggregating respective item-level electronic transaction data of respective electronic sources for respective prior purchases made by the consumer;
the intermediate computer analyzing aggregated item-level electronic transaction data;
the intermediate computer determining respective purchase intervals of a plurality of respective items purchased by the consumer from respective merchants based at least in part upon analysis of aggregated item-level electronic transaction data;
the intermediate computer determining respective estimated dates when the consumer will purchase respective items again based at least in part upon respective purchase intervals;
the intermediate computer generating an electronic shopping list for an estimated date, the electronic shopping list comprising an item identified by the intermediate computer for the estimated date, different merchants offering the identified item, and respective prices charged by the different merchants for the identified item; and
the intermediate computer transmitting the electronic shopping list to the computing device of the consumer.

* * * * *